US008849045B2

(12) United States Patent
Furihata et al.

(10) Patent No.: US 8,849,045 B2

(45) Date of Patent: Sep. 30, 2014

(54) DISPLAY SYSTEM AND DISPLAY DEVICE DRIVER

(75) Inventors: Hirobumi Furihata, Kanagawa (JP); Takashi Nose, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 483 days.

(21) Appl. No.: 13/137,444

(22) Filed: Aug. 16, 2011

(65) Prior Publication Data

US 2012/0044216 A1 Feb. 23, 2012

(30) Foreign Application Priority Data

Aug. 17, 2010 (JP) ................................ 2010-182315

(51) Int. Cl.

*G06K 9/36* (2006.01)
*G09G 3/36* (2006.01)
*G09G 3/20* (2006.01)

(52) U.S. Cl.

CPC .......... *G09G 3/3688* (2013.01); *G09G 2370/08* (2013.01); *G09G 3/2066* (2013.01); *G09G 2340/02* (2013.01)

USPC ............ 382/232; 382/233; 382/250; 382/251

(58) Field of Classification Search

CPC ....... H04N 5/46; H04N 7/00; G09G 2340/02; G09G 2370/08; G06F 3/1475

USPC .......... 382/232, 233, 250, 251, 253; 345/204, 345/545, 601, 567

See application file for complete search history.

(56) References Cited

U.S. PATENT DOCUMENTS 6,078,361 A * 6/2000 Reddy ........................... 348/558
6,788,306 B2 9/2004 Yamaguchi et al.
7,415,159 B2 * 8/2008 Kondo et al. ................. 382/232
7,702,163 B2 4/2010 Saito et al.
7,912,304 B2 3/2011 Furihata et al.
2002/0163523 A1 * 11/2002 Adachi et al. ................. 345/536
2007/0013687 A1 * 1/2007 Kodaira et al. ............... 345/204
2009/0322713 A1 12/2009 Furihata et al.
2012/0127188 A1 5/2012 Furihata et al.
2013/0141449 A1 6/2013 Furihata et al.

FOREIGN PATENT DOCUMENTS

JP 6-118928 A 4/1994
JP 2002-287709 A 10/2002
JP 3735529 B2 1/2006
JP 2006-303690 A 11/2006
JP 2010-11386 A 1/2010

OTHER PUBLICATIONS

Japanese Office Action dated Dec. 17, 2013, (with English Translation).

* cited by examiner

*Primary Examiner* — Ali Bayat

(74) *Attorney, Agent, or Firm* — McGinn I.P. Law Group, PLLC

(57) ABSTRACT

A display system includes: a display device, a transmitting device which generates compressed data by performing a compression process on image data corresponding to a display image, and a driver which drives the display device in response to the compressed data received from the transmitting device. The driver includes: a decompression circuit which generates decompressed data by decompressing the compressed data, an FRC circuit configured to perform an FEC process on the decompressed data to generate display data and a drive circuit which drives the display device in response to the display data. The following relation holds:

$$m_2 > m_3 > m_1,$$

where $m_1$ is a number of bits of the compressed data per pixel, $m_2$ is a number of bits of the decompressed data per pixel and $m_3$ is a number of bits of the display data per pixel.

21 Claims, 41 Drawing Sheets

Fig. 3

| | | | | | | | |
|---|---|---|---|---|---|---|---|
| HEADER (4 bits) | Ymin (10 bits) | Ydist0 (4 bits) | Ydist1 (4 bits) | Ydist2 (4 bits) | ADDRESS (2 bits) | Cb' (10 bits) | Cr' (10 bits) |

Fig. 4A (4 × 1) PIXEL COMPRESSION

21: IMAGE DATA

| | R | G | B |
|---|---|---|---|
| A | 10 | 12 | 14 |
| B | 6 | 7 | 8 |
| C | 5 | 4 | 3 |
| D | 0 | 1 | 2 |

(8bits/sub-pixel)

MATRIX CALCU-LATION →

| | Y | Cb | Cr |
|---|---|---|---|
| A | 48 | 2 | -2 |
| B | 28 | 1 | -1 |
| C | 16 | -1 | 1 |
| D | 4 | 1 | -1 |

→

CALCULATION OF Ymin, Ydist0, Ydist1, Ydist2, Cb' AND Cr'

Fig. 4B (4 × 1) PIXEL DECOMPRESSION

RESTORATION OF $Y_A$ TO $Y_D$ →

| | Y | Cb' | Cr' |
|---|---|---|---|
| A | 48 | 1 | -1 |
| B | 28 | 1 | -1 |
| C | 16 | 1 | -1 |
| D | 4 | 1 | -1 |

MATRIX CALCULATION →

23: DECOMPRESSED DATA

| | R | G | B |
|---|---|---|---|
| A | 11 | 12 | 13 |
| B | 6 | 7 | 8 |
| C | 3 | 4 | 5 |
| D | 0 | 1 | 2 |

(8bits/sub-pixel)

Fig. 5

24

ADD FRC ERROR AND TRUNCATE 2 BITS

4m-TH FRAME

| | R | G | B |
|---|---|---|---|
| A | 3 | 3 | 4 |
| B | 1 | 2 | 2 |
| C | 1 | 1 | 1 |
| D | 0 | 1 | 0 |

(6bits/sub-pixel)

(4m+1)-TH FRAME

| | R | G | B |
|---|---|---|---|
| A | 3 | 3 | 3 |
| B | 2 | 2 | 2 |
| C | 0 | 1 | 2 |
| D | 0 | 0 | 1 |

(6bits/sub-pixel)

(4m+2)-TH FRAME

| | R | G | B |
|---|---|---|---|
| A | 2 | 3 | 3 |
| B | 1 | 1 | 2 |
| C | 1 | 1 | 1 |
| D | 0 | 0 | 0 |

(6bits/sub-pixel)

(4m+3)-TH FRAME

| | R | G | B |
|---|---|---|---|
| A | 3 | 3 | 3 |
| B | 2 | 2 | 2 |
| C | 1 | 1 | 1 |
| D | 0 | 0 | 1 |

(6bits/sub-pixel)

Fig. 6A

| | | PIXEL A | | | PIXEL B | | | PIXEL C | | | PIXEL D | | |
|---|---|---|---|---|---|---|---|---|---|---|---|---|---|
| | | R | G | B | R | G | B | R | G | B | R | G | B |
| 4m-TH FRAME | 4k-TH LINE | 1 | 2 | 3 | 0 | 1 | 2 | 3 | 0 | 1 | 2 | 3 | 0 |
| | (4k+1)-TH LINE | 3 | 0 | 1 | 2 | 3 | 0 | 1 | 2 | 3 | 0 | 1 | 2 |
| | (4k+2)-TH LINE | 0 | 3 | 2 | 1 | 0 | 3 | 2 | 1 | 0 | 3 | 2 | 1 |
| | (4k+3)-TH LINE | 2 | 1 | 0 | 3 | 2 | 1 | 0 | 3 | 2 | 1 | 0 | 3 |

| | | R | G | B | R | G | B | R | G | B | R | G | B |
|---|---|---|---|---|---|---|---|---|---|---|---|---|---|
| (4m+1)-TH FRAME | 4k-TH LINE | 3 | 1 | 0 | 2 | 3 | 1 | 0 | 2 | 3 | 1 | 0 | 2 |
| | (4k+1)-TH LINE | 0 | 2 | 3 | 1 | 0 | 2 | 3 | 1 | 0 | 2 | 3 | 1 |
| | (4k+2)-TH LINE | 2 | 0 | 1 | 3 | 2 | 0 | 1 | 3 | 2 | 0 | 1 | 3 |
| | (4k+3)-TH LINE | 1 | 3 | 2 | 0 | 1 | 3 | 2 | 0 | 1 | 3 | 2 | 0 |

| | | R | G | B | R | G | B | R | G | B | R | G | B |
|---|---|---|---|---|---|---|---|---|---|---|---|---|---|
| (4m+2)-TH FRAME | 4k-TH LINE | 0 | 3 | 2 | 1 | 0 | 3 | 2 | 1 | 0 | 3 | 2 | 1 |
| | (4k+1)-TH LINE | 2 | 1 | 0 | 3 | 2 | 1 | 0 | 3 | 2 | 1 | 0 | 3 |
| | (4k+2)-TH LINE | 1 | 2 | 3 | 0 | 1 | 2 | 3 | 0 | 1 | 2 | 3 | 0 |
| | (4k+3)-TH LINE | 3 | 0 | 1 | 2 | 3 | 0 | 1 | 2 | 3 | 0 | 1 | 2 |

| | | R | G | B | R | G | B | R | G | B | R | G | B |
|---|---|---|---|---|---|---|---|---|---|---|---|---|---|
| (4m+3)-TH FRAME | 4k-TH LINE | 2 | 0 | 1 | 3 | 2 | 0 | 1 | 3 | 2 | 0 | 1 | 3 |
| | (4k+1)-TH LINE | 1 | 3 | 2 | 0 | 1 | 3 | 2 | 0 | 1 | 3 | 2 | 0 |
| | (4k+2)-TH LINE | 3 | 1 | 0 | 2 | 3 | 1 | 0 | 2 | 3 | 1 | 0 | 2 |
| | (4k+3)-TH LINE | 0 | 2 | 3 | 1 | 0 | 2 | 3 | 1 | 0 | 2 | 3 | 1 |

Fig. 6B

4m-TH FRAME

| | R | G | B |
|---|---|---|---|
| A | 1 | 2 | 3 |
| B | 0 | 1 | 2 |
| C | 3 | 0 | 1 |
| D | 2 | 3 | 0 |

(4m+1)-TH FRAME

| | R | G | B |
|---|---|---|---|
| A | 3 | 1 | 0 |
| B | 2 | 3 | 1 |
| C | 0 | 2 | 3 |
| D | 1 | 0 | 2 |

(4m+2)-TH FRAME

| | R | G | B |
|---|---|---|---|
| A | 0 | 3 | 2 |
| B | 1 | 0 | 3 |
| C | 2 | 1 | 0 |
| D | 3 | 2 | 1 |

(4m+3)-TH FRAME

| | R | G | B |
|---|---|---|---|
| A | 2 | 0 | 1 |
| B | 3 | 2 | 0 |
| C | 1 | 3 | 2 |
| D | 0 | 1 | 3 |

Fig. 10A

| | R | G | B |
|---|---|---|---|
| A | 10 | 5 | 15 |
| B | 10 | 5 | 15 |
| C | 10 | 5 | 15 |
| D | 10 | 5 | 15 |

Fig. 10B

| | R | G | B |
|---|---|---|---|
| A | 50 | 50 | 50 |
| B | 200 | 200 | 200 |
| C | 100 | 100 | 100 |
| D | 10 | 10 | 10 |

Fig. 10C

| | R | G | B |
|---|---|---|---|
| A | 50 | 5 | 5 |
| B | 200 | 5 | 5 |
| C | 100 | 5 | 5 |
| D | 10 | 5 | 5 |

Fig. 10D

| | R | G | B |
|---|---|---|---|
| A | 5 | 5 | 5 |
| B | 5 | 200 | 5 |
| C | 5 | 100 | 5 |
| D | 5 | 10 | 5 |

Fig. 10E

| | R | G | B |
|---|---|---|---|
| A | 5 | 5 | 50 |
| B | 5 | 5 | 200 |
| C | 5 | 5 | 100 |
| D | 5 | 5 | 10 |

Fig. 10F

| | R | G | B |
|---|---|---|---|
| A | 50 | 5 | 50 |
| B | 200 | 5 | 200 |
| C | 100 | 5 | 100 |
| D | 10 | 5 | 10 |

Fig. 10G

| | R | G | B |
|---|---|---|---|
| A | 50 | 50 | 5 |
| B | 200 | 200 | 5 |
| C | 100 | 100 | 5 |
| D | 10 | 10 | 5 |

Fig. 10H

| | R | G | B |
|---|---|---|---|
| A | 5 | 5 | 5 |
| B | 5 | 200 | 200 |
| C | 5 | 100 | 100 |
| D | 5 | 10 | 10 |

Fig. 11

ADD FRC ERROR AND TRUNCATE 2 BITS

4m-TH FRAME (6bits/sub-pixel)

| | R | G | B |
|---|---|---|---|
| A | 2 | 1 | 4 |
| B | 2 | 1 | 4 |
| C | 3 | 1 | 4 |
| D | 3 | 2 | 3 |

(4m+1)-TH FRAME (6bits/sub-pixel)

| | R | G | B |
|---|---|---|---|
| A | 3 | 1 | 3 |
| B | 3 | 2 | 4 |
| C | 2 | 1 | 4 |
| D | 2 | 1 | 4 |

(4m+2)-TH FRAME (6bits/sub-pixel)

| | R | G | B |
|---|---|---|---|
| A | 2 | 2 | 4 |
| B | 2 | 1 | 4 |
| C | 3 | 1 | 3 |
| D | 3 | 1 | 4 |

(4m+3)-TH FRAME (6bits/sub-pixel)

| | R | G | B |
|---|---|---|---|
| A | 3 | 1 | 4 |
| B | 3 | 1 | 3 |
| C | 2 | 2 | 4 |
| D | 2 | 1 | 4 |

Fig. 13A (1 × 4) PIXEL COMPRESSION

21

| | R | G | B | α |
|---|---|---|---|---|
| A | 50 | 1 | 30 | 0 |
| B | 51 | 100 | 39 | 5 |
| C | 4 | 4 | 100 | 10 |
| D | 100 | 1 | 2 | 15 |

ADD α →

| | R | G | B |
|---|---|---|---|
| A | 50 | 1 | 30 |
| B | 56 | 105 | 44 |
| C | 14 | 14 | 110 |
| D | 115 | 16 | 17 |

BIT TRUN-CATION →

22

| | R | G | B |
|---|---|---|---|
| A | 3 | 0 | 2 |
| B | 4 | 7 | 3 |
| C | 1 | 1 | 7 |
| D | 7 | 1 | 1 |

BIT TRUNCATION: TRUNCATE LOWER 5 BITS AFTER ADDING +16 FOR B SUB-PIXEL OF PIXEL D
TRUNCATE LOWER 4 BITS AFTER ADDING +8 FOR REMAINING SUB-PIXELS

Fig. 13B (1 × 4) PIXEL DECOMPRESSION

22

| | R | G | B |
|---|---|---|---|
| A | 3 | 0 | 2 |
| B | 4 | 7 | 3 |
| C | 1 | 1 | 7 |
| D | 7 | 1 | 1 |

BIT CARRY →

| | R | G | B |
|---|---|---|---|
| A | 48 | 0 | 32 |
| B | 64 | 112 | 48 |
| C | 16 | 16 | 112 |
| D | 112 | 16 | 32 |

SUBTRACT $\alpha$ →

23

| | R | G | B |
|---|---|---|---|
| A | 48 | 0 | 32 |
| B | 59 | 107 | 43 |
| C | 6 | 6 | 102 |
| D | 97 | 1 | 17 |

(8bits/sub-pixel)

BIT CARRY: 5-BIT CARRY FOR B SUB-PIXEL OF PIXEL D
4-BIT CARRY FOR OTHER SUB-PIXELS

Fig. 14

24

FRC PROCESSING (AFTER (1 × 4) PIXEL DECOMPRESSION)

ADD FRC ERROR AND TRUNCATE 2 BITS

4m-TH FRAME

| | R | G | B |
|---|---|---|---|
| A | 12 | 0 | 8 |
| B | 14 | 27 | 11 |
| C | 2 | 1 | 25 |
| D | 24 | 1 | 4 |

(6bits/sub-pixel)

(4m+1)-TH FRAME

| | R | G | B |
|---|---|---|---|
| A | 12 | 0 | 8 |
| B | 15 | 27 | 11 |
| C | 1 | 2 | 26 |
| D | 24 | 0 | 4 |

(6bits/sub-pixel)

(4m+2)-TH FRAME

| | R | G | B |
|---|---|---|---|
| A | 12 | 0 | 8 |
| B | 15 | 26 | 11 |
| C | 2 | 1 | 25 |
| D | 25 | 0 | 4 |

(6bits/sub-pixel)

(4m+3)-TH FRAME

| | R | G | B |
|---|---|---|---|
| A | 12 | 0 | 8 |
| B | 15 | 27 | 10 |
| C | 1 | 2 | 26 |
| D | 24 | 0 | 5 |

(6bits/sub-pixel)

(2 + 1 × 2) PIXEL COMPRESSION
21
HIGH CORRELATION BETWEEN PIXELS A AND B
(A+B+1)/2
COMPARISON WITH β
WHICH IS LARGER?
LARGE
SMALL
ADD α
ROUNDING/ FRC PROCESS
REPRESENTATIVE VALUES #1
22
4m-TH FRAME
(4m+1)-TH FRAME
(4m+2)-TH FRAME
(4m+3)-TH FRAME
BIT TRUN-CATION

Fig. 17C (2 + 1 × 2) PIXEL DECOMPRESSION (NO. 3)

22

| | R | G | B |
|---|---|---|---|
| C | 1 | 1 | 7 |
| D | 7 | 1 | 1 |

BIT CARRY →

| | R | G | B |
|---|---|---|---|
| C | 16 | 16 | 112 |
| D | 112 | 16 | 16 |

SUBTRACT α →

23

| | R | G | B |
|---|---|---|---|
| C | 6 | 6 | 102 |
| D | 97 | 1 | 1 |

(8bits/sub-pixel)

Fig. 18A

24

FRC PROCESSING (AFTER (2 + 1 × 2) PIXEL DECOMPRESSION) NO. 1

FRC PROCESSING FOR SUB-PIXELS OTHER THAN G SUB PIXELS

4m-TH FRAME

| | R | G | B |
|---|---|---|---|
| A | 13 | 1 | 8 |
| B | 15 | 1 | 8 |

(6bits/sub-pixel)

(4m+1)-TH FRAME

| | R | G | B |
|---|---|---|---|
| A | 13 | 0 | 8 |
| B | 15 | 0 | 8 |

(6bits/sub-pixel)

(4m+2)-TH FRAME

| | R | G | B |
|---|---|---|---|
| A | 12 | 1 | 8 |
| B | 15 | 1 | 8 |

(6bits/sub-pixel)

(4m+3)-TH FRAME

| | R | G | B |
|---|---|---|---|
| A | 13 | 0 | 8 |
| B | 16 | 0 | 8 |

(6bits/sub-pixel)

Fig. 18B

24

FRC PROCESSING (AFTER (2 + 1 × 2) PIXEL DECOMPRESSION) NO. 2

ADD FRC ERROR AND TRUNCATE 2 BITS

4m-TH FRAME

| | R | G | B |
|---|---|---|---|
| C | 2 | 1 | 25 |
| D | 24 | 1 | 0 |

(6bits/sub-pixel)

(4m+1)-TH FRAME

| | R | G | B |
|---|---|---|---|
| C | 1 | 2 | 26 |
| D | 24 | 0 | 0 |

(6bits/sub-pixel)

(4m+2)-TH FRAME

| | R | G | B |
|---|---|---|---|
| C | 2 | 1 | 25 |
| D | 25 | 0 | 0 |

(6bits/sub-pixel)

(4m+3)-TH FRAME

| | R | G | B |
|---|---|---|---|
| C | 1 | 2 | 26 |
| D | 24 | 0 | 1 |

(6bits/sub-pixel)

Fig. 19

PERFORM 2-BIT CARRY ON RESPECTIVE VALUES AND CALCULATES AVERAGES FOR 4m TO 4m+3 FRAMES

| | R | G | B |
|---|---|---|---|
| A | 51 | 2 | 32 |
| B | 61 | 2 | 32 |
| C | 6 | 6 | 102 |
| D | 97 | 1 | 1 |

Fig. 23A

FRC PROCESSING (AFTER (2 × 2) PIXEL DECOMPRESSION) NO. 1

23

(8bits)(6bits)(8bits)

| | R | G | B |
|---|---|---|---|
| A | 51 | 1 | 27 |
| B | 61 | 1 | 37 |

FRC PROCESSING FOR SUB-PIXELS OTHER THAN G SUB PIXELS →

| | R | G | B |
|---|---|---|---|
| A | 13 | 1 | 7 |
| B | 15 | 1 | 9 |

(8bits)(6bits)(8bits)

| | R | G | B |
|---|---|---|---|
| A | 51 | 0 | 27 |
| B | 61 | 0 | 37 |

FRC PROCESSING FOR SUB-PIXELS OTHER THAN G SUB PIXELS →

| | R | G | B |
|---|---|---|---|
| A | 13 | 0 | 6 |
| B | 15 | 0 | 9 |

(8bits)(6bits)(8bits)

| | R | G | B |
|---|---|---|---|
| A | 51 | 1 | 27 |
| B | 61 | 1 | 37 |

FRC PROCESSING FOR SUB-PIXELS OTHER THAN G SUB PIXELS →

| | R | G | B |
|---|---|---|---|
| A | 12 | 1 | 7 |
| B | 15 | 1 | 10 |

(8bits)(6bits)(8bits)

| | R | G | B |
|---|---|---|---|
| A | 51 | 0 | 27 |
| B | 61 | 0 | 37 |

FRC PROCESSING FOR SUB-PIXELS OTHER THAN G SUB PIXELS →

| | R | G | B |
|---|---|---|---|
| A | 13 | 0 | 7 |
| B | 16 | 0 | 9 |

Fig. 23B

FRC PROCESSING (AFTER (2 × 2) PIXEL DECOMPRESSION) NO. 2

23

| | R (6bits) | G (8bits) | B (8bits) |
|---|---|---|---|
| C | 25 | 77 | 11 |
| D | 25 | 87 | 1 |

FRC PROCESSING FOR SUB-PIXELS OTHER THAN R SUB PIXELS →

| | R | G | B |
|---|---|---|---|
| C | 25 | 19 | 3 |
| D | 25 | 22 | 0 |

| | R (6bits) | G (8bits) | B (8bits) |
|---|---|---|---|
| C | 25 | 77 | 11 |
| D | 25 | 87 | 1 |

FRC PROCESSING FOR SUB-PIXELS OTHER THAN R SUB PIXELS →

| | R | G | B |
|---|---|---|---|
| C | 25 | 19 | 3 |
| D | 25 | 21 | 0 |

| | R (6bits) | G (8bits) | B (8bits) |
|---|---|---|---|
| C | 25 | 77 | 11 |
| D | 25 | 87 | 1 |

FRC PROCESSING FOR SUB-PIXELS OTHER THAN R SUB PIXELS →

| | R | G | B |
|---|---|---|---|
| C | 25 | 19 | 2 |
| D | 25 | 22 | 0 |

| | R (6bits) | G (8bits) | B (8bits) |
|---|---|---|---|
| C | 25 | 77 | 11 |
| D | 25 | 87 | 1 |

FRC PROCESSING FOR SUB-PIXELS OTHER THAN R SUB PIXELS →

| | R | G | B |
|---|---|---|---|
| C | 25 | 20 | 3 |
| D | 25 | 22 | 1 |

Fig. 24

PERFORM 2-BIT CARRY ON RESPECTIVE VALUES AND CALCULATES AVERAGES FOR 4m TO 4m+3 FRAMES

| | R | G | B |
|---|---|---|---|
| A | 51 | 2 | 27 |
| B | 61 | 2 | 37 |
| C | 100 | 77 | 11 |
| D | 100 | 87 | 1 |

Fig. 27

(3 + 1) PIXEL DECOMPRESSION

22 REPRESENTATIVE VALUES

| R | G | B |
|---|---|---|
| 51 | 1 | 31 |

SUBTRACT α →

| R | G | B |
|---|---|---|
| 51 | 1 | 31 |

COPY FOR THREE PIXELS →

23

| | R | G | B |
|---|---|---|---|
| A | 51 | 1 | 31 |
| B | 51 | 1 | 31 |
| C | 51 | 1 | 31 |

ADD FRC ERROR AND TRUNCATE TWO BITS →

4m-TH FRAME

| | R | G | B |
|---|---|---|---|
| A | 13 | 0 | 8 |
| B | 12 | 0 | 8 |
| C | 13 | 0 | 8 |

(6bits/sub-pixel)

→ (4m+1)-TH FRAME

| | R | G | B |
|---|---|---|---|
| A | 13 | 0 | 7 |
| B | 13 | 1 | 8 |
| C | 12 | 0 | 8 |

(6bits/sub-pixel)

→ (4m+2)-TH FRAME

| | R | G | B |
|---|---|---|---|
| A | 12 | 1 | 8 |
| B | 13 | 0 | 8 |
| C | 13 | 0 | 7 |

(6bits/sub-pixel)

→ (4m+3)-TH FRAME

| | R | G | B |
|---|---|---|---|
| A | 13 | 0 | 8 |
| B | 13 | 0 | 7 |
| C | 13 | 1 | 8 |

(6bits/sub-pixel)

NO PROCESSING FOR PIXEL D

4m-TH FRAME

| | R | G | B |
|---|---|---|---|
| D | 26 | 0 | 1 |

(6bits/sub-pixel)

(4m+1)-TH FRAME

| | R | G | B |
|---|---|---|---|
| D | 26 | 0 | 0 |

(6bits/sub-pixel)

(4m+2)-TH FRAME

| | R | G | B |
|---|---|---|---|
| D | 25 | 1 | 1 |

(6bits/sub-pixel)

(4m+3)-TH FRAME

| | R | G | B |
|---|---|---|---|
| D | 26 | 0 | 0 |

(6bits/sub-pixel)

PERFORM 2-BIT CARRY ON RESPECTIVE VALUES AND CALCULATES AVERAGES FOR 4m TO 4m+3 FRAMES

| | R | G | B |
|---|---|---|---|
| A | 51 | 1 | 31 |
| B | 51 | 1 | 31 |
| C | 51 | 1 | 31 |
| D | 103 | 1 | 2 |

(8bits/sub-pixel)

| | | X1X0 | | | |
|---|---|---|---|---|---|
| | | 00 | 01 | 10 | 11 |
| Y1Y0 | 00 | 15 | 05 | 01 | 11 |
| | 01 | 00 | 10 | 14 | 04 |
| | 10 | 07 | 09 | 13 | 02 |
| | 11 | 08 | 06 | 03 | 12 |

Fig. 31

| | | PIXEL A | | | PIXEL B | | | PIXEL C | | | PIXEL D | | |
|---|---|---|---|---|---|---|---|---|---|---|---|---|---|
| | | R | G | B | R | G | B | R | G | B | R | G | B |
| 4m-TH FRAME | 4k-TH LINE | 1 | 2 | 3 | 0 | 1 | 2 | 3 | 0 | 1 | 2 | 3 | 0 |
| | (4k+1)-TH LINE | 3 | 0 | 1 | 2 | 3 | 0 | 1 | 2 | 3 | 0 | 1 | 2 |
| | (4k+2)-TH LINE | 0 | 3 | 2 | 1 | 0 | 3 | 2 | 1 | 0 | 3 | 2 | 1 |
| | (4k+3)-TH LINE | 2 | 1 | 0 | 3 | 2 | 1 | 0 | 3 | 2 | 1 | 0 | 3 |

| | | R | G | B | R | G | B | R | G | B | R | G | B |
|---|---|---|---|---|---|---|---|---|---|---|---|---|---|
| (4m+1)-TH FRAME | 4k-TH LINE | 3 | 1 | 0 | 2 | 3 | 1 | 0 | 2 | 3 | 1 | 0 | 2 |
| | (4k+1)-TH LINE | 0 | 2 | 3 | 1 | 0 | 2 | 3 | 1 | 0 | 2 | 3 | 1 |
| | (4k+2)-TH LINE | 2 | 0 | 1 | 3 | 2 | 0 | 1 | 3 | 2 | 0 | 1 | 3 |
| | (4k+3)-TH LINE | 1 | 3 | 2 | 0 | 1 | 3 | 2 | 0 | 1 | 3 | 2 | 0 |

| | | R | G | B | R | G | B | R | G | B | R | G | B |
|---|---|---|---|---|---|---|---|---|---|---|---|---|---|
| (4m+2)-TH FRAME | 4k-TH LINE | 0 | 3 | 2 | 1 | 0 | 3 | 2 | 1 | 0 | 3 | 2 | 1 |
| | (4k+1)-TH LINE | 2 | 1 | 0 | 3 | 2 | 1 | 0 | 3 | 2 | 1 | 0 | 3 |
| | (4k+2)-TH LINE | 1 | 2 | 3 | 0 | 1 | 2 | 3 | 0 | 1 | 2 | 3 | 0 |
| | (4k+3)-TH LINE | 3 | 0 | 1 | 2 | 3 | 0 | 1 | 2 | 3 | 0 | 1 | 2 |

| | | R | G | B | R | G | B | R | G | B | R | G | B |
|---|---|---|---|---|---|---|---|---|---|---|---|---|---|
| (4m+3)-TH FRAME | 4k-TH LINE | 2 | 0 | 1 | 3 | 2 | 0 | 1 | 3 | 2 | 0 | 1 | 3 |
| | (4k+1)-TH LINE | 1 | 3 | 2 | 0 | 1 | 3 | 2 | 0 | 1 | 3 | 2 | 0 |
| | (4k+2)-TH LINE | 3 | 1 | 0 | 2 | 3 | 1 | 0 | 2 | 3 | 1 | 0 | 2 |
| | (4k+3)-TH LINE | 0 | 2 | 3 | 1 | 0 | 2 | 3 | 1 | 0 | 2 | 3 | 1 |

DISPLAY SYSTEM AND DISPLAY DEVICE DRIVER

INCORPORATION BY REFERENCE

This application claims the benefit of priority based on Japanese Patent Application No. 2010-182315, filed on Aug. 17, 2010, the disclosure of which is incorporated herein by reference.

FIELD OF THE INVENTION

The present invention relates to a display system and a display device driver, and more particularly, to a technique for transferring data to a display device driver.

BACKGROUND

One requirement for a display device such as a liquid crystal display device is many-gray-level display, whereas a display device (e.g., liquid crystal display panel) itself may not be adapted to the required many-gray-level display. For example, there is a case in which 8 bits are allocated to each of red (R), green (G), and blue (B) in original image data, whereas the display device may be adapted to image data in which 6 bits are allocated to each of red (R), green (G), and blue (B).

One approach for addressing such mismatching is to perform a color reduction process. The problem of the mismatching of the number of the gray-levels between the image data and the display device can be solved by performing the color reduction process on multi-gradation image data (in which 8 bits are allocated to each of red (R), green (G), and blue (B), for example) to generate image data adapted to the number of gray-levels of the display device (in which 6 bits are allocated to each of red (R), green (G), and blue (B)), and driving the display device in response to the color-reduced image data. Especially, when an FRC (frame rate control) is adopted in the color reduction process, this effectively increases the number of gray-levels in a pseudo manner, enabling displaying an image with an improved image quality.

Such a technique is disclosed in, for example, Japanese Patent Application Publication No. P2002-287709A. In a liquid crystal display device disclosed in this publication, the color reduction process is performed in an MPU, and the color-reduced image data are transferred to a liquid crystal drive circuit. The liquid crystal drive circuit drives a liquid crystal display panel in response to the image data having been subjected to the color reduction process. In addition, Japanese Patent Gazette No. 3735529 discloses a liquid crystal display device in which image data obtained by an error diffusion process including an FRC process in an error diffusion processing circuit are transferred to a signal electrode drive circuit.

The color reduction process effectively reduces the data size of the image data to some extent, which is preferable in data transfer. The reduction in the data size of image data effectively reduces electric power necessary for the data transfer. The color reduction process, however, only achieves a limited effect of reducing the data size, and therefore the effect of reducing power necessary for data transfer is also limited.

In order to further reduce the data size of image data to be transferred, it is effective to perform a compression process on the image data, and transfer the compressed data obtained by the compression process. Such a technique is disclosed in, for example, Japanese Patent Application Publication No. P2006-303690 A. This publication discloses a technique in which compressed data obtained by compressing image data are stored in an image memory, and compressed data read from the image data are decompressed and then transmitted to a display device.

According to investigation by the inventors, however, there is room for improvement in the above-mentioned techniques, in terms of simultaneously achieving reduction in power necessary for transfer image data and improvement in the image quality of an image displayed on a display device.

SUMMARY

Therefore, an objective of the present invention is to simultaneously achieve reduction in power necessary for transferring image data and improvement in the image quality of an image displayed on a display device.

In an aspect of the present invention, a display system includes a display device, a transmitting device which generates compressed data by performing a compression process on image data corresponding to a display image, and a driver which drives the display device in response to the compressed data received from the transmitting device. The driver includes: a decompression circuit which generates decompressed data by decompressing the compressed data, an FRC circuit configured to perform an FEC process on the decompressed data to generate display data and a drive circuit which drives the display device in response to the display data. The following relation holds:

$$m_2>m_3>m_1,$$

where $m_1$ is a number of bits of the compressed data per pixel, $m_2$ is a number of bits of the decompressed data per pixel and $m_3$ is a number of bits of the display data per pixel.

In another aspect of the present invention, a display system includes: a display device, a transmitting device which generates compressed data by performing a compression process on image data corresponding to a display image and a driver which drives the display device in response to the compressed data received from the transmitting device. The driver includes a decompression circuit which generates decompressed data by decompressing the compressed data, an FRC circuit configured to perform an FEC process on the decompressed data to generate display data and a drive circuit which drives the display device in response to the display data. The transmitting device is configured to generate the compressed data by compressing the image data by using a selected compression method which is selected from a plurality of compression methods. For at least one compression method of the plurality of compression method, the FRC process is performed on at least part of the compressed data. For another compression method of the plurality of compression method, no FRC process is performed on the compression data. No FRC process is performed in the FRC circuit on a part of the decompression data corresponding to the compressed data generated by the at least one compression method, the part of the decompression data corresponding to the at least part of the compressed data. The FRC process is performed on the decompressed data corresponding to the compressed data generated by the other compression method, in generating the display data.

In still another aspect of the present invention, a display device driver includes a decompression circuit which generates decompressed data by decompressing compressed data generated by compressing image data corresponding to an display image, an FRC circuit configured to perform an FEC process on the decompressed data to generate display data and a drive circuit which drives the display device in response to the display data. The following relation holds:

$$m_2>m_3>m_1,$$

where $m_1$ is a number of bits of the compressed data per pixel, $m_2$ is a number of bits of the decompressed data per pixel and $m_3$ is a number of bits of the display data per pixel.

In still another aspect of the present invention, a display device driver includes a decompression circuit which generates decompressed data by decompressing compressed data generated by compressing image data corresponding to image data, an FRC circuit configured to perform an FEC process on the decompressed data to generate display data and a drive circuit which drives the display device in response to the display data. The compressed data are generated by compressing the image data by using a selected compression method which is selected from a plurality of compression methods. For at least one compression method of the plurality of compression method, the FRC process is performed on at least part of the compressed data. For another compression method of the plurality of compression method, no FRC process is performed on the compression data. No FRC process is performed in the FRC circuit on a part of the decompression data corresponding to the compressed data generated by the at least one compression method, the part of the decompression data corresponding to the at least part of the compressed data. The FRC process is performed on the decompressed data corresponding to the compressed data generated by the other compression method, in generating the display data.

The present invention simultaneously achieves reduction in power necessary for transferring image data and improvement in the image quality.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 3 is a diagram illustrating an exemplary format of compressed data generated by (4×1) pixel compression;

FIGS. 4A and 4B are conceptual diagrams illustrating exemplary data processing for achieving the (4×1) pixel compression;

FIG. 5 is a conceptual diagram illustrating an exemplary FRC process performed on decompressed data obtained by decompressing compressed data generated by the (4×1) pixel compression;

FIG. 6A is a table illustrating an example of FRC errors used in the FRC process;

FIG. 6B is a table illustrating an example of FRC errors used in the FRC process;

FIGS. 10A to 10H are diagrams illustrating examples of a specific pattern for which the lossless compression is to be performed;

FIG. 11 is a conceptual diagram illustrating the FRC process performed on decompressed data obtained by decompressing the compressed data generated by the lossless compression;

FIGS. 13A and 13B are conceptual diagrams illustrating exemplary data processing for achieving the (1×4) pixel compression;

FIG. 14 is a conceptual diagram illustrating the FRC process performed on decompressed data obtained by decompressing the compressed data generated by the (1×4) pixel compression;

FIGS. 17A to 17C are conceptual diagrams illustrating the decompression process of the compressed data generated by the (2+1×2) pixel compression;

FIGS. 18A and 18B are conceptual diagrams illustrating the FRC process performed on decompressed data obtained by decompressing the compressed data generated by the (2+1×2) pixel compression;

FIG. 19 is a table showing the average values of gray-level values of respective sub-pixels of respective pixels in display data illustrated in FIGS. 18A and 18B over the 4m-th to (4m+3)-th frames;

FIGS. 23A and 23B are conceptual diagrams illustrating the FRC process performed on decompressed data obtained by decompressing the compressed data generated by the (2×2) pixel compression;

FIG. 24 is a table illustrating the average values of gray-level values of respective sub-pixels of respective pixels in display data illustrated in FIGS. 23A and 23B over the 4m-th to (4m+3)-th frames;

FIG. 27 is a conceptual diagram illustrating the decompression process of the compressed data generated by the (3+1) pixel compression;

FIG. 31 is a table illustrating FRC errors used for the arrangement of the pixels in FIG. 30.

DETAILED DESCRIPTION

Figure 1:
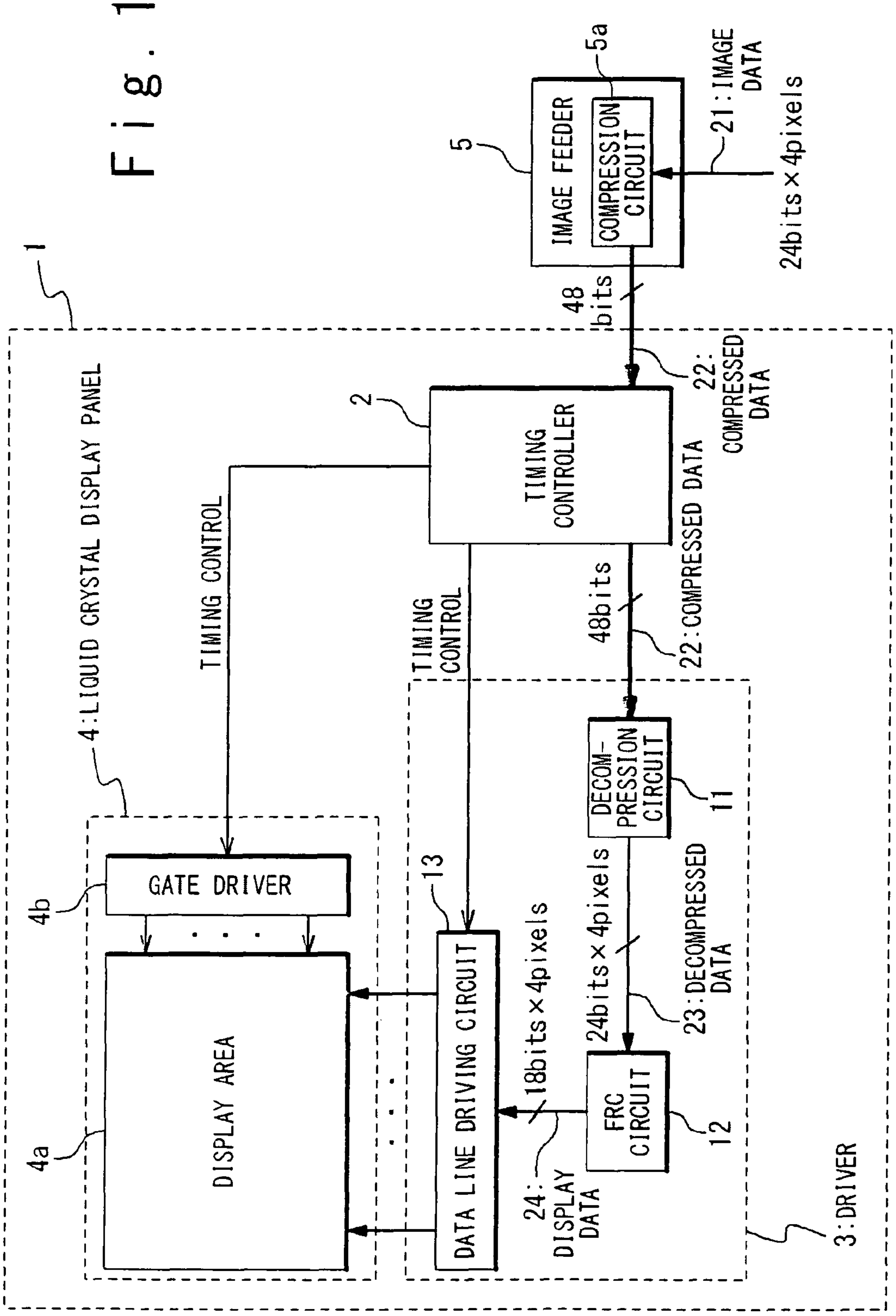
FIG. 1 is a block diagram illustrating an exemplary configuration of a liquid crystal display device according to a first embodiment of the present invention.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

First, an outline of the present invention is described in the following. The present invention employs the following approach as a technical idea for simultaneously achieving reduction in power necessary for transferring image data and improvement in the image quality. First, compressed data generated by compressing original image data are transferred from a transmitting device to a driver. The power necessary for transferring the image data from the transmitting device to the driver is reduced by transferring the compressed data. In the driver, decompressed data are generated by decompressing the compressed data. In this decompression, the number of bits $m_1$ per pixel of the compressed data obtained by compressing the image data and the number of bits $m_2$ per pixel of the decompressed data are determined to meet the following:

$$m_2>M>m_1,$$

where the number of gray-levels with which the display device can display images is $2^M$. It should be noted that the number of bits $m_2$ of the decompressed data obtained by decompressing the compressed data is intentionally determined as being larger than the number of bits M which matches the number of gray-levels $2^M$ with which the display device are able to display images.

In addition, an FRC (frame rate control) process is performed in the transmitting device or the driver in the present invention. In one embodiment, the FRC process is performed in the driver. In this case, the FRC process is performed on the decompressed data, and the display device is driven in response to display data (data actually used to drive the display device) obtained by the FRC process. The number of gray-levels with which the display device can display images is increased in a pseudo manner by the FRC process, effectively improving the image quality. In this case, the number of bits $m_3$ per pixel of the display data is determined as the number of bits M, which corresponds to the number of gray-levels $2^M$ with the display device can display images. It should be noted that the improvement in image quality by the FRC process is achieved by the architecture in which the number of bits $m_2$ of the decompressed data obtained by decompressing the compressed data is larger than the number of bits $m_3$ of the display data (i.e., the number of bits M corresponding to the number of gray-levels $2_M$ with the display device are able to display images).

It is effective to spatially disperse FRC errors (i.e., to use different FRC errors for adjacent pixels) in the FRC process. This effectively avoids an image flicker being perceived, even when a bit truncation of multiple bits (for example, 3 bits or more) is performed in the compression process.

In another embodiment, the entity which performs the FRC process is selected from the transmitting device and the driver, depending on the compression method used to generate the compressed data. Performing the FRC process in the compression process in the transmitting device has an advantage of reducing the substantial amount of information which is lost by the bit truncation process in the compression process, thereby improving the image quality. On the other hand, performing the FRC process in the driver has an advantage of achieving a good quality image when the display device is adapted to only a reduce number of gray-levels. Also, there is also an advantage of reducing a flicker caused by the FRC process in which the FRC errors are spatially dispersed, when the number of bits truncated in the compression process is large. The image quality can be further improved by switching the entity which performs the FRC process between the transmitting device and the driver, depending on the compression method, since it depends on the compression method which one of the above-described advantages should be emphasized. In the following, specific embodiments of the present invention will be described.

(First Embodiment)

FIG. 1 is a block diagram illustrating an exemplary configuration of a display system according to a first embodiment of the present invention. In this embodiment, the present invention is applied to a display system which includes a liquid crystal display device 1. The liquid crystal display device 1 includes a timing controller 2, a driver 3, and a liquid crystal display panel 4. Pixels, data lines (signal lines), and gate lines (scanning lines) are arranged in a display area 4*a* of the liquid crystal display panel 4. Each pixel include an R sub-pixel (sub-pixel for displaying red color), a G sub-pixel (sub-pixel for displaying green color), and a B sub-pixel (sub-pixel for displaying blue color), and each sub-pixel is provided at the intersection of the associated data line and gate line. In the following, pixels associated with the same gate line are referred to as pixel line. The data lines of the liquid crystal display panel 4 are driven by the driver 3, and the gate lines are driven by a gate line drive circuit 4*b* provided on the liquid crystal display panel 4.

The liquid crystal display device 1 is configured to display images on the display area 4*a* of the liquid crystal display panel 4 in response to data transferred from an image feeder 5. In this embodiment, images to be displayed are compressed and then supplied to the liquid crystal display device 1. Specifically, the image feeder 5 includes a compression circuit 5*a* that performs a compression process on image data 21 which correspond to images to be displayed (that is, data which indicate gray-level values of respective sub-pixels of respective pixels of the liquid crystal display panel 4), to thereby generate compressed data 22. The generated compressed data 22 are fed to the timing controller 2 of the liquid crystal display device 1. A DSP (digital signal processor) or a CPU (central processing unit) may be used as the image feeder 5, for example. It should be noted that the compressed data may be generated by software instead of hardware (i.e., the compression circuit 5*a*). The timing controller 2 transfers the compressed data 22 received from the image feeder 5 to the driver 3, and controls the operation timings of the driver 3 and the gate line drive circuit 4*b*.

The driver 3 is configured as an integrated circuit (IC) provided separately from the timing controller 2. The driver 3 includes a decompression circuit 11, an FRC circuit 12, and a data line drive circuit 13. The decompression circuit 11 decompresses the compressed data 22, which are received from the timing controller 2, to generate decompressed data 23. The FRC circuit 12 performs an FRC (frame rate control) process on the decompressed data 23 to generate display data 24, and feeds the display data 24 to the data line drive circuit 13. It should be noted that the FRC process refers to a color reduction process performed at a cycle period of a predetermined number of frames; errors (FRC error) used in the FRC process are switched every frame. The FRC process increases the number of gray-levels with which the liquid crystal display panel 4 can display images in a pseudo manner, effectively improving the image quality of display images on the liquid crystal display panel 4. In response to the display data 24 received from the FRC circuit 12, the data line drive circuit 13 drives the data lines of the liquid crystal display panel 4.

In this embodiment, the original image data 21 corresponding to the display image are 24-bit data in which 8 bits are allocated to each of the R, G, and B sub-pixels. That is, 24 bits are allocated to each pixel in the image data 21.

Figure 2:
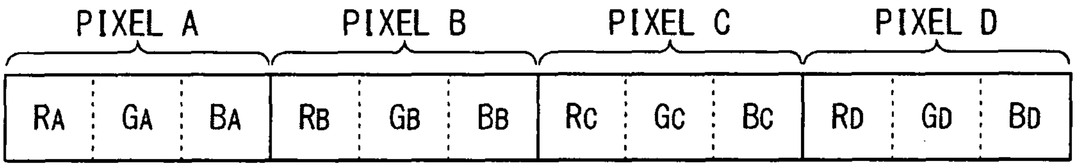
FIG. 2 is a diagram illustrating an exemplary arrangement of pixels in a target block in the first embodiment.

It should be noted that, in this embodiment, a block coding is used as the compression process, in which image data 21 are compressed in increments of blocks each composed of a plurality of pixels. More specifically, in this embodiment, each block is composed of four pixels positioned in the same pixel line, and the image data 21 are collectively compressed in increments of four pixels (total 96 bits). FIG. 2 illustrates an exemplary arrangement of four pixels in each block, and in the following, four pixels included in each block may be referred to as pixel A, pixel B, pixel C and pixel D, respectively. Each of the pixels A to D includes an R sub-pixel, a G sub-pixel, and a B sub-pixel. The R, G and B sub-pixels of the pixel A are denoted by the symbols $R_A$, $G_A$, and $B_A$, respectively. The same goes for the pixels B to D. In this embodiment, the sub-pixels $R_A$, $G_A$, $B_A$, $R_B$, $G_B$, $B_B$, $R_C$, $G_C$, Bc, $R_D$, $G_D$ and $B_D$ of the four pixels of each block are located in the same pixel line, and connected to the same gate line. The compressed data 22 generated by the compression process in the compression circuit 5*a* are data that indicate the respective gray-levels of the respective sub-pixels of the four pixels of a block by using 48 bits. That is, the compression circuit 5*a* generates the 48-bit compressed data 22 from the 96-bit image data 21. The compressed data 22 are transferred to the timing controller 2 of the liquid crystal display device 1, and further transferred to the decompression circuit 11 of the driver 3.

On the other hand, the decompressed data 23 generated by the decompression process in the decompression circuit 11 are 24-bit data in which 8 bits are allocated to each of the R, G, and B sub-pixels, as is the case of the image data 21. It should be noted that the compressed data 22 are the data that indicate the gray-levels of the respective sub-pixels of the four pixels with 48 bits; the 96-bit (=24×4) decompressed data 23 are generated from the 48-bit decompressed data 22. The decompressed data 23 are transmitted to the FRC circuit 12.

The display data 24 generated by the FRC process in the FRC circuit 12 are 18-bit data in which 6 bits are allocated to each of the R, G, and B sub-pixels. It should be noted that the number of bits of the display data 24 are determined to match the number of gray-levels with which the data line drive circuit 13 and liquid crystal display panel 4 are able to display images. That is, in this embodiment, each of the sub-pixels of the liquid crystal display panel 4 is adapted to 64 ($2^6$) gray-levels, and the data line drive circuit 13 drives each of the sub-pixels with any one of the 64 gray-levels. Here, the 96-bit (24×4) decompressed data 23 are associated with the four pixels, and this implies that the 72-bit (18×4) display data 24 are generated from the 96-bit (24×4) decompressed data 23. In this embodiment, the FRC process is performed at a cycle period of four frames to thereby achieve 256-gray-level ($2^8$) display in a pseudo manner. In general, the number of gray-levels can be increased by $2^N$ times in a pseudo manner by performing the FRC process at a cycle period of $2^N$ frames.

In the liquid crystal display device of this embodiment, the number of bits $m_1$ per pixel of the compressed data 22 obtained by compressing the original image data 21, the number of bits $m_2$ per pixel of the decompressed data 23, and the number of bits $m_3$ per pixel of the display data 24 are determined so as to satisfy the following relationship:

$$m_2 > m_3 > m_1.$$

In this embodiment, the number of bits $m_1$ of the compressed data 22 is intended to be decreased, whereas the number of bits $m_2$ of the decompressed data 23 obtained by decompressing the compressed data 22 is consciously increased to exceed the number of bits $m_3$ of the display data 24 (that is, the number of bits M which matches the number of gray-levels with which the liquid crystal display panel 4 are able to display images). Such configuration provides various advantages. First, power necessary for transmitting the image data to the driver 3 can be reduced by decreasing the number of bits $m_1$ of the compressed data 22, while a required data transfer rate can be also decreased. On the other hand, an improved image quality can be achieved in a liquid crystal display panel 4 which is not adapted to many gray-level display by intentionally determining the number of bits $m_2$ of the decompressed data 23 obtained by decompressing the compressed data 22 as being larger than the number of bits M which matches the number of gray-levels with which the liquid crystal display panel 4 is able to display images as well as performing the FRC process on the decompressed data 23 to generate the display data 24.

In the following, a detailed description is given of an exemplary compression process performed by the compression circuit 5*a*, an exemplary decompression process performed by the decompression circuit 11, and an exemplary FRC process performed by the FRC circuit 12.

In this embodiment, the compression circuit 5*a* employs a compression method which is referred to as (4×1) pixel compression in this embodiment. The (4×1) pixel compression is a sort of block coding, in which image data are compressed by determining representative values which represent data values of the image data associated with four pixels of a block to be compressed (hereinafter, simply referred to as "target block"). As will be described later, the (4×1) pixel compression is suitable for a case when there is a high correlation among the image data of the four pixels of the target block. In the following, details of the (4×1) pixel compression are described.

Figure 3:
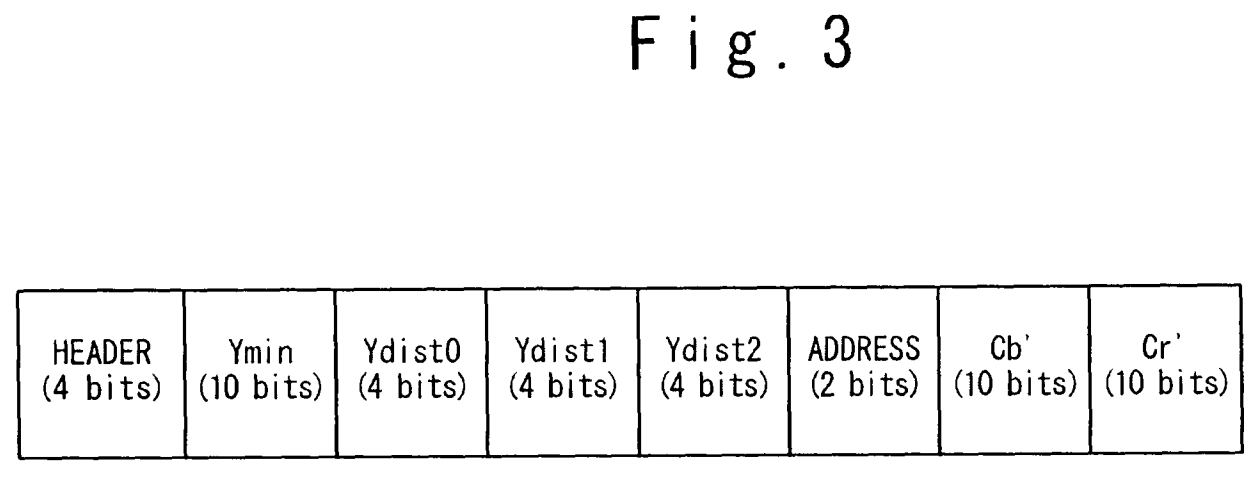

In this embodiment, as illustrated in FIG. 3, the compressed data 22 are 48-bit data composed of a header (attribute data) and the following seven data: Ymin, Ydist0 to Ydist2, address data, Cb' and Cr'.

The header indicates the attribute of the compressed data 22, and in this embodiment, allocated with 4 bits. Ymin, Ydist0 to Ydist2, address data, Cb' and Cr' are obtained by converting the image data of the four pixels of the target block from the RGB format into the YUV format, and further performing a compression process on the resultant YUV data. It should be noted that Ymin and Ydist0 to Ydist 2 are data obtained from the luma components of the YUV data associated with the four pixels of the target block, and Cb' and Cr' are obtained from the chrominance components. Ymin, Ydist0 to Ydist2, Cb' and Cr are the representative values of the image data of the four pixels of the target block. In this embodiment, 10 bits are allocated to Ymin, 4 bits are allocated to each of Ydist0 to Ydist2, 2 bits are allocated to the address data, and 10 bits are allocated to each of Cb' and Cr'. In the following, a description is given of the (4×1) pixel compression with reference to FIG. 4A.

First, the luma component data Y and the chrominance component data Cr and Cb are calculated by the following matrix calculation for each of the pixels A to D:

$$\begin{bmatrix} Y_k \\ Cr_k \\ Cb_k \end{bmatrix} = \begin{bmatrix} 1 & 2 & 1 \\ 0 & -1 & 1 \\ 1 & -1 & 0 \end{bmatrix} \begin{bmatrix} R_k \\ G_k \\ B_k \end{bmatrix},$$

where $Y_k$ is the luma component data of the pixel k; $Cr_k$ and $Cb_k$ are the chrominance component data of the pixel k; and $R_k$, $G_k$ and $B_k$ are gray-level values of R, G, and B sub-pixels of the pixel k, respectively.

Further, Ymin, Ydist0 to Ydist2, the address data, Cb' and Cr' are generated from the luma component data $Y_k$ and the chrominance component data $Cr_k$ and $Cb_k$ of the pixels A to D.

Ymin is defined as minimum one (minimum luminance data) of the luma component data $Y_A$ to $Y_D$, and Ydist0 to Ydist 2 are generated by performing a 2-bit truncation process on the differences between the remaining luma component data and the minimum luma component data Ymin. The address data are generated as data indicating which of the luma component data of the pixels A to D is minimum. In the example of FIG. 4A, Ymin, and Ydist0 to Ydist2 are calculated by the following expressions:

$$Y\min = Y_D = 4,$$

$$Ydist0 = (Y_A - Ymin) >> 2 = (48-4) >> 2 = 11,$$

$$Ydist1 = (Y_B - Ymin) >> 2 = (28-4) >> 2 = 6, \text{ and}$$

$$Ydist2 = (Y_C - Ymin) >> 2 = (16-4) >> 2 = 3,$$

where ">>2" is an operator representing the 2-bit truncation process. The address data describes that the luminance data $Y_D$ is minimum.

Further, Cr' is generated by performing a 1-bit truncation process on the sum of $Cr_A$ to $Cr_D$, and similarly, Cb' is generated by performing a 1-bit truncation process on the sum of $Cb_A$ to $Cb_D$. In the example of FIG. 4A, Cr' and Cb' are calculated by the following expressions:

$$\begin{aligned} Cr' &= (Cr_A + Cr_B + Cr_C + Cr_D) >> 1 \\ &= (2 + 1 - 1 + 1) >> 1 \\ &= 1, \end{aligned}$$

and $$\begin{aligned} Cb' &= (Cb_A + Cb_B + Cb_C + Cb_D) >> 1 \\ &= (-2 - 1 + 1 - 1) >> 1 \\ &= -1, \end{aligned}$$

where ">>1" is an operator representing the 1-bit truncation process. Thus, the generation of the compressed data 22 by the (4×1) pixel compression is completed.

FIG. 4B is a diagram illustrating a method for generating the decompressed data 23 by decompressing the compressed data 22 generated by the (4×1) pixel compression. In the decompression of the compressed data 22, first, the luma component data of the pixels A to D are restored from Ymin and Ydist0 to Ydist2. In the following, the restored luma component data of the pixels A to D are denoted by $Y_A'$ to $Y_D'$. More specifically, the value of the minimum luma component data Ymin is used as the luma component data of the pixel indicated as minimum by the address data. Further, the luma component data of the remaining pixels are restored by performing a 2-bit carry process on Ydist0 to Ydist2 and adding the resultant data to the minimum luma component data Ymin. In this embodiment, the luma component data $Y_A'$ to $Y_D'$ are restored by the following expressions:

$$Y_A' = Ydist0 \times 4 + Ymin = 44 + 4 = 48,$$

$$Y_B' = Ydist1 \times 4 + Ymin = 24 + 4 = 28,$$

$$Y_C' = Ydist2 \times 4 + Ymin = 12 + 4 = 16, \text{ and}$$

$$Y_D' = Y\ min = 4.$$

Further, the gray-level values of the R, G, and B sub-pixels of the pixels A to D are restored from the luma component data $Y_A'$ to $Y_D'$ and the chrominance component data Cr' and Cb' by the following matrix calculation:

$$\begin{bmatrix} R_k \\ G_k \\ B_k \end{bmatrix} = \begin{bmatrix} 1 & -1 & 3 \\ 1 & -1 & -1 \\ 1 & 3 & -1 \end{bmatrix} \begin{bmatrix} Y_k' \\ Cr' \\ Cb' \end{bmatrix} >> 2,$$

where ">>2" is the operator representing 2-bit truncation process. As is understood from this expression, the chrominance component data Cr' and Cb' are commonly used for the restoration of the gray-level values of the R, G and B sub-pixels of the pixels A to D.

Thus, the restoration of the gray-level values of the R, G, and B sub-pixels of the pixels A to D is completed. When comparing the values of the decompressed data 23 of the pixels A to D in the right column of FIG. 4B with the values of the image data 21 of the pixels A to D in the left column of FIG. 4A, one would understand that the original image data 21 of the pixels A to D are almost perfectly restored by the above-described decompression method.

The display data 24 are generated by performing the FRC process on the decompressed data 23. FIG. 5 is a table illustrating the values of the display data 24 obtained by performing the FRC process on the decompressed data 23 in FIG. 4B in each frame. Also, FIGS. 6A and 6B are tables illustrating an example of errors (FRC errors) used in the FRC process. It should be noted that FIG. 6A illustrates the FRC errors given to the respective sub-pixels of the respective pixels in the 4k-th to (4k+3)-th pixel lines, and FIG. 6B selectively illustrates the FRC errors given to the respective sub-pixels in the 4k-th pixel line.

The display data 24 are generated by adding the FRC errors to the gray-level values (8 bits) of the decompressed data 23 of the R, G, B sub-pixels, and then truncating the lowest 2 bits. In this embodiment, the values of the FRC errors used in the FRC process are temporally and spatially dispersed; this enables increasing the number of the gray-levels with which the liquid crystal display panel 4 is able to display images in a pseudo manner, while reducing a flicker caused by the bit truncation process in the compression process.

More specifically, in order to temporally disperse the FRC errors, the FRC error to be given to each sub-pixel of each pixel is switched at a cycle period of four frames. That is, the FRC errors given to a certain sub-pixel of a certain pixel over 4m-th and (4m+1)-th frames are different to each other.

Also, in order to temporally disperse the FRC errors, the FRC errors given to respective sub-pixels of the same color are determined as being different among the pixels A, B, C and D. For example, as illustrated in FIG. 6B, the FRC errors of the R sub-pixels of the pixels A, B, C, and D in the 4m-th frame are respectively 1, 0, 3, and 2, which are different from one another. In addition, the FRC errors are switched at spatial periods of four lines. That is, FRC errors to be given to corresponding sub-pixels of corresponding pixels are determined as being different among the 4k-th and (4k+1)-th lines.

The FRC process described above allows the display data 24, in which 6 bits are allocated to each of the R, G, and B sub-pixels, to have the same information amount as that of the decompressed data 23, in which 8 bits are allocated to each of the R, G, and B sub-pixels. By multiplying the respective gray-level values of the R, G, and B sub-pixels of the pixels A to D illustrated in FIG. 5 by four and then calculating the averages over the 4m-th to (4m+3)-th frames, for example, one would understand that the averages coincide with the values of the decompressed data 23 in FIG. 4B. That is, image display with a number of gray-levels corresponding to 8-bit image data is achieved by the display data 24 in which only 6 bits are allocated to each of the R, G, and B sub-pixels. In general, when the cycle period of the FRC process is $2^N$ frames, the FRC process involves using N-bit FRC errors and performing a truncation process of the lowest N bits.

Although the compression circuit 5*a* employs the (4×1) pixel compression and the decompression circuit 11 employs the decompression method corresponding to the same in the embodiment described above, various compression methods and decompression methods may be employed instead. Regardless of the use of any compression and decompression methods, the power necessary for transmitting the image data to the driver 3 can be reduced, and an improved image quality can be obtained in the liquid crystal display panel 4 which is not adapted to many-gray-level display, by performing the generation of the compressed data 22 by the compression circuit 5*a*, generation of the decompressed data 23 by the decompression circuit 11, and generation of the display data 24 by the FRC process in the FRC circuit 12, under the condition satisfying the following relationship:

$$m_2>m_3>m_1.$$

(Second Embodiment)

Figure 7:
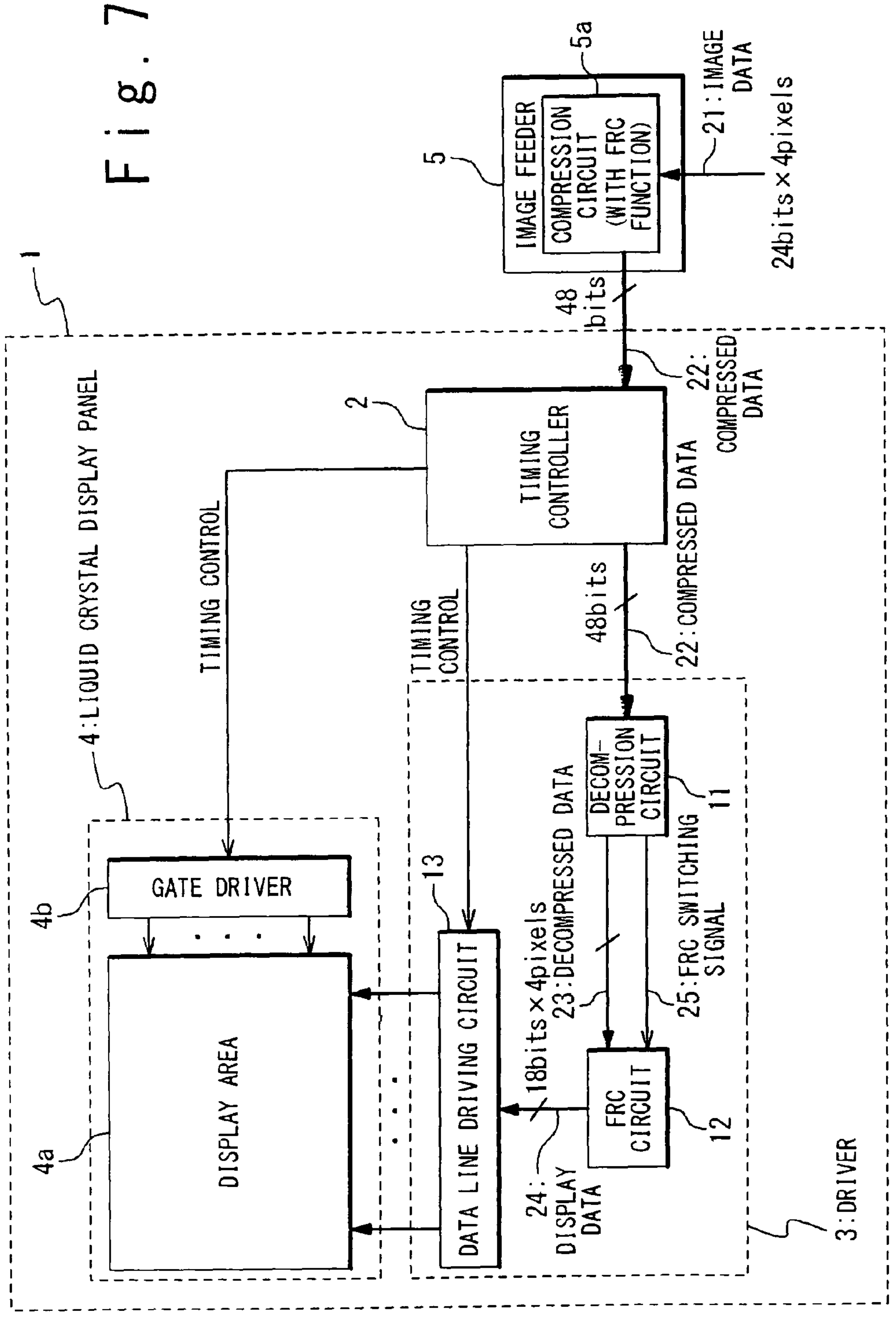
FIG. 7 is a block diagram illustrating an exemplary configuration of a liquid crystal display device according to a second embodiment of the present invention.

FIG. 7 is a block diagram illustrating an exemplary configuration of a liquid crystal display device 1 according to a second embodiment of the present invention. The liquid crystal display device 1 of the second embodiment is structured similarly to that of the liquid crystal display device 1 of the first embodiment. The difference is as follows: in the first embodiment, the (4×1) pixel compression is performed in the compression circuit 5*a* and the FRC process is performed in the FRC circuit 12 of the driver 3. In the second embodiment, on the other hand, an appropriate compression method is selected in the compression circuit 5*a* depending on the contents of image data 21, and further the entity which performs the FRC process is selected from the compression circuit 5*a* and an FRC circuit 12 of the driver 3 in accordance with the selection of the compression method. This enables further improving the image quality of the display image.

In detail, performing the FRC process in the compression circuit 5*a* has an advantage of reducing the substantial amount of information lost by, the bit truncation process in the compression process, and thereby improve the image quality. On the other hand, performing the FRC process in the driver 3 has an advantage of improving the good quality image in a case when the liquid crystal display panel 4 is able to display images only with a reduced number of gray-levels. Also, when the number of bits truncated in the compression process is large, there is also an advantage of reducing a flicker caused by performing in the driver 3 the FRC process in which the FRC errors are spatially dispersed. Which one of the above advantages should be emphasized is different depending on a compression method, and therefore the image quality can be further improved by selecting the entity that performs the FRC process between the compression circuit 5*a* and the driver 3 depending on the selected compression method. Further, the FRC process may not be performed if none of the above advantages is required.

More specifically, the compression circuit 5*a* selects one of a plurality of compression methods according to contents of image data 21 of a target block, and compresses the image data 21 of the target block with the selected compression method, to thereby generate compressed data 22. In the header of the compressed data 22, one or more compression type identification bits indicating the selected compression method are written. The generated compressed data 22 are transferred to the timing controller 2, and further transferred to the decompression circuit 11 of the driver 3. The decompression circuit 11 decompresses the compressed data 22 to generate decompressed data 23. In this decompression, the decompressed data 23 refers to the compression type identification bit(s) to determine the actually used compression method, and generates an FRC switching signal 25 in response to the determined compression method. The FRC switching signal 25 instructs the FRC circuit 12 whether or not to perform an FRC process. The FRC circuit 12 refers to the FRC switching signal 25, and if required, performs the FRC process on the decompressed data 23 to generate the display data 24. It should be noted that the FRC circuit 12 is configured to selectively perform the FRC process for the respective sub-pixels of the respective pixels of the target block individually, in response to the FRC switching signal 25. For a sub-pixel which is not subjected to the FRC process in the FRC circuit 12, the number of bits of the decompressed data 23 is the same as that of the display data 24. For a sub-pixel which is subjected to the FRC process in the FRC circuit 12, the number of bits of the decompressed data 23 is larger than the bit number of the display data 24.

In the following, a description is first given of the selection of the compression method, followed by descriptions of the compression process in each compression method, the FRC process performed in the compression circuit 5*a*, the decompression process performed in the decompression circuit 11, and FRC process performed in the FRC circuit 12.

1. Selection of Compression Method

In this embodiment, the compression circuit 5*a* compresses the received image data 21 with selected one of the following six compression methods:

Lossless compression
(1×4) pixel compression
(2+1×2) pixel compression
(2×2) pixel compression
(3+1) pixel compression
(4×1) pixel compression The lossless compression is a compression method which allows completely restoring the original image data 21 from the compressed data 22; in this embodiment, the lossless compression is used in a case when the image data of the target block falls into any of specific patterns. It should be noted that, as described above, each block is composed of pixels arranged in one row and four columns in this embodiment.

The (1×4) pixel compression is a compression method in which a process of reducing the number of bit planes is individually performed on each of the four pixels of the target block; in this embodiment, the (1×4) pixel compression is achieved by a dithering using a dither matrix. The (1×4) pixel compression is advantageous when there is a poor correlation among the image data of the four pixels.

The (2+1×2) pixel compression is a compression method in which representative values representing image data of two of the four pixels of the target block are calculated and a process of reducing the number of bit planes is individually performed on each of the other two pixels. The (2+1×2) pixel compression is advantageous when the correlation between image data of two of the four pixels is high and the correlation between image data of the other two pixels is poor.

The (2×2) pixel compression is a compression in which the four pixels of the target block are grouped into two groups each including two pixels, and the image data are compressed by determining representative values representing the image data of each group of the pixels. The (2×2) pixel compression is advantageous when the correlation between image data of two of the four pixels is high, and the correlation between image data of the other two pixels is high.

The (3+1) pixel compression is a compression method in which representative values representing image data of three of the four pixels of the target block are determined, and a process of reducing the number of bit planes is performed on image data of the other one pixel. The (3+1) pixel compression is advantageous when the correlation among the image data of the three pixels of the target block is high, and the correlation between the image data of the three pixels and that of the other one pixel is poor.

As described above, the (4×1) pixel compression is a compression method in which the image data are compressed by determining representative values representing the image data of the four pixels of the target block. The (4×1) pixel compression is advantageous when the correlation among the image data of the four pixels of the target block is high.

One advantage of selecting the compression method in this way is that image compression can be achieved with reduced block noise and granular noise. The compression scheme of this embodiment is adapted to the compression methods in which representative values corresponding to image data of some but not all of the pixels of the target block (in this embodiment, the (2+1×2) pixel compression, (2×2) pixel compression, and (3+1) pixel compression), in addition to the compression method in which representative values corresponding to the image data of all the pixels of the target block are calculated (in this embodiment, the (4×1) pixel compression), and the compression method in which a process of reducing the number of bit planes is individually performed on the image data of each of the four pixels of the target block (in this embodiment, the (1×4) pixel compression). This effectively reduces block noise and granular noise. If the compression method that independently performs the process of reducing the number of bit planes is performed on the image data of the pixels which have a high correlation, granular noise is undesirably generated, whereas the block noise occurs if block coding is performed on the image data of pixels which have a poor correlation. The compression scheme of this embodiment, which is adapted to the compression method that calculates representative values corresponding to image data of some but not all of the pixels of the target block, can avoid a situation where the process reducing the number of bit planes is performed on image data of pixels having a high correlation, and avoid a situation where the block coding is performed on image data of pixels having a poor correlation. This effectively reduces the block noise and granular noise.

In addition, it is useful for appropriately performing an inspection of a liquid crystal display panel 4 that the lossless compression is performed when the image data associated with the target block fall into any of specific patterns. In the inspection of the liquid crystal display panel 4, luminance characteristics and color gamut characteristics are evaluated. In the evaluation of the luminance characteristics and color gamut characteristics, an image of a specific pattern is displayed on the liquid crystal display panel 4. At this time, the image in which colors are reproduced faithfully to the inputted image data should be displayed on the liquid crystal display panel 4, in order to appropriately evaluate the luminance characteristics and color gamut characteristics. The luminance characteristics and color gamut characteristics cannot be appropriately evaluated if compression distortion exists. To address this, the compression circuit **5*a*** is configured to perform the lossless compression in this embodiment.

Which of the six compression methods is to be used is determined, depending on whether or not the image data associated with the target block fall into any of specific patterns, and the correlation among the image data of the four pixels within the target block. For example, when the correlation among the image data of the four pixels is high, the (4×1) pixel compression is used, whereas the (2×2) pixel compression is used when the correlation between image data of two of the four pixels is high, and the correlation between image data of the other two pixels is high.

Figure 8:
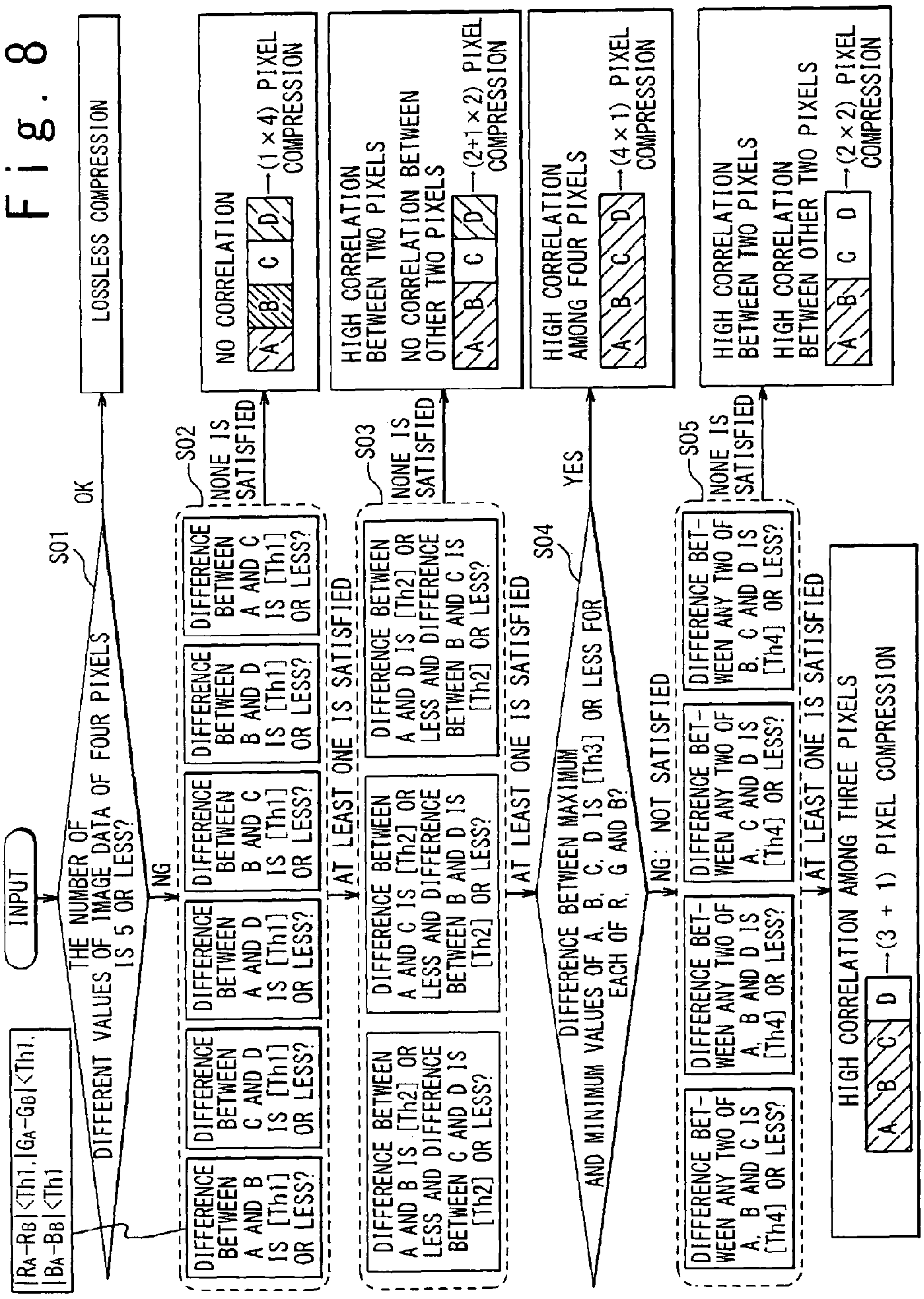
FIG. 8 is a flowchart illustrating an exemplary procedure for determining the correlation in image data in the second embodiment.

FIG. 8 is a flowchart illustrating an exemplary operation for selecting the compression method actually used in the second embodiment. In the following, the gray-level values of the R sub-pixels of the pixels A, B, C, and D are respectively referred to as $R_A$, $R_B$, $R_C$, and $R_D$; the gray-level values of the G sub-pixels of the pixels A, B, C, and D are respectively referred to as $G_A$, $G_B$, $G_C$, and $G_D$; and the gray-level values of the B sub-pixels of the pixels A, B, C, and D are respectively referred to as $B_A$, $B_B$, $B_C$, and $B_D$.

In the second embodiment, it is first determined whether or not the image data 21 of the four pixels of the target block fall into any of predetermined specific patterns (Step S01); if the image data 21 falls into any of the specific patterns, the lossless compression is performed. In this embodiment, predetermined patterns in which the number of different data values of the image data 21 of the pixels of the target block is five or less are selected as the specific patterns for which the lossless compression is performed.

Specifically, when the image data 21 of the four pixels of the target block fall into any of the following four patterns (1) to (4), the lossless compression is performed:

(1) The gray-level values of the sub-pixels of the four pixels of each color are the same (FIG. 10A)

If the image data of the four pixels of the target block satisfy the following condition (1a), the lossless compression is performed:

Condition (1a)

$$R_A=R_B=R_C=R_D,$$

$$G_A=G_B=G_C=G_D, \text{ and}$$

$$B_A=B_B=B_C=B_D.$$

In this case, the number of different data values of the image data of the four pixels of the target block is three.

(2) The gray-level values of the R, G, and B sub-pixels in each of the four pixels are the same (FIG. 10B)

When the image data of the four pixels of the target block satisfy the following condition (2a), the lossless compression is also performed:

Condition (2a)

$$R_A=G_A=B_A,$$

$$R_B=G_B=B_B,$$

$$R_C=G_C=B_C, \text{ and}$$

$$R_D=G_D=B_D.$$

In this case, the number of different data values of the image data of the four pixels of the target block is four.

(3) The gray-level values of sub-pixels of two of R, G and B colors in the four pixels of the target block are the same (FIGS. 10C to 10E)

If any one of the following three conditions (3a) to (3c) is satisfied, the lossless compression is also performed:

Condition (3a)

$$G_A=G_B=G_C=G_D=B_A=B_B=B_C=B_D.$$

Condition (3b)

$$B_A=B_B=B_C=B_D=R_A=R_B=R_C=R_D.$$

Condition (3c)

$$R_A=R_B=R_C=R_D=G_A=G_B=G_C=G_D.$$

In this case, the number of different data values of the image data of the four pixels of the target block is five.

(4) The gray-level values of sub-pixels of one of R, G and B colors are the same for the four pixels of the target block, and the gray-level values of sub-pixels of each of the other two colors are the same for the four pixels (FIGS. 10F to 10H)

Further, if any one of the following three conditions (4a) to (4c) is satisfied, the lossless compression is also performed:

Condition (4a)

$$G_A=G_B=G_C=G_D,$$

$$R_A=B_A,$$

$$R_B=B_B,$$

$$R_C=B_C, \text{ and}$$

$$R_D=B_D.$$

Condition (4b)

$$B_A=B_B=B_C=B_D,$$

$$R_A=G_A$$

$$R_B=G_B,$$

$$R_C=G_C, \text{ and}$$

$$R_D=G_D.$$

Condition (4c)

$$R_A=R_B=R_C=R_D,$$

$$G_A=B_A,$$

$$G_B=B_B,$$

$$G_C=B_C, \text{ and}$$

$$G_D=B_D.$$

In this case, the number of different data values of the image data of the four pixels of the target block is five.

When the lossless compression is not performed, the compression method is selected depending on the correlation among the four pixels. More specifically, the compression circuit 5*a* determines which of the following cases the image data of the four pixels of the target block fall into:

Case A: there are poor correlations among any combinations of image data of the four pixels of the target block.

Case B: there is a high correlation between the image data of two pixels of the target block, there is a poor correlation between image data of the previously-mentioned two pixels and the other two pixels, and there is a poor correlation between the image data of the other two pixels each other.

Case C: there is a high correlation among image data of the four pixels of the target block.

Case D: there is a high correlation among image data of three pixels of the target block, and there is a poor correlation between image data of the previously-mentioned three pixels and the other one pixel.

Case E: there is a high correlation between image data of two pixels of the target block, and there is a high correlation between image data of the other two pixels.

Specifically, if the following condition (A) is not satisfied for all combinations of i and j which meet:

$$i\in\{A,B,C,D\},$$

$$j\in\{A,B,C,D\}, \text{ and}$$

$$i\neq j,$$

the compression circuit 5*a* determines that the image data of the target block fall into Case A (i.e., there are poor correlations among any combinations of image data of the four pixels of the target block) (Step S02).

Condition (A)

$$|Ri-Rj|\leq Th1,$$

$$|Gi-Gj|\leq Th1, \text{ and}$$

$$|Bi-Bj|\leq Th1,$$

where Th1 is a predetermined threshold value. When the image data fall into Case A, the compression circuit 5*a* determines to perform the (1×4) pixel compression.

When the image data associated with the target block are not determined as falling into Case A, the compression circuit 5*a* classifies the four pixels into two groups each including two pixels, and for all the possible combinations of the groups, determines whether or not the condition is satisfied in which the difference between image data of two pixels belonging to one group is smaller than a predetermined value, and the difference between image data of two pixels belonging to the other group is smaller than the predetermined value (Step S03). More specifically, the compression circuit 5*a* determines whether or not any of the following conditions (B1) to (B3) is satisfied (Step S03):

Condition (B1)

$$|R_A-R_B|\leq Th2,$$

$$|G_A-G_B|\leq Th2,$$

$$|B_A-B_B|\leq Th2,$$

$$|R_C-R_D|\leq Th2,$$

$$|G_C-G_D|\leq Th2, \text{ and}$$

$$|B_C-B_D|\leq Th2.$$

Condition (B2)

$$|R_A-R_D\leq Th2,$$

$$|G_A-G_C|\leq Th2,$$

$$|B_A-B_C|\leq Th2,$$

$$|R_B-R_D|\leq Th2,$$

$$|G_B-G_D|\leq Th2, \text{ and}$$

$$|B_B-B_D|\leq Th2$$

Condition (B3)

$$|R_A-R_D|\leq Th2,$$

$$|G_A-G_D|\leq Th2,$$

$$|B_A-B_D|\leq Th2,$$

$$|R_B-R_C|\leq Th2,$$

$$|G_B-G_C|\leq Th2, \text{ and}$$

$$|B_B-B_C|\leq Th2.$$

It should be noted that Th2 is a predetermined threshold value.

If none of the above conditions (B1) to (B3) is satisfied, the compression circuit 5*a* determines that the image data associated with the target block fall into Case B (i.e., there is a high correlation between the image data of two pixels of the target block, there is a poor correlation between image data of the previously-mentioned two pixels and the other two pixels, and there is a poor correlation between the image data of the other two pixels each other). In this case, the compression circuit 5*a* determines to perform the (2+1×2) pixel compression.

If the image data associated with the target block do not fall into any of Cases A and B, the compression circuit 5*a* determines whether or not the difference between the maximum and minimum values of image data of the four sub-pixels is smaller than a predetermined value for each color. More specifically, the compression circuit 5*a* determines whether or not the following condition (C) is satisfied (Step S04):

Condition (C)

$$\max(R_A,R_B,R_C,R_D)-\min(R_A,R_B,R_C,R_D)<Th3,$$

$$\max(G_A,G_B,G_C,G_D)-\min(G_A,G_B,G_C,G_D)<Th3,$$

and $$\max(B_A,B_B,B_C,B_D)-\min(B_A,B_B,B_C,B_D)<Th3.$$

If the condition (C) is satisfied, the compression circuit 5*a* determines that the image data associated with the target block fall into Case C (there is a high correlation among image data of the four pixels of the target block). In this case, the compression circuit 5*a* determines to perform the (4×1) pixel compression.

If the condition (C) is not satisfied, on the other hand, the compression circuit 5*a* determines whether a condition is satisfied in which there is a high correlation among image data of any of combinations of three pixels of the target block, and there is a poor correlation between image data of the other one pixel and the three pixels (Step S05). More specifically, the compression circuit 5*a* determines whether or not any of the following conditions (D1) to (D4) is satisfied (Step S05):

Condition (D1)

$$|R_A-R_B|\leq Th4,$$

$$|G_A-G_B|\leq Th4,$$

$$|B_A-B_B|\leq Th4,$$

$$|R_B-R_C|\leq Th4,$$

$$|G_B-G_C|\leq Th4,$$

$$|B_B-B_C|\leq Th4,$$

$$|R_C-R_A|\leq Th4,$$

$$|G_C-G_A|\leq Th4, \text{ and}$$

$$|B_C-B_A|\leq Th4.$$

Condition (D2)

$$|R_A-R_B|\leq Th4,$$

$$|G_A-G_B|\leq Th4,$$

$$|B_A-B_B|\leq Th4,$$

$$|R_B-R_D|\leq Th4,$$

$$|G_B-G_D|\leq Th4,$$

$$|B_B-B_D|\leq Th4,$$

$$|R_D-R_A|\leq Th4,$$

$$|G_D-G_A|\leq Th4, \text{ and}$$

$$|B_D-B_A|\leq Th4.$$

Condition (D3)

$$|R_A-R_C|\leq Th4,$$

$$|G_A-G_C|\leq Th4,$$

$$|B_A-B_C|\leq Th4,$$

$$|R_C-R_D|\leq Th4,$$

$$|G_C-G_D|\leq Th4,$$

$$|B_C-B_D|\leq Th4,$$

$$|R_D-R_A|\leq Th4,$$

$$|G_D-G_A|\leq Th4, \text{ and}$$

$$|B_D-B_A|\leq Th4.$$

Condition (D4)

$$|R_B-R_C|\leq Th4,$$

$$|G_B-G_C|\leq Th4,$$

$$|B_B-B_C|\leq Th4,$$

$$|R_C-R_D|\leq Th4,$$

$$|G_C-G_D|\leq Th4,$$

$$|B_C-B_D|\leq Th4,$$

$$|R_D-R_B|\leq Th4,$$

$$|G_D-G_B|\leq Th4, \text{ and}$$

$$|B_D-B_B|\leq Th4.$$

If any of the conditions (D1) to (D4) is satisfied, the compression circuit 5*a* determines that the image data associated with the target block fall into Case D (i.e., there is a high correlation among image data of three pixels of the target block, and there is a poor correlation between image data of the previously-mentioned three pixels and the other one pixel). In this case, the compression circuit 5*a* determines to perform the (3+1) pixel compression.

If none of the above conditions (D1) to (D4) is satisfied, the compression circuit 5*a* determines that the image data associated with the target block fall into Case E (i.e., there is a high correlation between image data of two pixels of the target block, and there is a high correlation between image data of the other two pixels). In this case, the compression circuit 5*a* determines to perform the (2×2) pixel compression.

On the basis of the correlations determined as described above, the compression circuit 5*a* selects one of the (1×4) pixel compression, (2+1×2) pixel compression, (2×2) pixel compression, (3+1) pixel compression and (4×1) pixel compression. As will be described later, the selected compression method is used to compress the image data 21 associated with the target block.

2. Details of Compression Method, Decompression Method, and FRC Process

In the following, details of the compression and decompression methods, and the FRC process performed in the compression circuit 5*a* or FRC circuit 12 are described, with respect to each of the lossless compression, (1×4) pixel compression, (2+1×2) pixel compression, (2×2) pixel compression, (3+1) pixel compression and (4×1) pixel compression.

2-1. Lossless Compression

In this embodiment, the lossless compression is achieved by rearranging data values of the image data 21 of the pixels of the target block. An FRC process is performed in the FRC circuit 12 of the driver 3; the compression circuit 5*a* does not perform any FRC process.

Figure 9:
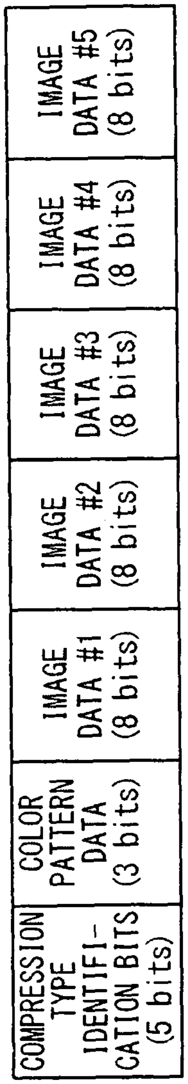
FIG. 9 is a diagram illustrating an exemplary format of compressed data generated by a lossless compression.

FIG. 9 is a diagram illustrating an exemplary format of the compressed data 22 generated by the lossless compression. In this embodiment, the compressed data 22 generated by the lossless compression are 48-bit data composed of a header (attribute data) including compression type identification bits, color pattern data and image data #1 to #5.

The compression type identification bits are indicative of the compression method actually used for the compression. In the compressed data generated by the lossless compression, 5 bits are allocated to the compression type identification bits. In this embodiment, the value of the compression type identification bits of the compressed data is "11111" for the loss less compression.

The color pattern data indicate which of the above-described patterns shown in FIGS. 10A to 10H the image data of the four pixels of the target block fall into. In this embodiment, the eight specific patterns are defined, and therefore the color pattern data are 3-bit data.

The image data #1 to #5 are obtained by rearranging the data values of the image data of the four pixels of the target block. The image data #1 to #5 are each 8-bit data. As described above, the number of different data values of the image data of the four pixels of the target block is five or less, and therefore all of the data values can be incorporated into the image data #1 to #5.

The decompression of the compressed data 22 generated by the above lossless compression is achieved by rearranging the image data #1 to #5 on the basis of the color pattern data. The color pattern data indicate which of the patterns in FIGS. 10A to 10H the image data of the four pixels of the target block fall into, and therefore the same data as the original image data 21 of the four pixels of the target block can be completely restored as the decompressed data 21 by referring to the color pattern data.

When the lossless compression is performed in the compression circuit 5*a*, the FRC process is performed in the FRC circuit 12 of the driver 3. Specifically, when recognizing from the compression type identification bits that the compressed data 22 are generated by the lossless compression, the decompression circuit 11 instructs the FRC circuit 12 to perform an FRC process by sending the FRC switching signal 25. In the FRC process, the display data 24 are generated by adding FRC errors to the gray-level values (8-bit) of the R, G, and B sub-pixels of the decompressed data 23, and then truncating the lowest 2 bits. In the display data 24, 6 bits are allocated to each sub-pixel of each pixel. That is, the display data 24 are data in which 18 bits are allocated to each pixel. The values illustrated in FIGS. 6A and 6B are used as the FRC errors.

FIG. 11 is a table illustrating contents of the display data 24 generated by performing the FRC process on the decompressed data 23 having the contents shown in FIG. 10A (that is, the decompressed data 23 obtained by decompressing the compressed data 22 obtained by compressing the image data 21 having the contents in FIG. 10A with the lossless compression). The FRC process allows the display data 24, in which 6 bits are allocated to each of the R, G and B sub-pixels, to have the same information amount as that of the decompressed data 23, in which 8 bits are allocated to each of the R, G and B sub-pixels. By multiplying the respective gray-level values of the R, G and B sub-pixels of the pixels A to D illustrated in FIG. 11 by 4 then calculating the averages thereof over the 4m-th to (4m+3)-th frames, one would understand that the averages coincide with the values of the decompressed data 23 having the contents shown in FIG. 10A. That is, by using the display data 24 in which 6 bits are allocated to each of the R, G, and B sub-pixels, image display with the number of gray-levels corresponding to 8 bits is achieved in a pseudo manner. By driving the liquid crystal display panel 4 in response to the display data 24 generated by performing the FRC process on the completely restored decompressed data 23, the luminance characteristics and the color gamut characteristics of the liquid crystal display panel 4 can be adequately evaluated.

2-2. (1×4) Pixel Compression

Figure 12:
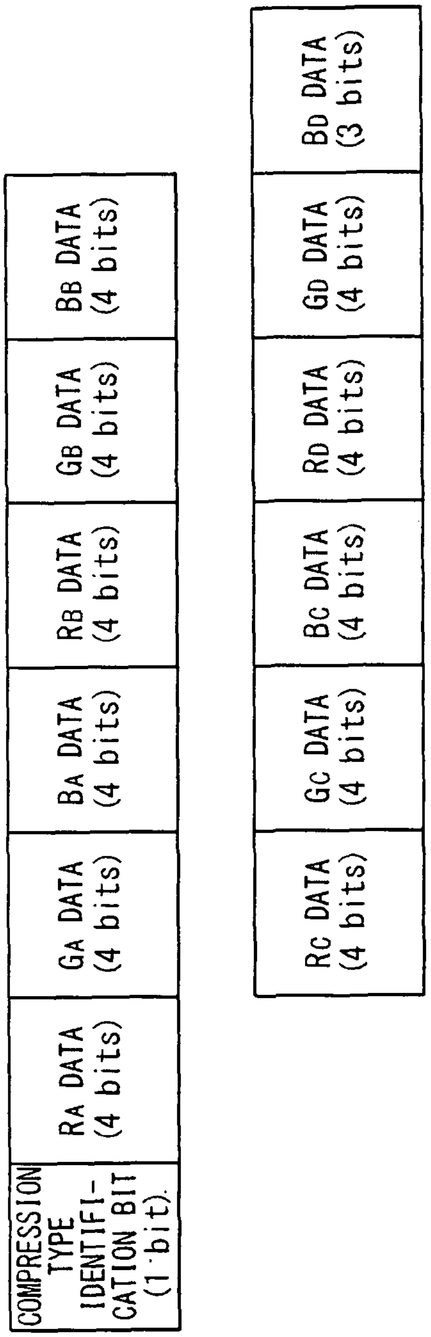
FIG. 12 is a diagram illustrating an exemplary format of compressed data generated by (1×4) pixel compression.

FIG. 12 is a conceptual diagram illustrating an exemplary format of the compressed data 22 generated by the (1×4) pixel compression, and FIG. 13A is a conceptual diagram illustrating the (1×4) pixel compression. As described above, the (1×4) pixel compression is used in a case when there are poor correlations among any combinations of image data of the four pixels of the target block.

In this embodiment, as illustrated in FIG. 12, the compressed data 22 generated by the (1×4) pixel compression are 48-bit data composed of a header (attribute data) including a compression type identification bit, $R_A$ data, $G_A$ data, $B_A$ data, $R_B$ data, $G_B$ data, $B_B$ data, $R_C$ data, $G_C$ data, $B_C$ data, $R_D$ data, $G_D$ data and $B_D$ data. The $R_A$, $G_A$ and $B_A$ data are associated with the image data of the pixel A, and the $R_B$, $G_B$ and $B_B$ data are associated with the image data of the pixel B. Correspondingly, $R_C$, $G_C$ and $B_C$ data are associated with the image data of the pixel C, and $R_D$, $G_D$ and $B_D$ data are associated with the image data of the pixel D. The compression type identification bit indicates the actually used compression method; in the compressed data 22 generated by the (1×4) pixel compression, one bit is allocated to the compression type identification bit. In this embodiment, the value of the compression type identification bit of the compressed data 22 generated by the (1×4) pixel compression is "0".

The $R_A$, $G_A$ and $B_A$ data are, on the other hand, bit-plane-reduced data obtained by performing a process of reducing the number of bit planes on the gray-level values of the R, G and B sub-pixels of the pixel A, and the $R_B$, $G_B$ and $B_B$ data are bit-plane-reduced data obtained by performing a process of reducing the number of bit planes on the gray-level values of the R, G, and B sub-pixels of the pixel B. Similarly, the $R_C$, $G_C$ and $B_C$ data are bit-plane-reduced data obtained by performing a process of reducing the number of bit planes on the gray-level values of the R, G, and B sub-pixels of the pixel C, and the $R_D$, $G_D$ and $B_D$ data are bit-plane-reduced data obtained by performing a process of reducing the number of bit planes on the gray-level values of the R, G, and B sub-pixels of the pixel D. In this embodiment, only the $B_D$ data associated with the B sub-pixel of the pixel D are 3-bit data, and the others are 4-bit data.

In the following, a description is given of the (1×4) pixel compression performed in the compression circuit 5*a* with reference to FIG. 13A. In the (1×4) pixel compression, a dithering process using a dither matrix is performed on the image data of each of the pixels A to D to reduce the number of bit planes of the image data of each of the pixels A to D. More specifically, performed first is a process that adds error data α to each of the data values of the image data of the pixels A, B, C, and D. In this embodiment, the error data α for each pixel is determined on the basis of a fundamental matrix, which is a Bayer matrix, from the coordinates of the pixel. The calculation of the error data α will be separately described later. In the following, it is assumed that error data α are set to 0, 5, 10 and 15 for the pixels A, B, C and D, respectively.

Further, a rounding process is then performed to generate the $R_A$ data, $G_A$ data, $B_A$ data, $R_B$ data, $G_B$ data, $B_B$ data, $R_C$ data, $G_C$ data, data, $R_D$ data, $G_D$ data and $B_D$ data. It should be noted that the rounding process means a process of adding a value of $2^{(n-1)}$ and then truncates the lowest n bits for a desired natural number n. Specifically, a process of adding a value of 16 and then truncating the lowest 5 bits is performed on the gray-level value of the B sub-pixel of the pixel D. For the other gray-level values, a process of adding a value of 8 and then truncating the lowest 4 bits is performed. The generation of the compressed data 22 by the (1×4) pixel compression is finally completed by attaching a value "0" as the compression type identification bit to the $R_A$ data, $G_A$ data, $B_A$ data, $R_B$ data, $G_B$ data, $B_B$ data, $R_C$ data, $G_C$ data, $B_C$ data, $R_D$ data, $G_D$ data, and $B_D$ data generated in this manner.

FIG. 13B is a diagram illustrating a decompression method for the compressed data 22 generated by the (1×4) pixel compression. In the decompression of the compressed data 22 generated by the (1×4) pixel compression, a bit carry is first performed on the $R_A$ data, $G_A$ data, $B_A$ data, $R_B$ data, $G_B$ data, $B_B$ data, $R_C$ data, $G_C$ data, $B_C$ data, $R_D$ data, $G_D$ data and $B_D$ data. More specifically, a 5-bit carry is performed on the $B_D$ data associated with the B sub-pixel of the pixel D, and 4-bit carry is performed on the other data.

Further, the error data α are subtracted from the data obtained by the bit-carry process to complete the decompression of the compressed data 22. This results in that the decompressed data 23 are generated for the pixels A to D. The decompressed data 23 almost coincides with the original image data 21. When comparing the gray-level values of the respective sub-pixels of the pixels A to D in the decompressed data 23 shown in FIG. 13B with the gray-level values of the respective sub-pixels of the pixels A to D in the image data 21 shown in FIG. 13A, one would understand the original image data 21 of the pixels A to D are almost completely restored by the above-mentioned decompression method.

When the (1×4) pixel compression is performed in the compression circuit 5*a*, an FRC process is performed in the FRC circuit 12 of the driver 3. Specifically, the decompression circuit 11 recognizes from the compression type identification bit that the compressed data 22 are generated by the (1×4) pixel compression, and instructs the FRC circuit 12 to perform an FRC process by sending the FRC switching signal 25. In the FRC process, the display data 24 are generated by adding FRC errors to the 8-bit gray-level values of the R, G, and B sub-pixels in the decompressed data 23, and then truncating the lowest 2 bits. In the display data 24, 6 bits are allocated to each of the sub-pixels of each of the pixels. That is, the display data 24 are data in which 18 bits are allocated to each pixel. The values illustrated in FIGS. 6A and 6B are used as the FRC errors.

FIG. 14 is a table illustrating the contents of the display data 24 generated by performing the FRC process on the decompressed data 23 shown in FIG. 13B. The FRC process allows the display data 24, in which 6 bits are allocated to each of the R, G, and B sub-pixels, to have the same information amount as that of the decompressed data 23, in which 8-bits are allocated to each of the R, G, and B sub-pixels. When multiplying the respective gray-level values of the R, G, and B sub-pixels of the pixels A to D illustrated in FIG. 14 by four and then calculating the averages thereof over the 4m-th to (4m+3)-th frames, one would understand that the averages coincide with the gray-level values of the respective sub-pixels of the pixels A to D in the decompressed data 23 shown in FIG. 13B. This also means implies that the display data 24 well represent the original image data 21. That is, image display with the number of gray-levels corresponding to 8 bits is achieved in a pseudo manner by using the display data 24, in which 6 bits are allocated to each of the R, G, and B sub-pixels.

2-3. (2+1×2) Pixel Compression

Figure 15:
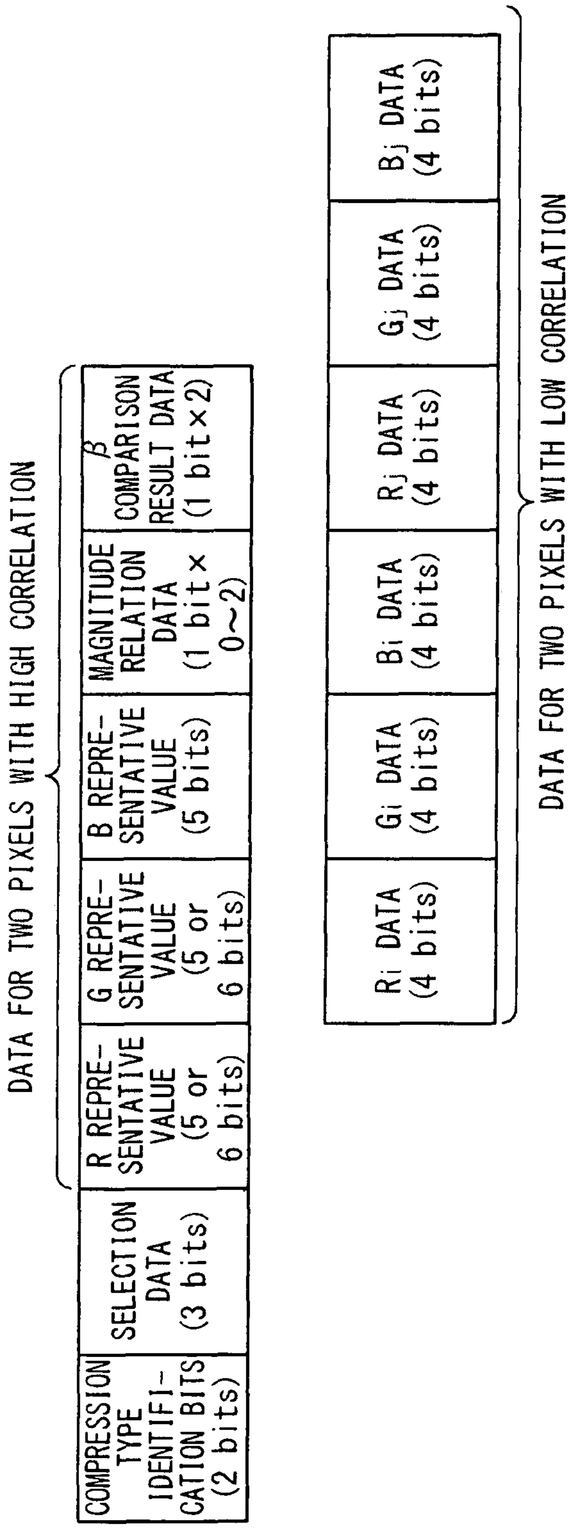
FIG. 15 is a diagram illustrating an exemplary format of compressed data generated by (2+1×2) pixel compression.
Figure 16:
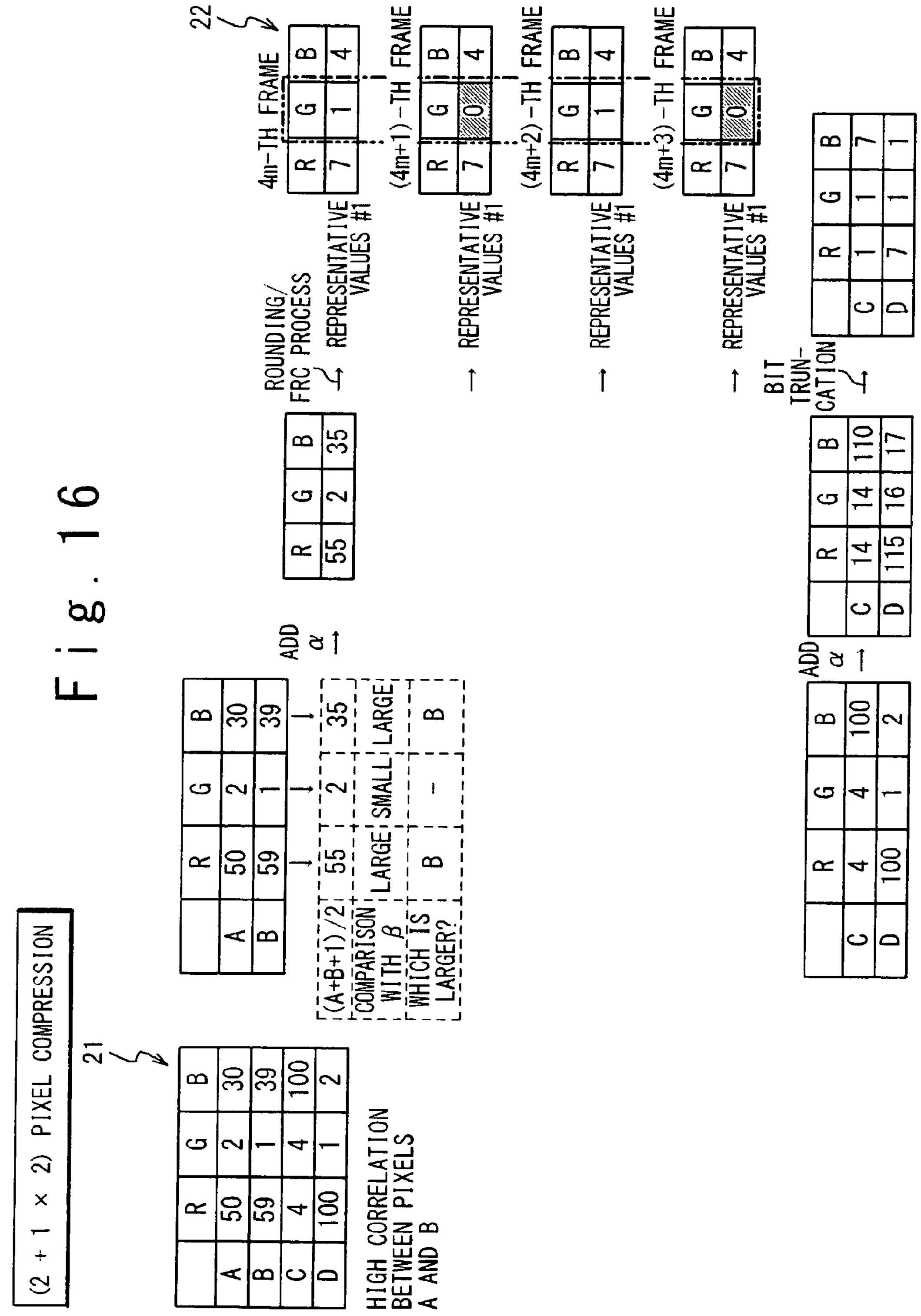
FIG. 16 is a conceptual diagram illustrating exemplary data processing for achieving the (2+1×2) pixel compression.

FIG. 15 is a conceptual diagram illustrating an exemplary format of the compressed data 22 generated by the (2+1×2) pixel compression, and FIG. 16 is a conceptual diagram illustrating the (2+1×2) pixel compression. As described above, the (2+1×2) pixel compression is employed when there is a high correlation between the image data of two pixels of the target block, there is a poor correlation between image data of the previously-mentioned two pixels and the other two pixels, and there is a poor correlation between the image data of the other two pixels each other. In this embodiment, as illustrated in FIG. 16, the compressed data 22 generated by the (2+1×2) pixel compression are composed of a header including compression type identification bits, selection data, an R representative value, a G representative value, a B representative value, magnitude relation data, β comparison result data, Ri data, Gi data, Bi data, Rj data, Gj data and Bj data. The compressed data 22 generated by the (2+1×2) pixel compression are 48-bit data, as is the case of the above-described compressed data 22 generated by the (1×4) pixel compression.

The compression type identification bits indicate the actually used compression method, and two bits are allocated to the compression type identification bits in the compressed data 22 generated by the (2+1×2) pixel compression. In this embodiment, the value of the compression type identification bits of the compressed data 22 generated by the (2+1×2) pixel compression is "10".

The selection data are 3-bit data indicating which two pixels have a high correlation in the corresponding image data. When the (2+1×2) pixel compression is used, the correlation between image data of two of the pixels A to D is high, and the correlation between image data of said two pixels and those of the remaining two pixels is poor. Accordingly, the number of combinations of the highly-correlated two pixels is six as follows:

Pixels A and C
Pixels B and D
Pixels A and B
Pixels C and D
Pixels B and C
Pixels A and D The selection data indicates, by using three bits, which of these six combinations the highly-correlated two pixels fall into.

The R, G and B representative values are values representing the gray-level values of the R, G and B sub-pixels of the highly-correlated two pixels, respectively. In the example of FIG. 16, the R and G representative values are each 5-bit or 6-bit data, and the B representative value is 5-bit data.

The β comparison result data indicate whether or not the difference between the gray-level values of the R sub-pixels of the highly-correlated two pixels, and the difference between the gray-level values of the G sub-pixels of the highly-correlated two pixels are larger than a predetermined threshold value β. In this embodiment, the β comparison data are 2-bit data.

On the other hand, the magnitude relation data indicate which of the highly-correlated two pixels incorporates the R sub-pixel having the larger gray-level value, and which of the highly-correlated two pixels incorporates the G sub-pixel having the larger gray-level value. The magnitude relation data associated with the R sub-pixels are generated only when the difference between the gray-level values of the R sub-pixels of the highly-correlated two pixels is larger than the threshold value β, and the magnitude relation data associated with the G sub-pixels are generated only when the difference between the gray-level values of the G sub-pixels of the highly-correlated two pixels is larger than the threshold value β. Accordingly, the magnitude relation data are 0 to 2-bit data.

The Ri data, Gi data, Bi data, Rj data, Gj data, and Bj data are bit-plane-reduced data obtained by performing a process of reducing the number of bit planes on the gray-level values of the R, G and B sub-pixels of the poorly-correlated two pixels. In this embodiment, all of the Ri data, Gi data, Bi data, Rj data, Gj data and Bj data are 4-bit data.

In the following, a description is given of the (2+1×2) pixel compression with reference to FIG. 16. FIG. 16 illustrates the generation of the compressed data 22 by the (2+1×2) pixel compression in a case when the correlation between the image data of the pixels A and B is high; the correlation between the image data of the pixels C and D and the image data of the pixels A and B is poor; and the correlation between the image data of the pixels C and D is poor. The person skilled in the art would easily understand that the compressed data 22 can also be generated in the same manner for different cases.

First, the compression process of the image data of the pixels A and B (which have a high correlation) is described. First, the average value of the gray-level values is first calculated for each of the R, G, and B sub-pixels. The average values Rave, Gave and Bave of the gray-level values of the R, G and B sub-pixels are calculated by the following expressions:

$$Rave=(R_A+R_B+1)/2,$$

$$Gave=(G_A+G_B+1)/2, \text{ and}$$

$$Bave=(B_A+B_B+1)/2.$$

Further, the difference between the gray-level values of the R sub-pixels of the pixels A and B $|R_A-R_B|$ and the difference between the gray-level values of the G sub-pixels $|G_A-G_B|$ are compared with the predetermined threshold value β. The result of the comparison is described in the compressed data 22 generated by the (2+1×2) pixel compression as the β comparison result data.

Further, the magnitude relation data are generated by the following procedure, for the R and G sub-pixels of the pixels A and B: When the difference between the gray-level values of the R sub-pixels of the pixels A and B $|R_A-R_B|$ is larger than the threshold value β, the magnitude relation data are generated so as to describe which of the gray-level values of the R sub-pixels of the pixels A and B is larger. When the difference between the gray-level values of the R sub-pixels of the pixels A and B $|R_A-R_B|$ is equal to or smaller than the threshold value β, the magnitude relation data are generated so as not to describe the magnitude relation between the gray-level values of the R sub-pixels of the pixels A and B. Similarly, when the difference between the gray-level values of the G sub-pixels of the pixels A and B $|G_A-G_B|$ is larger than the threshold value β, the magnitude relation data are generated to describe which of the gray-level values of the G sub-pixels of the pixels A and B is larger. When the difference between the gray-level values of the G sub-pixels of the pixels A and B $|R_A-R_B|$ is equal to or smaller than the threshold value β, the magnitude relation data are generated so as not to describe the magnitude relation between the gray-level values of the G sub-pixels of the pixels A and B is not described in.

In the example of FIG. 16, the gray-level values of the R sub-pixels of the pixels A and B are respectively 50 and 59, and the threshold value β is 4. In this case, the difference in gray-level value $|R_A-R_B|$ is larger than the threshold value β, and therefore this fact is described in the β comparison result data. Also, the fact that the gray-level value of the R sub-pixel of the pixel B is larger than that of the R sub-pixel of the pixel A is described in the magnitude relation data. On the other hand, the gray-level values of the G sub-pixels of the pixels A and B are respectively 2 and 1. The difference in gray-level value $|G_A-G_B|$ is smaller than the threshold value β, and therefore this fact is described in the β comparison result data. The magnitude relation data are generated so as not to describe the magnitude relation between the gray-level values of the G sub-pixels of the pixels A and B. As a result, the magnitude relation data are 1-bit data in the example of FIG. 16.

Subsequently, error data α are added to the average values Rave, Gave, and Bave of the gray-level values of the R, G, and B sub-pixels. In this embodiment, the error data α are determined by using a fundamental matrix from the coordinates of the two pixels of each combination. The calculation of the error data α will be separately described later. In the following, it is assumed that the error data α set for the pixels A and B are 0.

Further, a rounding process or FRC process is performed to calculate the R, G, and B representative values. For the R or G representative value, which of the rounding process and FRC process is selected is determined depending on the magnitude relation between the difference between the gray-level values of the R sub-pixels $|R_A-R_B|$ and the threshold value β, or the magnitude relation between the difference between the gray-level values of the G sub-pixels $|G_A-G_B|$ and the threshold value β.

In detail, when the difference between the gray-level values of the R sub-pixels $|R_A-R_B|$ is larger than the threshold value β, the rounding process is performed on the average value Rave of the gray-level values of the R sub-pixels (after the error data a are added). Specifically, a process of adding a constant value of 4 to the average value Rave of the gray-level values of the R sub-pixels and then truncating the lowest 3 bits is performed. When the difference between the gray-level values of the R sub-pixels $|R_A-R_B|$ is equal to or smaller than the threshold value β, on the other hand, an FRC process is performed on the average value Rave of the gray-level values of the R sub-pixels. Specifically, a process of adding an FRC error to the average value Rave of the gray-level values of the R sub-pixels (after the error data α are added) and then truncating the lowest 2 bits is performed. The FRC error used in the FRC process has a value selected from 0 to 3, and the FRC error used for a specific target block is switched every frame at a cycle period of four frames. As thus described, the rounding process or FRC process is performed on the average value Rave of the gray-level values of the R sub-pixels (after the error data α are added), and thereby the R representative value is calculated.

Similarly, when the difference between the gray-level values of the G sub-pixels $|G_A-G_B|$ is larger than the threshold value β, the rounding process is performed on the average value Gave of the gray-level values of the G sub-pixels (after the error data α are added). Specifically, a process of adding a constant value of 4 to the average value Gave of the gray-level values of the G sub-pixels and then truncating the lowest 3 bits is performed to calculate the G representative value. When the difference between the gray-level values of the G sub-pixels $|G_A-G_B|$ is equal to or smaller than the threshold value β, on the other hand, an FRC process is performed on the average value Gave of the gray-level values of the G sub-pixels. Specifically, a process of adding an FRC error to the average value Gave of the gray-level values of the G sub-pixels (after the error data α are added) and then truncating the lowest 2 bits is performed. The FRC error used in the FRC process has a value selected from 0 to 3, and the FRC error used for a specific target block is switched every frame at a cycle period of four frames.

For the B representative value, on the other hand, the B representative value is calculated by adding the constant value of 4 to the average value Bave of the gray-level values of the B sub-pixels and then performing a rounding process that truncates the lowest 3 bits.

In the example of FIG. 16, the rounding process is performed in the calculation of the R and B representative values of the pixels A and B, whereas the FRC process is performed in the calculation of the G representative value. FIG. 16 illustrates the G representative values for a case when the values of the FRC errors used to obtain the G representative values in the 4m-th frame, (4m+1)-th frame, (4m+2)-th frame, and (4m+3)-th frame are 2, 0, 3, and 1, respectively. For example, the G representative value is calculated in the 4m-th frame, by adding the value (=2) of the FRC error to the average value Gave (=2) of the gray-level values of the G sub-pixels, and then truncating the lowest 2 bits. The G representative value in the 4m-th frame is obtained by the following expression:

$$\begin{aligned}(G \text{ representative value}) &= (2+2)/4,\\ &= 1.\end{aligned}$$

The same goes for the other frames.

For the image data of the pixels C and D (which are poorly correlated), on the other hand, the same process as the (1×4) pixel compression is performed. That is, a dither process using a dither matrix is independently performed on each of the pixels C and D, to thereby reduce the number of bit planes of each of the image data of the pixels C and D. Specifically, first, a process of adding error data α to each of the image data of the pixels C and D is performed. As described above, the error data α for each pixel are calculated from the coordinates of the pixel. In the following, it is assumed that the error data α set for the pixels C and D are 10 and 15, respectively.

Further, the rounding process is performed to generate $R_C$ data, $G_C$ data, $B_C$ data, $R_D$ data, $G_D$ data and $B_D$ data. Specifically, a process of adding a value of 8 to each of the gray-level values of the R, G and B sub-pixels of each of the pixels C and D, and then truncating the lowest 4 bits is performed. As a result, the $R_C$ data, $G_C$ data, $B_C$ data, $R_D$ data, $G_D$ data, and $B_D$ data are calculated.

The compressed data 22 are finally generated by attaching the R, G, and B representative values, magnitude relation data, β comparison result data, $R_C$ data, $G_C$ data, $B_C$ data, $R_D$ data, $G_D$ data, and $B_D$ data generated as described above with the compression type identification bits and the selection data.

Figure 17A:
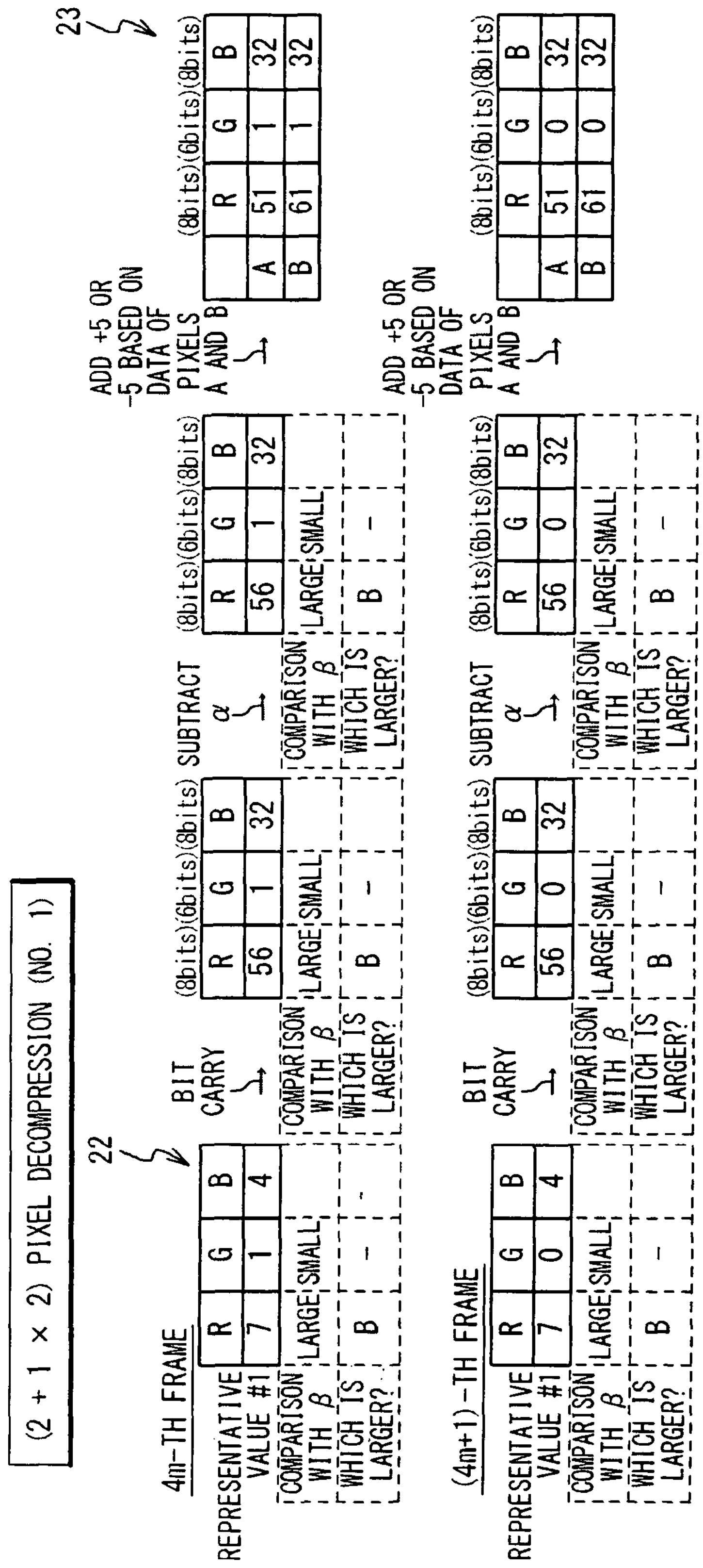
Figure 17B:
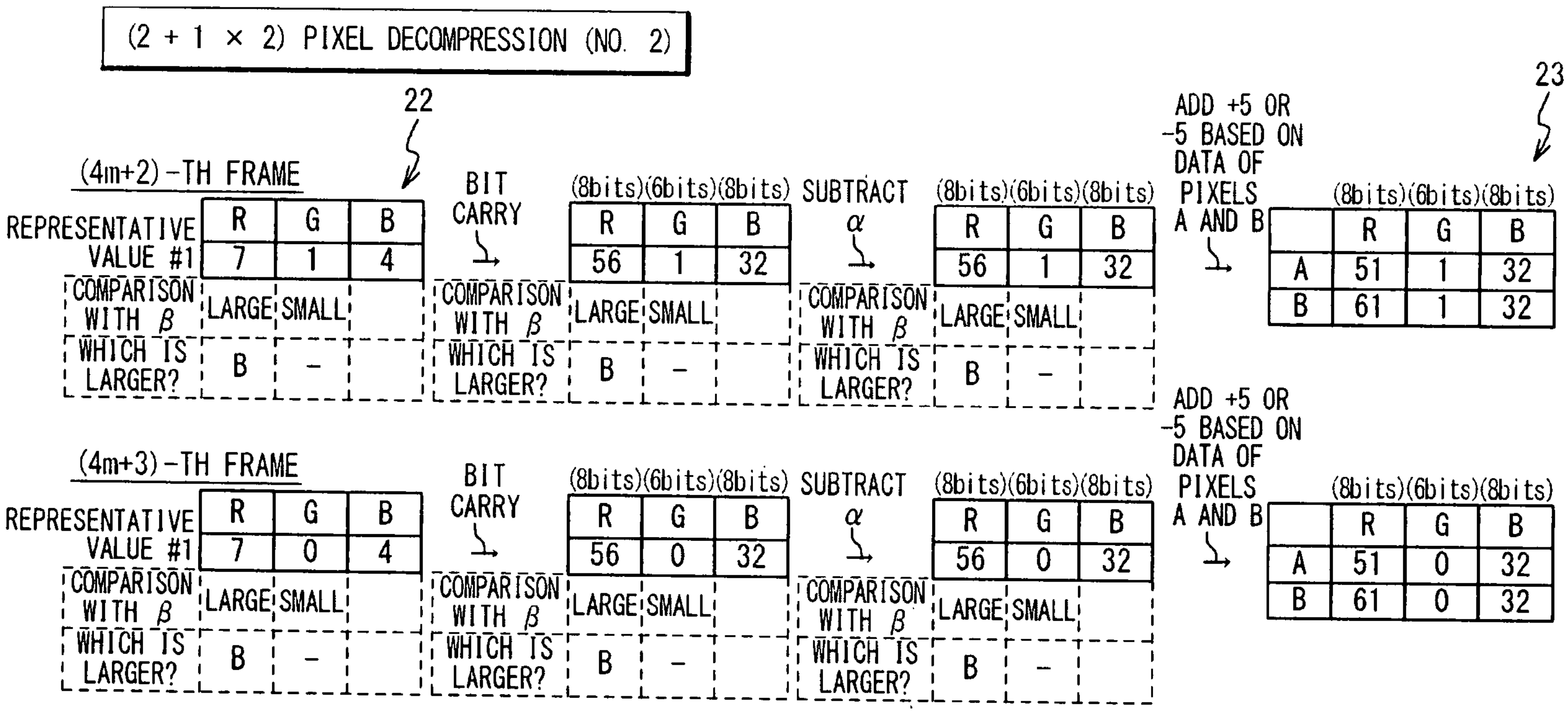

FIGS. 17A to 17C are diagrams illustrating a decompression method for the compressed data 22 generated by the (2+1×2) pixel compression. FIGS. 17A to 17C illustrate a decompression of the compressed data 22 in a case when there is a high correlation between the pieces of image data of the pixels A and B; there is a poor correlation between the image data of the pixels C and D and the image data of the pixels A and B; and there is a poor correlation between the pieces of image data of the pixels C and D. The person skilled in the art would understand that, in other cases, the compressed data 22 generated by the (2+1×2) pixel compression can also be decompressed in the same manner.

First, the decompression process of the compressed data 22 for the pixels A and B (which are highly correlated) is described with reference to FIGS. 17A and 17B. FIGS. 17A and 17B illustrate the decompression process in each of the 4m-th to (4m+3)-th frames. It should be noted that, in the example of FIGS. 17A and 17B, as described above, the FRC process is not performed in the calculation of the R and B representative values of the compressed data 22 on the pixels A and B, whereas the FRC process is performed in the calculation of the G representative value.

First, a bit carry process is performed on each of the R, G, and B representative values. Here, for the R and G representative values, it is determined whether or not the bit carry process is performed, depending on the magnitude relation between the differences in gray-level values $|R_A-R_B|$ and $|G_A-G_B|$ and the threshold value β. When the difference between the gray-level values of the R sub-pixels $|R_A-R_B|$ is larger than the threshold value β, 3-bit carry process is performed on the R representative value, whereas if not, the bit carry process is not performed. Similarly, when the difference between the gray-level values of the G sub-pixels $|G_A-G_B|$ is larger than the threshold value β, a 3-bit carry process is performed on the G representative value, whereas if not, the bit carry process is not performed. In the example of FIGS. 17A and 17B, the 3-bit carry process is performed on the R representative value, whereas the bit carry process is not performed on the G representative value. For the B representative value, on the other hand, the 3-bit carry process is performed independently of the β comparison result data.

Further, the gray-level values of the R, G and B sub-pixels of the pixels A and B of the decompressed data 23 are restored from the R, G, and B representative values, after the error data α are subtracted from the corresponding R, G, and B representative values.

The β comparison result data and the magnitude relation data are used in the restoration of the R sub-pixels of the pixels A and B of the decompressed data 23. When the β comparison result data describes that the difference between the gray-level values of the R sub-pixels $|R_A-R_B|$ is larger than the threshold value β, the value obtained by adding a constant value of 5 to the R representative value is restored as the gray-level value of the R sub-pixel of one of the pixels A and B which is described as having a larger gray-level value in the magnitude relation data, and the value obtained by subtracting the constant value of 5 from the R representative value is restored as the gray-level value of the R sub-pixel of the other one which is described as having a smaller gray-level value in the magnitude relation data. The gray-level values of the R sub-pixels of the pixels A and B restored in this manner are 8-bit values. When the difference between the gray-level values of the R sub-pixels $|R_A-R_B|$ is smaller than the threshold value β, on the other hand, the gray-level values of the R sub-pixels of the pixels A and B are restored as being coincident with the R representative value.

The β comparison result data and magnitude relation data are used to perform the same processing also in the restoration of the gray-level values of the G sub-pixels of the pixels A and B. When the difference between the gray-level values of the G sub-pixels $|G_A-G_B|$ is described as being larger than the threshold value β in the β comparison result data, the value obtained by adding the constant value of 5 to the G representative value is restored as the gray-level value of the G sub-pixel of one of the pixels A and B which is described as having a larger gray-level in the magnitude relation data, and the value obtained by subtracting the constant value of 5 from the G representative value is restored as the gray-level value of the G sub-pixel of the other one, which is described as having a smaller gray-level value in the magnitude relation data. The gray-level values of the G sub-pixels of the pixels A and B restored in this manner are 8-bit values. When the difference between the gray-level values of the G sub-pixels $|G_A-G_B|$ is smaller than the threshold value β, on the other hand, the gray-level values of the G sub-pixels of the pixels A and B are restored as being coincident with the G representative value.

It should be that, when the difference between the gray-level values of the R sub-pixels $|R_A-R_B|$ is smaller than the threshold value β, no bit carry process is performed, and therefore the resultant gray-level values of the R sub-pixels of the pixels A and B are 6-bit values. Similarly, when the difference between the gray-level values of the G sub-pixels $|G_A-G_B|$ is smaller than the threshold value β, no bit carry process is performed, and therefore the resultant gray-level values of the G sub-pixels of the pixels A and B are 6-bit values.

In the example of FIGS. 17A and 17B, the gray-level value of the R sub-pixel of the pixel A is restored as an 8-bit value obtained by subtracting a value of 5 from the R representative value, and the gray-level value of the R sub-pixel of the pixel B is restored as an 8-bit value obtained by adding the value of 5 to the R representative value. Also, the values of the G sub-pixels of the pixels A and B are respectively restored as 6-bit values that are coincident with the G representative value.

In the restoration of the gray-level values of the B sub-pixels of the pixels A and B, on the other hand, the values of the B sub-pixels of the pixels A and B are restored as being coincident with the B representative value, independently of the β comparison result data and the magnitude relation data. The gray-level values of the B sub-pixels of the pixels A and B restored in this manner are 8-bit values.

Thus, the restoration of the gray-level values of the R, G, and B sub-pixels of the pixels A and B is completed.

In the decompression process regarding the pieces of image data of the pixels C and D (which are poorly correlated), on the other hand, the same process as the above-described decompression process of the compressed data 22 generated by the (1×4) pixel compression is performed as illustrated in FIG. 17C. In the decompression process for the image data of the pixels C and D, a 4-bit carry process is first performed on each of the $R_C$ data, $G_C$ data, $B_C$ data, $R_D$ data, $G_D$ data and $B_D$ data. Further, the error data a are subtracted from the data obtained by the 4-bit carry process to generate the decompressed data 23 (i.e., the gray-level values of the R, G and B sub-pixels) of the pixels C and D. Thus, the restoration of the gray-level values of the R, G and B sub-pixels of the pixels C and D is completed. The gray-level values of the R, G and B sub-pixels of the pixels C and D are restored as 8-bit values.

The image data restored as described above are transmitted to the FRC circuit 12 as the decompressed data 23.

In the FRC circuit 12, an FRC process is performed for the gray-level values of sub-pixels that are not yet subjected to the FRC process in the compression circuit 5*a*. Specifically, the decompression circuit 11 recognizes from the compression type identification bits that the generation of the compressed data 22 is performed by the (2+1×2) pixel compression, and further recognizes, from the β comparison result data, the sub-pixels that are not subjected to the FRC process. In response to the result of the recognition, the decompression circuit 11 instructs the FRC circuit 12 to perform the FRC process of desired sub-pixels of desired pixels by using the FRC switching signal 25. In the example of FIGS. 17A to 17C, the FRC circuit 12 does not perform any FRC process on the G sub-pixels of the pixels A and B. That is, the gray-level values of the G sub-pixels of the pixels A and B in the display data 24 are the same as the gray-level values of the G sub-pixels of the pixels A and B in the decompressed data 23. For the other sub-pixels (i.e., the R and B sub-pixels of the pixels A and B, and the R, G, and B sub-pixels of the pixels C and D), on the other hand, an FRC process is performed. In this FRC process, FRC errors are added to the gray-level values (8 bits) of the respective sub-pixels to be subjected to the FRC process, and then the lowest 2 bits are truncated. As the FRC errors, the values illustrated in FIGS. 6A and 6B are used.

FIGS. 18A and 18B are tables illustrating contents of the display data 24 generated by performing the FRC process on the decompressed data shown in FIGS. 17A to 17C. It should be noted that FIG. 18A illustrates the FRC process performed on the decompressed data associated with the pixels A and B, and FIG. 18B illustrates the FRC process performed on the decompressed data associated with the pixels C and D. As illustrated in FIG. 18A, the FRC process is performed on the gray-level values of the R and B sub-pixels for the pixels A and B, whereas no process is performed on the G sub-pixels. On the other hand, as illustrated in FIG. 18B, the FRC process is performed on all of the R, G, and B sub-pixels for the pixels C and D.

Such an FRC process enables incorporating the same amount of information into the display data 24, in which 6 bits are allocated to each of the R, G, and B sub-pixels as the decompressed data 23. FIG. 19 is a table illustrating the average values obtained by multiplying the respective gray-level values of the R, G and B sub-pixels of the pixels A to D illustrated in FIGS. 18A and 18B by 4, and then averaging the resultant values over the 4m-th to (4m+3)-th frames. One would understand that the average values respectively obtained for the R, G and B sub-pixels of the pixels A to D, which are illustrated in FIG. 19, almost coincide with the values of the image data 21 illustrated in FIG. 16. At the same time, this implies that the display data 24 well represents the original image data 21. That is, by using the display data 24, in which 6 bits are allocated to each of the R, G, and B sub-pixels, image display with the number of gray-levels corresponding to 8 bits can be achieved in a pseudo manner.

2-4. (2×2) Pixel Compression

Figure 20:
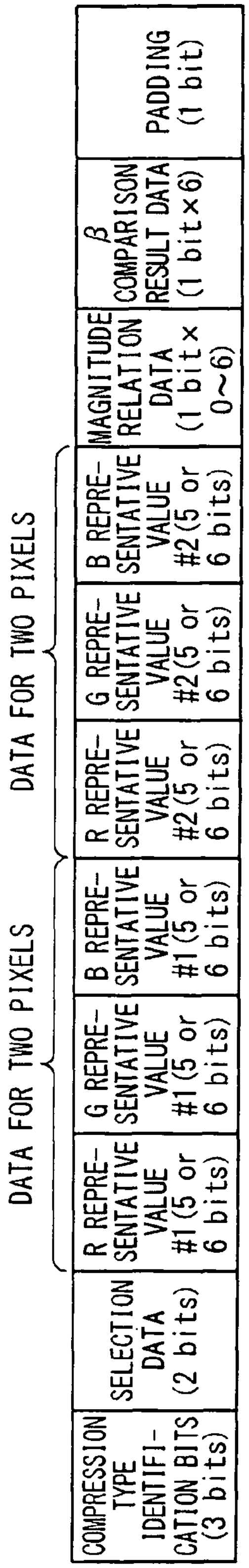
FIG. 20 is a diagram illustrating an exemplary format of compressed data generated by (2×2) pixel compression.
Figure 21A:
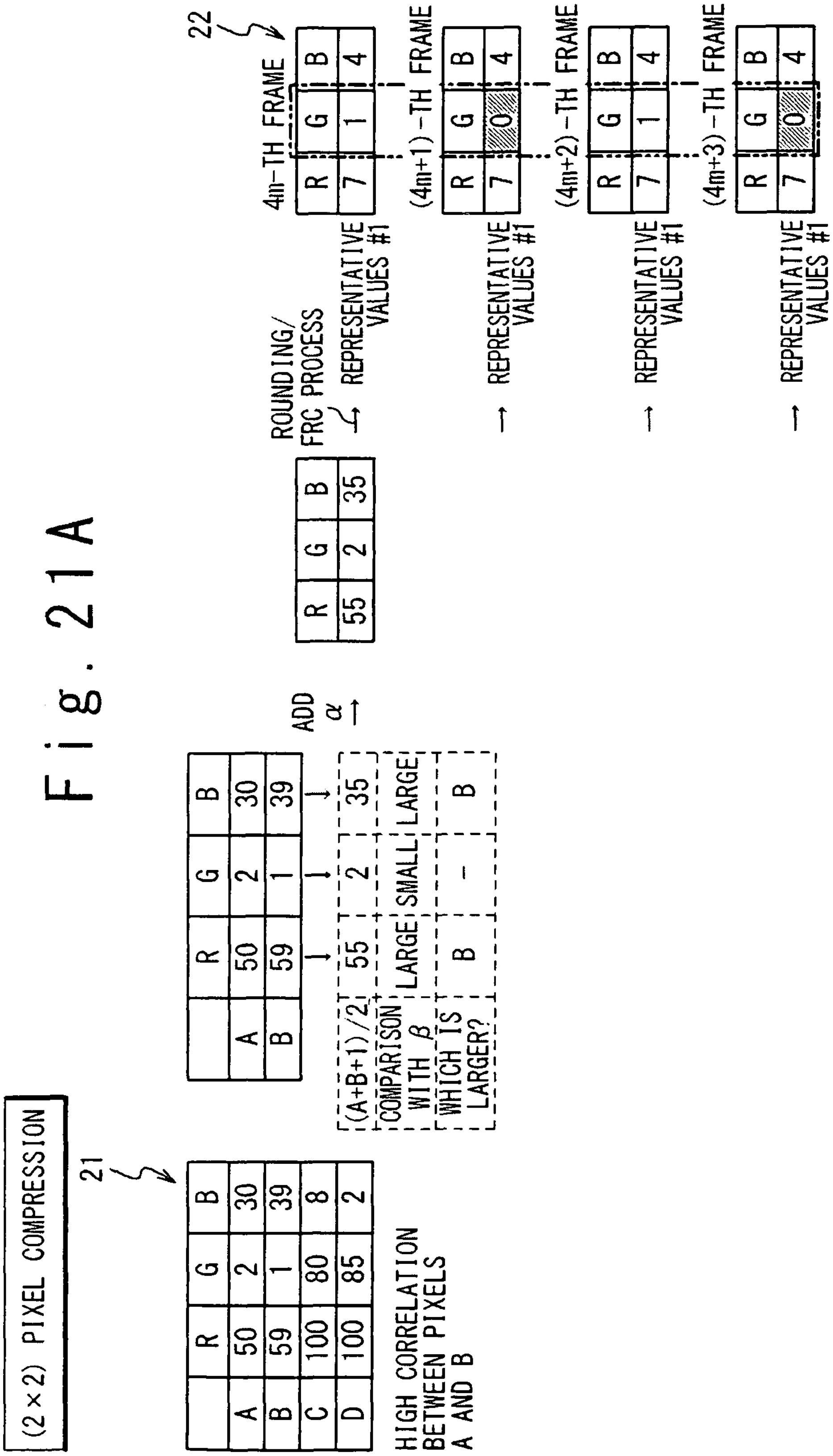
FIGS. 21A and 21B are conceptual diagrams illustrating exemplary data processing for achieving the (2×2) pixel compression.

FIG. 20 is a conceptual diagram illustrating an exemplary format of the compressed data 22 generated by the (2×2) pixel compression, and FIG. 21A is a conceptual diagram illustrating the (2×2) pixel compression. As described above, the (2×2) pixel compression is a compression method used in a case when there is a high correlation between image data of two pixels of the target block, and there is a high correlation between image data of the other two pixels. In this embodiment, as illustrated in FIG. 20, the compressed data 22 generated by the (2×2) pixel compression are 48-bit data composed of compression type identification bits, selection data, R representative value #1, G representative value #1, B representative value #1, R representative value #2, G representative value #2, B representative value #2, magnitude relation data, β comparison result data and padding data.

The compression type identification bits indicates the compression method actually used for the compression, and 3 bits are allocated to the compression type identification bits in the compressed data 22 generated by the (2×2) pixel compression. In this embodiment, the value of the compression type identification bits of the compressed data 22 generated by the (2×2) pixel compression is "110"

The selection data are 2-bit data indicating which two of the pixels A to D have a high correlation between the corresponding image data. In a case when the (2×2) pixel compression is used, there is a high correlation between image data of two of the pixels A to D, and there is a high correlation between image data of the other two pixels. Accordingly, the number of combinations of two pixels having a high correlation between the corresponding image data is three as follows:

The correlation between the pixels A and B is high, and the correlation between the pixels C and D is high.

The correlation between the pixels A and C is high, and the correlation between the pixels B and D is high.

The correlation between the pixels A and D is high, and the correlation between the pixels B and C is high.

The selection data indicates with 2 bits which of these three combinations the correlations of the image data of the target block fall into.

Figure 22A:
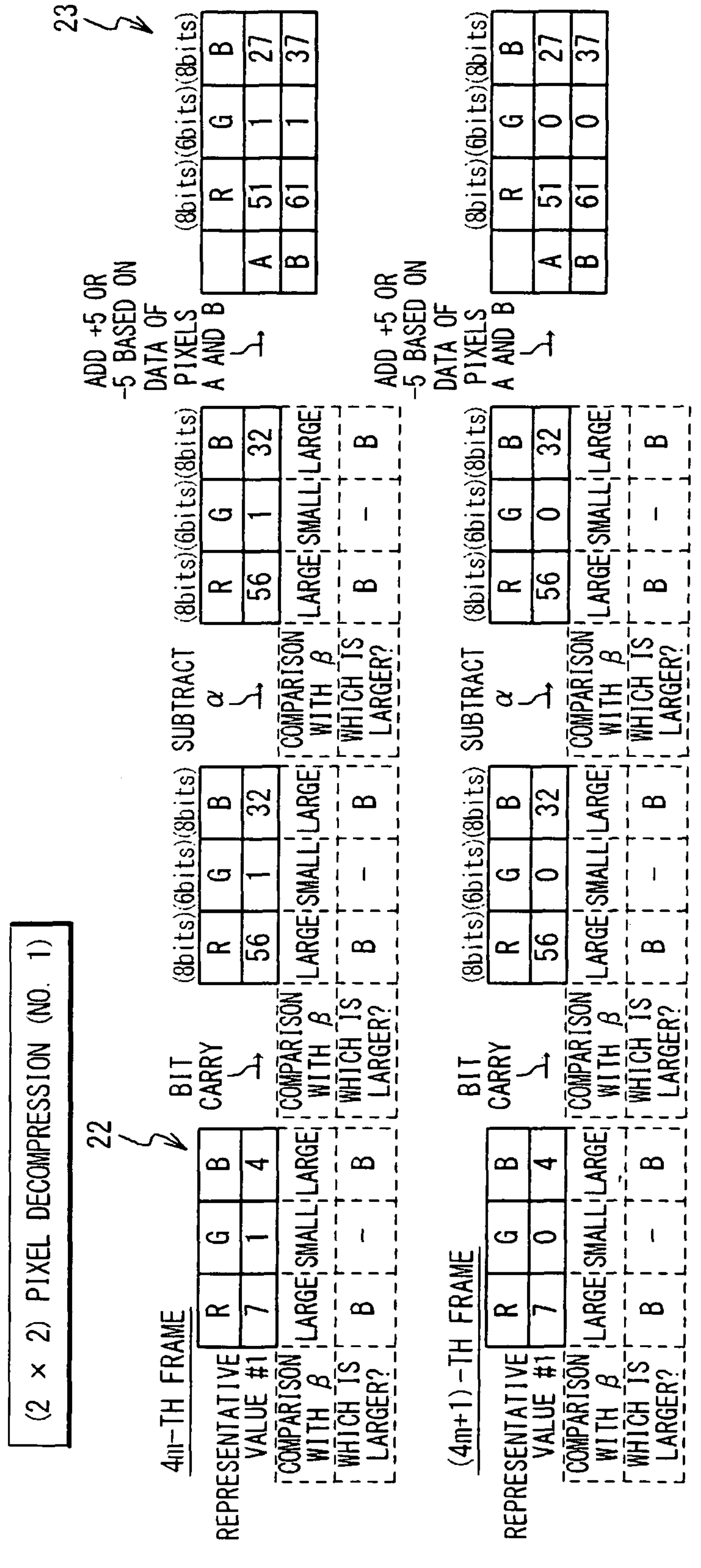
FIGS. 22A to 22D are conceptual diagrams illustrating the decompression process of the compressed data generated by the (2×2) pixel compression.
Figure 22B:
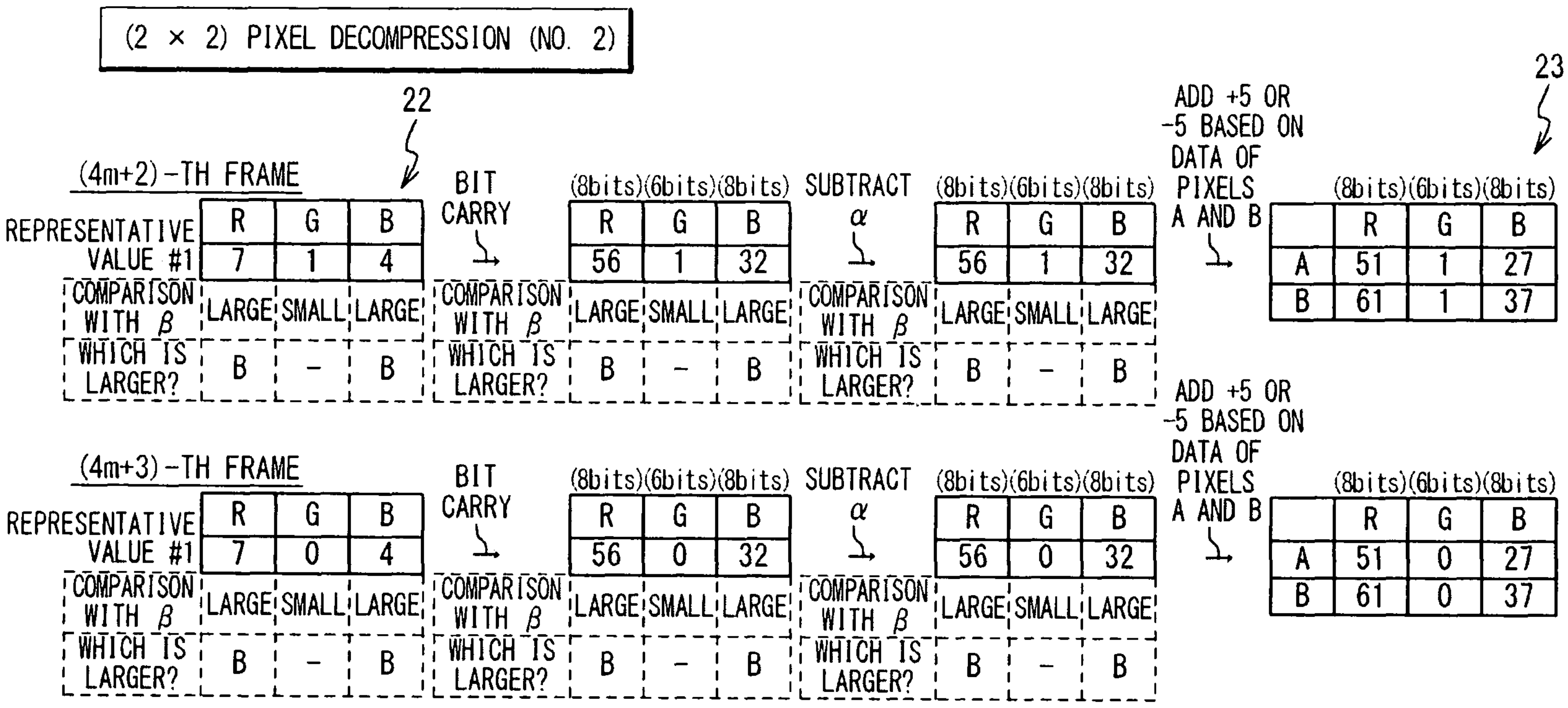

The R representative value #1, G representative value #1, and B representative value #1 are values representing the gray-level values of the R sub-pixels, the G sub-pixels and the B sub-pixels of one of the two pairs of highly-correlated pixels. The R representative value #2, G representative value #2, and B representative value #2 are values representing the gray-level values of the R sub-pixels, the G sub-pixels and the B sub-pixels of the other pair of highly-correlated pixels. In the example of FIGS. 22A and 22B, each of the R representative value #1, G representative value #1, B representative value #1, R representative value #2 and B representative value #2 is 5-bit or 6-bit data, and the G representative value #2 is 6-bit or 7-bit data.

The β comparison result data indicate whether or not the difference between the gray-level values of the R sub-pixels of each combination of the two highly-correlated pixels, the difference between the gray-level values of the G sub-pixels of each combination of the two highly correlated pixels, and the difference between the gray-level values of the B sub-pixels of each combination of the highly-correlated two pixels are larger than the predetermined threshold value β. In this embodiment, the β comparison result data are 6-bit data in which 3 bits are allocated to each pair of highly-correlated pixels.

On the other hand, the magnitude relation data indicate which of the two highly-correlated pixels has a larger R sub-pixel gray-level value, and which of the pixels has a larger G sub-pixel gray-level value. The magnitude relation data associated with the R sub-pixels are generated only in a case when the difference between the gray-level values of the R sub-pixels of the highly-correlated two pixels is larger than the threshold value β; the magnitude relation data associated with the G sub-pixels are generated only in a case when the difference between the gray-level values of the G sub-pixels of the highly-correlated two pixels is larger than the threshold value β; and the magnitude relation data associated with the B sub-pixels are generated only in a case where the difference between the gray-level values of the B sub-pixels of the highly-correlated two pixels is larger than the threshold value β. Accordingly, the magnitude relation data are 0- to 6-bit data.

The padding data are added in order to cause the compressed data 22 generated by the (2×2) pixel compression to have the same number of bits as those of the compressed data 22 generated by the other compression methods. In this embodiment, the padding data is 1-bit data.

Figure 21B:
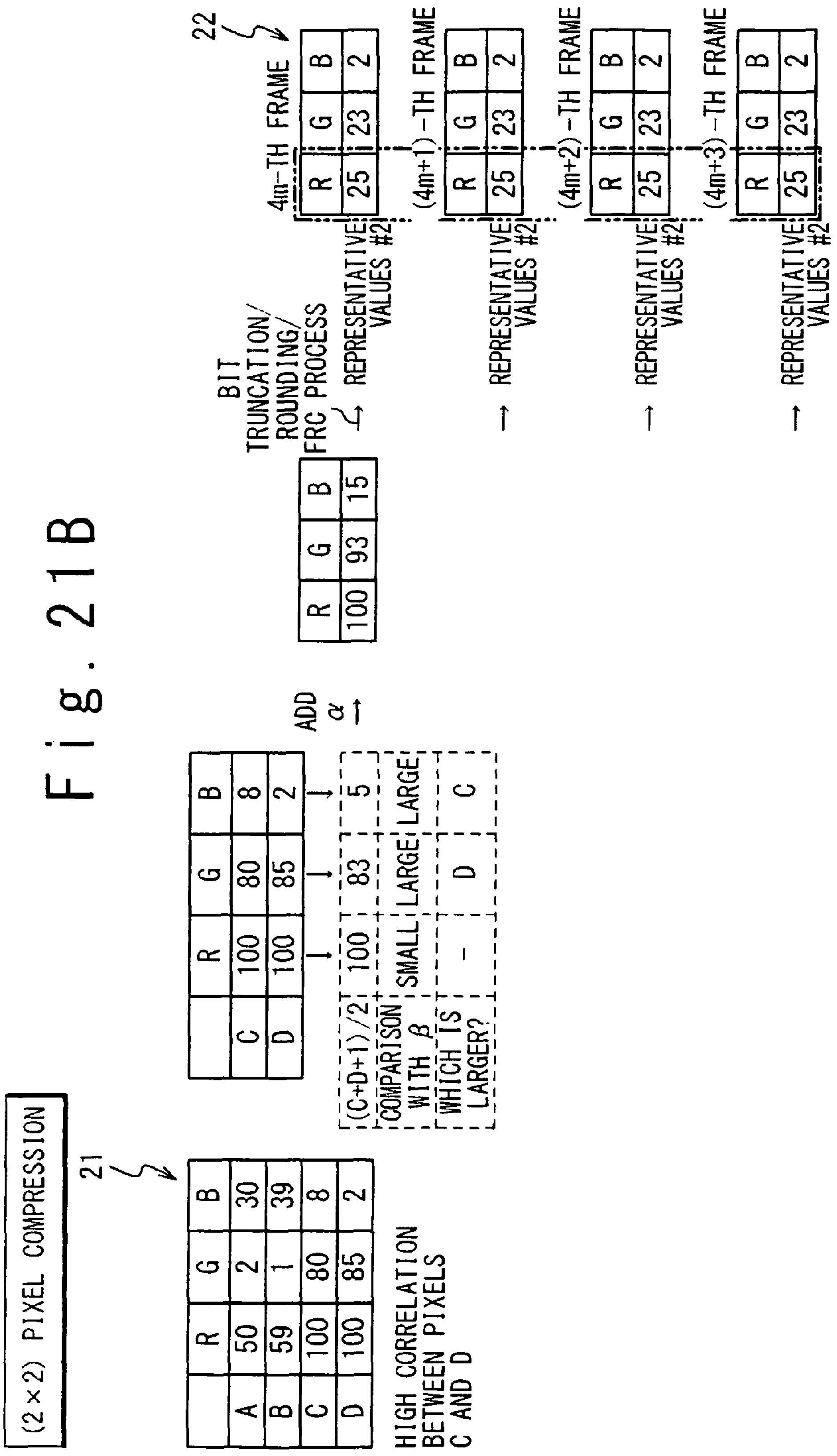

In the following, the (2×2) pixel compression is described with reference to FIGS. 21A and 21B. FIGS. 21A and 21B illustrate the generation of the compressed data 22 in a case when the correlation between the image data of the pixels A and B is high, and the correlation between the image data of the pixels C and D is high. The person skilled in the art would understand that the compressed data 22 can be generated in the same manner for the other cases.

First, the average value of the gray-level values is calculated for each of the R, G, and B sub-pixels. The average values Rave1, Gave1 and Bave1 of the gray-level values of the R, G and B sub-pixels of the pixels A and B, and the average values Rave2, Gave1 and Bave2 of the gray-level values of the R, G and B sub-pixels of the pixels C and D are calculated by the following expressions:

$$Rave1=(R_A+R_B+1)/2,$$

$$Gave1=(G_A+G_B+1)/2,$$

$$Bave1=(B_A+B_B+1)/2,$$

$$Rave2=(R_C+R_D+1)/2,$$

$$Gave2=(G_C+G_D+1)/2, \text{ and}$$

$$Gave2=(B_C+B_D+1)/2.$$

Further, the difference between the gray-level values of the R sub-pixels of the pixels A and B $|R_A-R_B|$, the difference between the gray-level values of the G sub-pixels $|G_A-G_B|$ and the difference between the gray-level values of the B sub-pixels $|B_A-B_B|$ are compared with the predetermined threshold value β. Similarly, the difference between the gray-level values of the R sub-pixels of the pixels C and D $|R_C-R_D|$, the difference between the gray-level values of the G sub-pixels $|G_C-G_D|$ and the difference between the gray-level values of the B sub-pixels $|B_C-B_D|$ are compared with the predetermined threshold value β. The results of these comparisons are described in the compressed data 22 as the β comparison result data.

Further, the magnitude relation data are generated for each of the combination of the pixels A and B and the combination of the pixels C and D.

Specifically, when the difference between the gray-level values of the R sub-pixels of the pixels A and B $|R_A-R_B|$ is larger than the threshold value β, the magnitude relation data are generated to describe which of the pixels A and B has a larger R sub-pixel gray-level value. When the difference between the gray-level values of the R sub-pixels of the pixels A and B $|R_A-R_B|$ is equal to or smaller than the threshold value β, the magnitude relation data are generated so as not to describe the magnitude relation between the gray-level values of the R sub-pixels of the pixels A and B. Similarly, when the difference between the gray-level values of the G sub-pixels of the pixels A and B $|G_A-G_B|$ is larger than the threshold value β, the magnitude relation data are generated so as to describe which of the pixels A and B has a larger G sub-pixel gray-level value. When the difference between the gray-level values of the G sub-pixels of the pixels A and B $|G_A-G_B|$ is equal to or smaller than the threshold value β, the magnitude relation data are generated so as not to describe the magnitude relation between the gray-level values of the G sub-pixels of the pixels A and B. In addition, when the difference between the gray-level values of the B sub-pixels of the pixels A and B $|B_A-B_B|$ is larger than the threshold value β, the magnitude relation data are generated to describe which of the pixels A and B has a larger B sub-pixel gray-level value. When the difference between the gray-level values of the B sub-pixels of the pixels A and B $|B_A-B_B|$ is equal to or smaller than the threshold value β, the magnitude relation data are generated so as not to describe the magnitude relation between the gray-level values of the B sub-pixels of the pixels A and B.

Similarly, when the difference between the gray-level values of the R sub-pixels of the pixels C and D $|R_C-R_D|$ is larger than the threshold value β, the magnitude relation data are generated to describe which of the pixels C and D has a larger R sub-pixel gray-level value. When the difference between the gray-level values of the R sub-pixels of the pixels C and D $|R_C-R_D|$ is equal to or smaller than the threshold value β, the magnitude relation data are generated so as not to describe the magnitude relation between the gray-level values of the R sub-pixels of the pixels C and D. Similarly, when the difference between the gray-level values of the G sub-pixels of the pixels C and D $|G_C-G_D|$ is larger than the threshold value β, the magnitude relation data are generated so as to describe which of the pixels C and D has a larger G sub-pixel gray-level value. When the difference between the gray-level values of the G sub-pixels of the pixels C and D $|G_C-G_D|$ is equal to or smaller than the threshold value β, the magnitude relation data are generated so as not to describe the magnitude relation between the gray-level values of the G sub-pixels of the pixels C and D. In addition, when the difference between the gray-level values of the B sub-pixels of the pixels C and D $|B_C-B_D|$ is larger than the threshold value β, the magnitude relation data are generated to describe which of the pixels C and D has a larger B sub-pixel gray-level value. When the difference between the gray-level values of the B sub-pixels of the pixels C and D $|B_C-B_D|$ is equal to or smaller than the threshold value β, the magnitude relation data are generated so as not to describe the magnitude relation between the gray-level values of the B sub-pixels of the pixels C and D.

In the example of FIG. 21A, the gray-level values of the R sub-pixels of the pixels A and B are 50 and 59, respectively, and the threshold value β is 4. In this case, the difference in the gray-level value $|R_A-R_B|$ is larger than the threshold value β, so that this fact is described in the β comparison result data, and also the fact that the gray-level value of the R sub-pixel of the pixel B is larger than that of the R sub-pixel of the pixel A is described in the magnitude relation data. On the other hand, the gray-level values of the G sub-pixels of the pixels A and B are 2 and 1, respectively. In this case, the difference in the gray-level value $|G_A-G_B|$ is less than the threshold value β, and therefore this fact is described in the β comparison result data. The magnitude relation between the gray-level values of the G sub-pixels of the pixels A and B is not described in the magnitude relation data. Further, the gray-level values of the B sub-pixels of the pixels A and B are 30 and 39, respectively. In this case, the difference in the gray-level value $|B_A-B_B|$ is larger than the threshold value β, so that this fact is described in the β comparison result data, and also the fact that the gray-level value of the B sub-pixel of the pixel B is larger than that of the B sub-pixel of the pixel A is described in the magnitude relation data.

Also, the gray-level values of the R sub-pixels of the pixels C and D are both 100 in the example of FIG. 21B. In this case, the difference in the gray-level value $|R_C-R_D|$ is less than the threshold value β, and therefore this fact is described in the β comparison result data. The magnitude relation between the gray-level values of the G sub-pixels of the pixels C and D is not described in the magnitude relation data. Further, the gray-level values of the G sub-pixels of the pixels C and D are 80 and 85, respectively. In this case, the difference in gray-level value $|G_A-G_B|$ is larger than the threshold value β, so that this fact is described in the β comparison result data, and also the fact that the gray-level value of the G sub-pixel of the pixel D is larger than that of the G sub-pixel of the pixel C is described in the magnitude relation data. Still further, the gray-level values of the B sub-pixels of the pixels C and D are 8 and 2, respectively. In this case, the difference in the gray-level value $|B_C-B_D|$ is larger than the threshold value β, so that this fact is described in the β comparison result data, and also the fact that the gray-level value of the B sub-pixel of the pixel C is larger than that of the B sub-pixel of the pixel D is described in the magnitude relation data.

Further, error data α are added to the average values Rave1, Gave1 and Bave1 of the gray-level values of the R, G and B sub-pixels of the pixels A and B, and the average values Rave2, Gave2 and Bave2 of the gray-level values of the R, G and B sub-pixels of the pixels C and D. In this embodiment, the error data α are determined with use of a fundamental matrix, which is a Bayer matrix, from the coordinates of two pixels of each combination. The calculation of the error data α will be separately described later. In the following, it is assumed that the error data α set for the pixels A and B are 0, the error data α set for the R sub-pixels of the pixels C and D are also 0 and the error data α set for the G and B sub-pixels of the pixels C and D are also 10.

Further, a rounding process or an FRC process is performed on the average values Rave1, Gave1, Bave1, Rave2, Gave2 and Bave2 of the gray-level values of the R, G, and B sub-pixels (after the error data α are added) to calculate the R representative value #1, G representative value #1, B representative value #1, R representative value #2, G representative value #2 and B representative value #2.

For the pixels A and B, one of the rounding process and the FRC process is selected for each of the average values Rave1, Gave1 and Bave1 of the gray-level values of the R, G and B sub-pixels of the pixels A and B, depending on the magnitude relation between the difference between the gray-level values of the R sub-pixels $|R_A-R_B|$ and the threshold value β, the magnitude relation between the difference between the gray-level values of the G sub-pixels $|G_A-G_B|$ and the threshold value β, and the magnitude relation between the difference between the gray-level values of the B sub-pixels $|B_A-B_B|$ and the threshold value β. When the difference between the gray-level values of the R sub-pixels of the pixels A and B $|R_A-R_B|$ is larger than the threshold value β, the average value Rave1 of the gray-level values of the R sub-pixels is added with a value of 4, and then a 3-bit truncation is performed to thereby calculate the R representative value #1. On the other hand, when the difference between the gray-level values of the R sub-pixels $|R_A-R_B|$ is equal to or smaller than the threshold value β, the FRC process is performed on the average value Rave1 of the gray-level values of the R sub-pixels. Specifically, an FRC error is added to the average value Rave1 of the gray-level values of the R sub-pixels (after the error data α are added), and then a process of truncating the lowest 2 bits is performed to calculate the R representative value #1. The FRC error used in the FRC process has a 2-bit value which is any of 0 to 3, and the FRC error used for a specific target block is switched every frame at a cycle period of four frames. As thus described, the rounding process or the FRC process is performed on the average value Rave1 of the gray-level values of the R sub-pixels (after the error data α are added) to calculate the R representative value #1. When the rounding process is performed, the R representative value #1 is a 5-bit value, whereas the R representative value #1 is a 6-bit value when the FRC process is performed.

The same goes for the G and B sub-pixels. When the difference in gray-level value $|G_A-G_B|$ is larger than the threshold value β, a value of four is added to the average value Gave1 of the gray-level values of the G sub-pixels, and then a process of truncating the lowest 3 bits is performed to calculate the G representative value #1. If not so, an FRC error is added to the average value Gave1, and then a process of truncating the lowest 2 bits is performed to thereby calculate the G representative value #1. Further, when the difference in the gray-level value $|B_A-B_B|$ is larger than the threshold value β, a value of four is added to the average value Bave1 of the gray-level values of the B sub-pixels, and then a process of truncating the lowest 3 bits is performed to calculate the B representative value #1. If not so, an FRC error is added to the average value Bave1, and then a process of truncating the lowest 2 bits is performed to thereby calculate the B representative value #1.

In the example of FIG. 21A, a value of 4 is added to the average value Rave1 of the gray-level values of the R sub-pixels of the pixels A and B, and then the rounding process of truncating the lowest 3 bits is performed to calculate the R representative value #1. Also, the FRC process is performed to calculate the G representative value #1 for the average value Gave1 of the gray-level values of the G sub-pixels of the pixels A and B. Further, a value of 4 is added to the average value Bave1 of the gray-level values of the B sub-pixels, and then the rounding process of truncating the lowest 3 bits is performed to thereby calculate the B representative value #1.

The same goes for the combination of the pixels C and D, and the rounding process or the FRC process is performed to calculate the R representative value #2, G representative value #2, and B representative value #3. In the example of FIG. 21B, the FRC process is performed to calculate the R representative value #2 for the average value Rave2 between the R sub-pixels of the pixels C and D. The used FRC error is a 2-bit value selected from 0 to 3. Also, a value of 4 is added to the average value Gave2 of the gray-level values of the G sub-pixels of the pixels C and D, and then the process of truncating the lowest 3 bits is performed to calculate the G representative value #2. Further, a value of 4 is added to the average value Bave2 of the gray-level values of the B sub-pixels, and then the process of truncating the lowest 3 bits is performed to thereby calculate the B representative value #2.

The compression process by the (2×2) pixel compression is thus completed.

FIGS. 22A to 22D are diagrams illustrating a decompression method for the compressed data 22 generated the (2×2) pixel compression. FIGS. 22A to 22D illustrate the decompression of the compressed data 22 generated by the (2×2) pixel compression in a case where the correlation between the image data of the pixels A and B is high, and the correlation between the image data of the pixels C and D is high. The person skilled in the art would understand that, for other cases, the compressed data 22 generated by the (2×2) pixel compression can also be decompressed in the same manner.

First, a bit carry process is performed on, out of the R representative value #1, the G representative value #1, the B representative value #1, the R representative value #2, the G representative value #2 and the B representative value #2, the ones which are calculated by performing the rounding process; regarding the representative values that are obtained through the FRC process, the bit carry process is not performed. For the R representative value #1, for example, if the difference between the gray-level values of the R sub-pixels $|R_A-R_B|$ is larger than the threshold value β, the 3-bit carry process is performed on the R representative value #1, whereas if not so, the bit carry process is not performed. Similarly, if the difference between the gray-level values of the G sub-pixels of the pixels A and B $|G_A-G_B|$ is larger than the threshold value β, the 3-bit carry process is performed on the G representative value #1, whereas if not so, the bit carry process is not performed. Further, if the difference between the gray-level values of the B sub-pixels of the pixels A and B $|B_A-B_B|$ is larger than the threshold value β, the 3-bit carry process is performed on the B representative value #1, whereas if not so, the bit carry process is not performed. The same goes for the R representative value #2, G representative value #2, and B representative value #2.

Figure 22C:
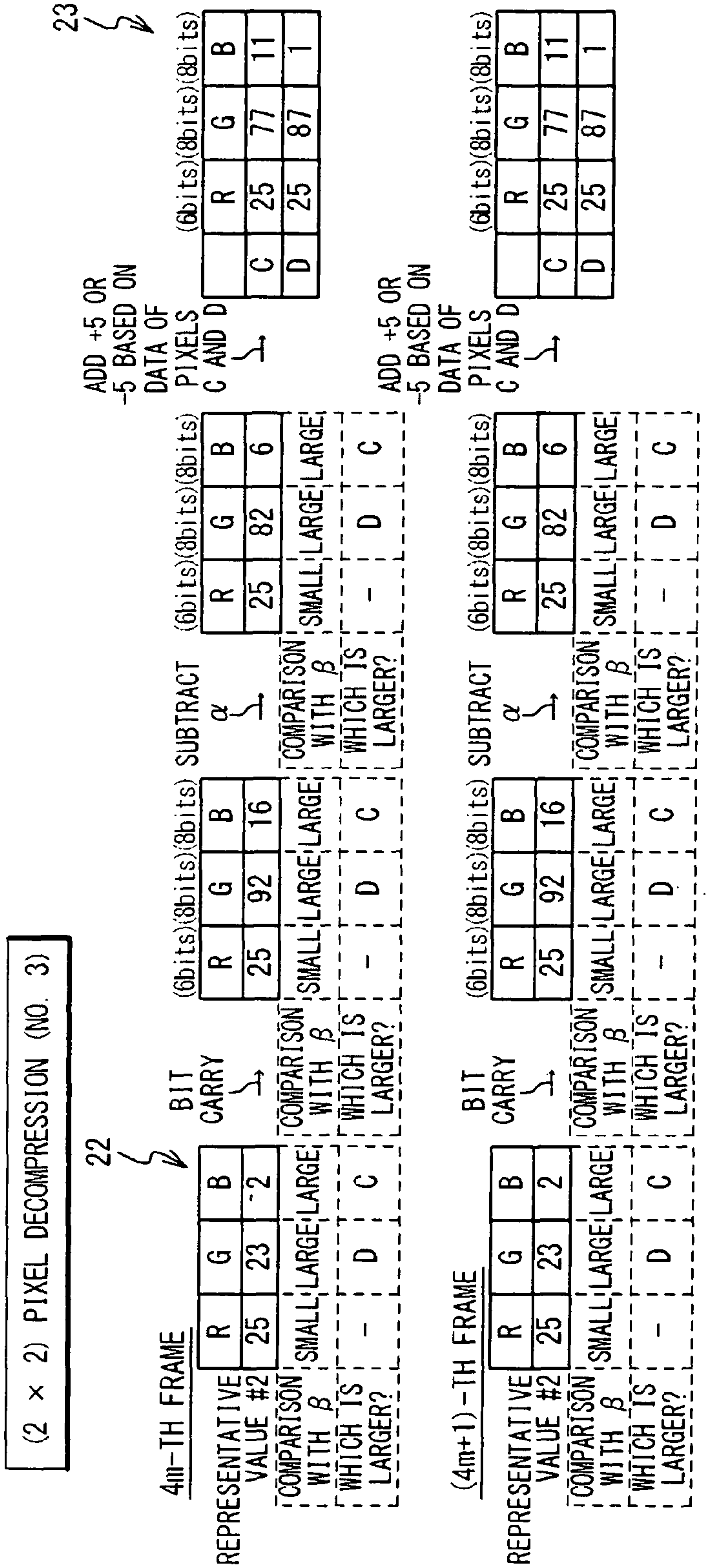
Figure 22D:
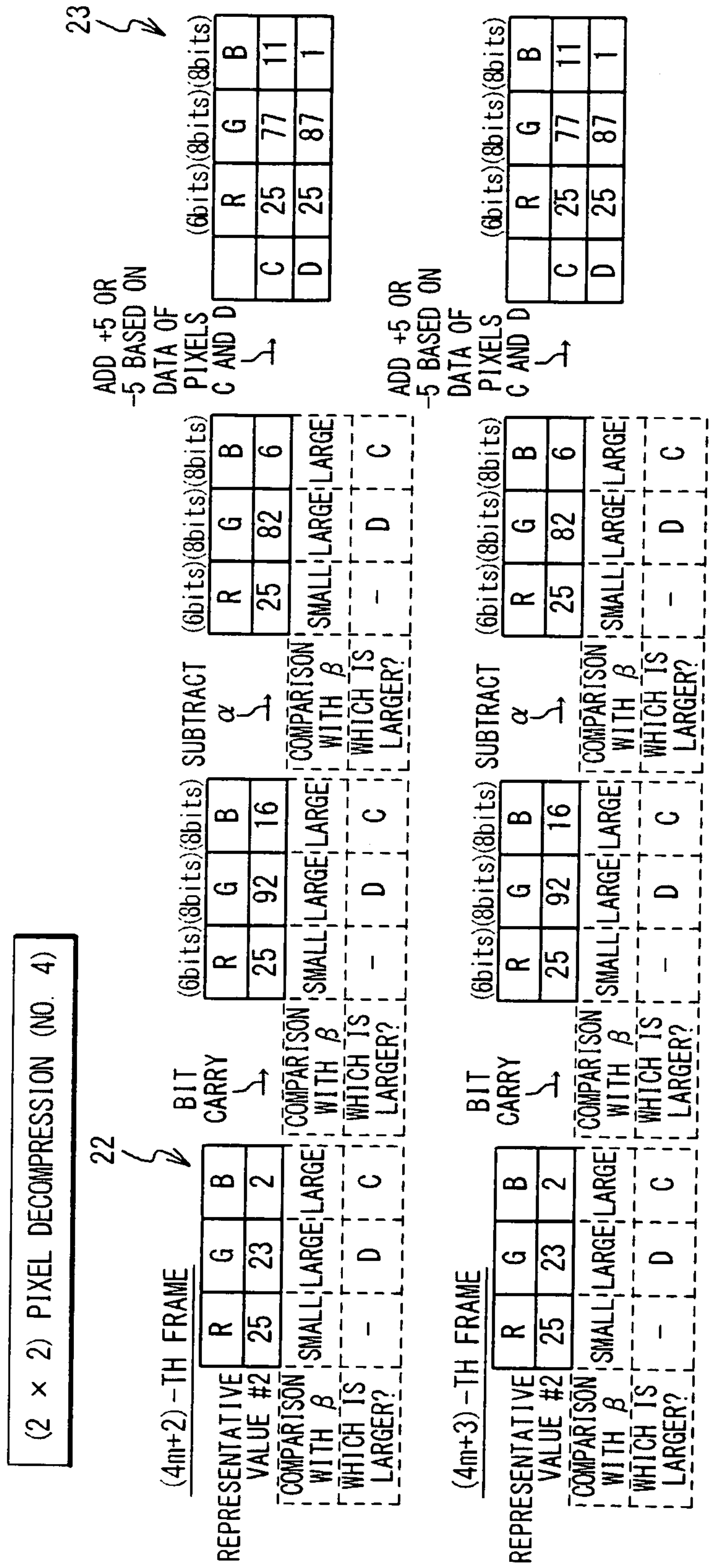

In the example of FIGS. 22A and 22B, the process that carries 3 bits is performed for the R representative value #1; the bit carry process is not performed for the G representative value #1; and the 3-bit carry process is performed for the B representative value #1. Meanwhile, as shown in FIGS. 22C and 22D, the bit carry process is not performed for the R representative value #2; the 3-bit carry process is performed for the G representative value #2 and B representative value #2. It should be noted that each of the representative values which is subjected to the bit carry process is an 8-bit value, whereas each of the representative values which is not subjected to the bit carry process is a 6-bit value.

Further, the error data α are subtracted from each of the R representative value #1, G representative value #1, B representative value #1, R representative value #2, G representative value #2, B representative value #2, and then a process is performed for restoring the gray-level values of the R, G and B sub-pixels of the pixels A and B, and the gray-level values of the R, G and B sub-pixels of the pixels C and D, from the resultant representative values.

In the restoration of the gray-level values, the β comparison result data and the magnitude relation data are used. If the β comparison result data describes that the difference between the gray-level values of the R sub-pixels of the pixels A and B $|R_A-R_B|$ is larger than the threshold value β, the value obtained by adding a constant value of 5 to the R representative value #1 is restored as the gray-level value of the R sub-pixel of one of the pixels A and B, which is described as being larger in the magnitude relation data, and the value obtained by subtracting the constant value of 5 from the R representative value #1 is restored as the gray-level value of the R sub-pixel of the other one, which is described as being smaller in the magnitude relation data. If the difference between the gray-level values of the R sub-pixels of the pixels A and B $|R_A-R_B|$ is smaller than the threshold value β, the gray-level values of the R sub-pixels of the pixels A and B are restored as being coincident with the R representative value #1. In addition, the gray-level values of the G and B sub-pixels of the pixels A and B, and the gray-level values of the R, G, and B sub-pixels of the pixels C and D are also restored by the same procedure.

In the example of FIGS. 22A to 22D, the gray-level value of the R sub-pixel of the pixel A is restored as the value obtained by subtracting a value of 5 from the R representative value #1, and the gray-level value of the R sub-pixel of the pixel B is restored as the value obtained by adding a value of 5 to the R representative value #1. Also, the gray-level values of the G sub-pixels of the pixels A and B are restored as the value that is coincident with the G representative value #1. Further, the gray-level value of the B sub-pixel of the pixel A is restored as the value obtained by subtracting a value of 5 from the B representative value #1, and the gray-level value of the B sub-pixel of the pixel B is restored as the value obtained by adding a value of 5 to the B representative value #1. On the other hand, the gray-level values of the R sub-pixels of the pixels C and D are restored as the value that is coincident with the R representative value #2. Also, the gray-level value of the G sub-pixel of the pixel C is restored as the value obtained by subtracting a value of 5 from the G representative value #2, and the gray-level value of the G sub-pixel of the pixel D is restored as the value obtained by adding a value of 5 to the G representative value #2. Further, the gray-level value of the B sub-pixel of the pixel C is restored as the value obtained by adding the value of 5 to the G representative value #2, and the gray-level value of the B sub-pixel of the pixel D is restored as the value obtained by subtracting a value of 5 from the B representative value #2.

In the FRC circuit 12, an FRC process is performed on the gray-level values of sub-pixels that are not subjected to the FRC process in the compression circuit 5*a*. FIG. 23A is a diagram illustrating contents of the FRC process performed on the pixels A and B, and FIG. 23B is a diagram illustrating contents of the FRC process performed on the pixels C and D. More specifically, the decompression circuit 11 recognizes from the compression type identification bits that the compressed data 22 are generated by the (2×2) pixel compression, and further recognizes, from the β comparison result data, the sub-pixels not subjected to the FRC process. On the basis of the result of the recognition, the decompression circuit 11 instructs the FRC circuit 12 to perform the FRC process on desired sub-pixels of desired pixels by using the FRC switching signal 25.

In the examples of FIGS. 23A and 23B, the FRC circuit 12 performs the FRC process on the R and B sub-pixels of the pixels A and B, and the G and B sub-pixels of the pixels C and D; the FRC process is not performed for the G sub-pixels of the pixels A and B, and the R sub-pixels of the pixels C and D. That is, the gray-level values of the G sub-pixels of the pixels A and B in the display data 24 are the same as the gray-level values of the G sub-pixels of the pixels A and B in the decompressed data 23, and the gray-level values of the R sub-pixels of the pixels C and D in the display data 24 are the same as the gray-level values of the R sub-pixels of the pixels C and D in the decompressed data 23. In the FRC process, FRC errors are added to the gray-level values (8 bits) of the respective sub-pixels to be subjected to the FRC process, and then the lowest 2 bits are truncated. As the FRC errors, the values illustrated in FIGS. 6A and 6B are used.

Such an FRC process allows the display data 24, in which 6 bits are allocated to each of the R, G, and B sub-pixels, to the same amount of information as the decompressed data 23. FIG. 24 is a table illustrating the average values obtained by multiplying the respective gray-level values of the R, G and B sub-pixels of the pixels A to D illustrated in FIGS. 23A and 23B by 4, and then averaging the resultant values over the 4m-th to (4m+3)-th frames. One would understand that the average values respectively obtained for the R, G and B sub-pixels of the pixels A to D, which are illustrated in FIG. 24, almost coincide with the values of the image data 21 illustrated in FIG. 21A. At the same time, this implies that the display data 24 well represents the original image data 21. That is, the display data 24, in which 6 bits are allocated to each of the R, G, and B sub-pixels achieves image display with the number of gray-levels corresponding to 8 bits in a pseudo manner.

2-5. (3+1) Pixel Compression

Figure 25:
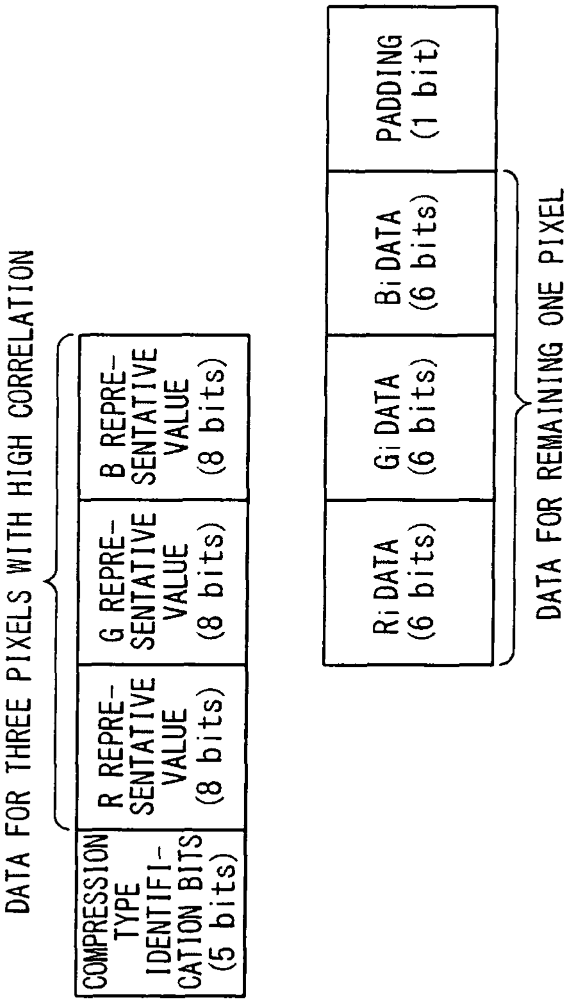
FIG. 25 is a diagram illustrating an exemplary format of compressed data generated by (3+1) pixel compression.
Figure 26:
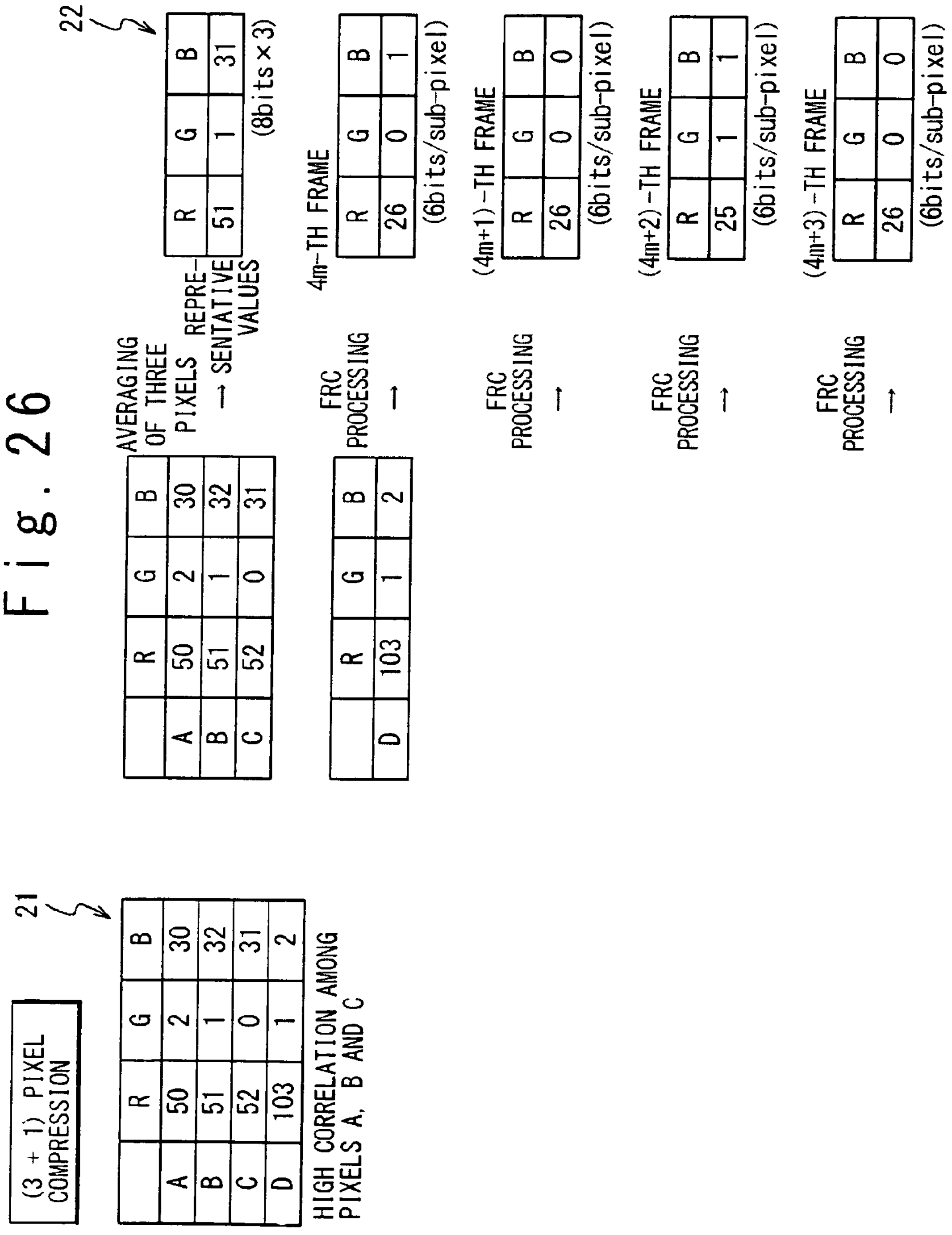
FIG. 26 is a conceptual diagram illustrating exemplary data processing for achieving the (3+1) pixel compression.

FIG. 25 is a conceptual diagram illustrating an exemplary format of the compressed data 22 generated by the (3+1) pixel compression, and FIG. 26 is a conceptual diagram illustrating the (3+1) pixel compression. As described above, the (3+1) pixel compression is a compression method used in a case where there is a high correlation among image data of three pixels of the target block, and there is poor correlation between the image data of the three pixels and the image data of the other one pixel. In this embodiment, as illustrated in FIG. 25, the compressed data 22 generated by the (3+1) pixel compression are 48-bit data composed of compression type identification bits, R representative value, G representative value, B representative value, Ri data, Gi data, Bi data and padding data.

The compression type identification bits indicate the actually used compression method, and 5 bits are allocated to the compression type identification bits in the compressed data 22 generated by the (3+1) pixel compression. In this embodiment, the value of the compressed data 22 generated by the (3+1) pixel compression is “11110”.

The R, G and B representative values are values representing gray-level values of R, G, and B sub-pixels of the highly-correlated three pixels, respectively. The R, G and B representative values are respectively calculated as the average values of the gray-level values of the R, G and B sub-pixels of the highly-correlated three pixels. In the example of FIG. 25, all of the R, G, and B representative values are 8-bit data.

On the other hand, the Ri data, Gi data and Bi data are bit-plane-reduced data obtained by performing a process of reducing the number of bit planes on the gray-level values of R, G and B sub-pixels of the other one pixel. In this embodiment, the number of bit planes is reduced by performing an FRC process. In this embodiment, all of the Ri data, Gi data and Bi data are 6-bit data.

The padding data are added in order to cause the compressed data 22 generated by the (3+1) pixel compression to have the same number of bits as that of the compressed data 22 generated by the other compression methods. In this embodiment, the padding data are 1-bit data.

In the following, the (3+1) pixel compression is described with reference to FIG. 26. FIG. 26 describes the generation of the compressed data 22 in a case when there is a high correlation among the image data of the pixels A, B, and C, and there is a poor correlation between the image data of the pixel D and the image data of the pixels A, B and C. The person skilled in the art would understand that the compressed data 22 can also be generated in the same manner for other cases.

First, the average value of the gray-level values of the R sub-pixels of the pixels A, B and C, the average value of gray-level values of the G sub-pixels, and the average value of gray-level values of the B sub-pixels are respectively calculated, and the calculated average values are determined as the R representative value, the G representative value, and the B representative value, respectively. The R representative value, G representative value, and B representative value are calculated by the following expressions:

$$Rave1=(R_A+R_B+R_C/3),$$

$$Gave1=(G_A+G_B+G_C/3),\text{ and}$$

$$Bave1=(B_A+B_B+B_C/3).$$

Further, the FRC process is performed for the gray-level values of the R, G and B sub-pixels of the pixel D. Specifically, FRC errors are added to the gray-level values of the R, G and B sub-pixels of the pixel D, and then a process of truncating the lowest 2 bits is performed. The FRC errors used in the FRC process are values selected from 0 to 3, and the values illustrated in FIGS. 6A and 6B are used as the FRC errors. FIG. 26 illustrate contents of the compressed data 22 generated by performing the FRC process on the gray-level values of the R, G and B sub-pixels of the pixel D.

FIG. 27 is a diagram illustrating the decompression method for the compressed data 22 generated by the (3+1) pixel compression, and the FRC process that is subsequently performed. FIG. 27 illustrates the decompression of the compressed data 22 generated by the (3+1) pixel compression in the case where there is a high correlation among the image data of the pixels A, B and C; however, the person skilled in the art would understand that the compressed data 22 generated by the (3+1) pixel compression can be decompressed in the same manner for other cases.

In the decompression process in the decompression circuit 11, the decompressed data 23 are generated such that all of the gray-level values of the R sub-pixels of the pixels A, B and C coincide with the R representative value; all of the gray-level values of the respective G sub-pixels of the pixels A, B and C coincide with the G representative value; and all of the gray-level values of the respective B sub-pixels of the pixels A, B and C coincide with the B representative value. For the pixel D, on the other hand, the Ri data, Gi data and Bi data are directly used as the gray-level values of the R, G and B sub-pixels of the pixel D without performing any process.

The FRC circuit 12 performs an FRC process on the gray-level values of the R, G and B sub-pixels of the pixels A, B and C. Specifically, FRC errors are added to the gray-level values of the R, G and B sub-pixels of the pixels A, B and C, and then a process of truncating the lowest 2 bits is performed. The FRC errors used in the FRC process each have a value selected from 0 to 3, and the values illustrated in FIGS. 6A and 6B are used as the FRC errors. It should be noted that the FRC process is not performed for the gray-level values of the R, G and B sub-pixels of the pixel D, which are already subjected to the FRC process in the compression circuit 5*a*.

Figures 28, 29, 30:
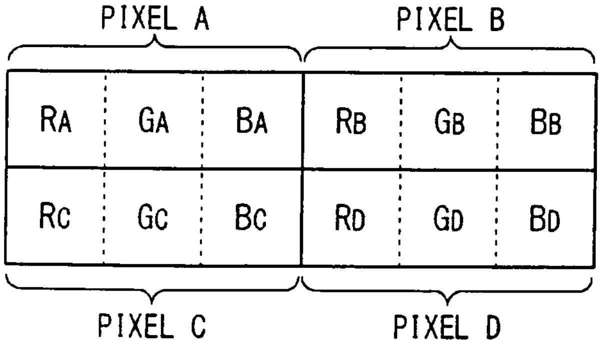
FIG. 28 is a table illustrating the average values of gray-level values of the respective sub-pixels of the respective pixels in display data illustrated in FIG. 27 over the 4m-th to (4m+3)-th frames.
FIG. 29 is a diagram illustrating an example of a fundamental matrix used to generate error data α.
FIG. 30 is a diagram illustrating another arrangement of pixels in a target block.

Such an FRC process allows the display data 24, in which 6 bits are allocated to each of the R, G, and B sub-pixels to have the same amount of information as the decompressed data 23. FIG. 28 is a table illustrating the average values obtained by multiplying the respective gray-level values of the R, G and B sub-pixels of the pixels A to D illustrated in FIG. 27 by four, and then averaging the resultant values over the 4m-th to (4m+3)-th frames. One would understand the average values respectively obtained for the R, G, and B sub-pixels of the pixels A to D, which are illustrated in FIG. 28, almost coincide with the values of the image data 21 illustrated in FIG. 26. At the same time, this implies that the display data 24 well represents the original image data 21. That is, the display data 24, in which 6 bits are allocated to each of the R, G, and B sub-pixels achieves image display with the number of gray-levels corresponding to 8 bits in a pseudo manner.

2-6. (4×1) Pixel Compression

As described above, in a case when there is a high correlation among the image data of the four pixels of the target block, the (4×1) pixel compression described in the first embodiment is performed in the compression circuit 5*a*. When the (4×1) pixel compression is performed, the compression circuit 5*a* performs the (4×1) pixel compression on the image data 21 to generate the compressed data 22, and then the decompression circuit 11 generates the decompressed data 23 from the compressed data 22 by the same decompression method as that in the first embodiment. Further, the FRC circuit 12 generates the display data 24 from the decompressed data 23 by the same FRC process as that in the first embodiment. It is as described above that the display data 24 have the same amount of information as the decompressed data 23 in a pseudo manner, and almost coincide with the original image data 21.

2-7. Calculation of Error Data α

In the following, a description is given of the calculation of the error data α used in the (1×4) pixel compression, (2+1×2) pixel compression, and (2×2) pixel compression.

The error data α used for the bit-plane reduction process, which is performed in the (1×4) pixel compression and (2+1×2) pixel compression, are calculated from the fundamental matrix illustrated in FIG. 29 and the coordinates of each of the relevant pixels. It should be note that the fundamental matrix refers to a matrix describing an association of the lowest 2 bits x1 and x0 of the x coordinate of a pixel and the lowest 2 bits y1 and y0 of the y coordinate with a fundamental value Q of the error data α. The fundamental value Q refers to a value used as a seed to calculate the error data α.

Specifically, the fundamental value Q is first extracted from matrix elements of the fundamental matrix on the basis of the lowest 2 bits x1 and x0 of the x coordinate of a target pixel and the lowest 2 bits y1 and y0 of the y coordinate. In a case when a pixel to be subjected to the bit-plane reduction process is the pixel A and the lowest 2 bits of the coordinates of the pixel A are "00", for example, "15" is extracted as the fundamental value Q.

Further, depending on the number of bits truncated in the bit truncation process that is subsequently performed in the bit plane reduction process, the following calculation is performed on the fundamental value Q to thereby calculate the error data α:

$\alpha = Q \times 2$, (for a case when the number of truncated bits is 5)

$\alpha = Q$, (for a case when the number of truncated bits is 4) and $\alpha = Q/2$ (for a case when the number of truncated bits is 3).

On the other hand, the error data α used in the processes for calculating the representative values of the image data of highly-correlated two pixels in the (2+1×2) pixel compression and (2×2) pixel compression are calculated from the fundamental matrix illustrated in FIG. 29 and the second lowest bits x1 and y1 of the x and y coordinates of the target two pixels. Specifically, depending on the combination of the target two pixels included in the target block, any one of pixels of the target block is first determined as a pixel used to extract the fundamental value Q. In the following, the pixel used to extract the fundamental value Q is described as Q extraction pixel. The relationship between the combination of the target two pixels and the Q extraction pixel is as follows:

The target two pixels are pixels A and B: Q extraction pixel is pixel A.

The target two pixels are pixels A and C: Q extraction pixel is pixel A.

The target two pixels are pixels A and D: Q extraction pixel is pixel A.

The target two pixels are pixels B and C: Q extraction pixel is pixel B.

The target two pixels are pixels B and D: Q extraction pixel is pixel B.

The target two pixels are pixels C and D: Q extraction pixel is pixel B.

Further, depending on the second lowest bits x1 and y1 of the x and y coordinates of the target two pixels, the fundamental value Q corresponding to the Q extraction pixel is extracted from the fundamental matrix. When the target two pixels are the pixels A and B, for example, the Q extraction pixel is the pixel A. In this case, from the four fundamental values Q associated with to the pixel A which serves as the Q extraction pixel in the fundamental matrix, the fundamental value Q which is finally used is determined depending on x1 and y1, as follows:

Q=15, (for x1=y1="0")

Q=01, (for x1="1" and y1="0")

Q=07, (for x1="0" and y1="1") and

Q=13 (for x1=y1="1").

Further, depending on the number of bits truncated in the bit truncation process that is subsequently performed in the process for calculating the representative values, the following calculation is performed on the fundamental value Q to calculate the error data α used in the process for calculating the representative values of the image data of the highly-correlated two pixels:

$$\alpha=Q/2,\text{ (when the number of the truncated bits is 3)}$$

$$\alpha=Q/4,\text{ (when the number of the truncated bits is 2) and}$$

$$\alpha=Q/8\text{ (when the number of the truncated bits is 1).}$$

When the target two pixels are the pixels A and B, x1=y1="1", and the number of bits truncated in the bit truncation process is 3, for example, the error data α are determined by the following expressions:

$$Q=13,\text{ and}$$

$$\alpha=13/2=6.$$

It should be noted that the method for calculating the error data α is not limited to the above. For example, as the fundamental matrix, a different matrix that is a Bayer matrix may be used.

2-8. Compression Type Identification Bits

One of matters to be noted in the compression methods described above is the number of bits allocated to the compression type identification bits in the compressed data 22. In this embodiment, the compressed data 22 are fixed to 48 bits, whereas the number of the compression type identification bits is variable from one to five. Specifically, in this embodiment, the compression type identification bits in the (1×4) pixel compression, the (2+1×2) pixel compression, the (2×2) pixel compression, and the (4×1) pixel compression are as follows:

(1×4) pixel compression: (1 bit)

(2+1×2) pixel compression: "10" (2 bits)

(2×2) pixel compression: "110" (3 bits)

(4×1) pixel compression "1110" (4 bits)

(3+1) pixel compression: "11110" (5 bits)

Lossless compression: "11111" (5 bits)

It should be noted that, schematically, the number of bits allocated to the compression type identification bits is decreased as the correlation among the image data of the pixels of the target block is poorer, whereas the number of bits allocated to the compression type identification bits is increased as the correlation among the image data of pixels of the target block is higher.

The fact that the number of bits of the compressed data 22 is fixed regardless of the actually used compression method is effective for simplifying the sequence to write the compressed data 22 in the image memory 14 and read the compressed data 22 from the image memory 14.

On the other hand, the fact that the number of bits allocated to the compression type identification bits is decreased (i.e., the number of bits allocated to the image data is increased) as the correlation among the image data of the pixels of the target block is poorer is effective for reducing the compression distortion as a whole. When the correlation among the image data of the pixels of the target block is high, the image data can be compressed with reduced deterioration of the image even when the number of bits allocated to the image data is reduced. When the correlation between pieces of image data of pixels of the target block is poor, on the other hand, the number of bits allocated to the image data is increased to reduce the compression distortion.

Here, one may consider that the number of bits allocated to the compression type identification bits in the (3+1) image compression is large, and therefore the requirement in which "the number of bits allocated to the compression type identification bits is reduced as the correlation between the image data of the pixels of the target block is poorer" may seem not to be met for the (4×1) pixel compression and the (3+1) pixel compression; however, the above requirement is actually met, when the value of the threshold Th4 defined in the conditions (D1) to (D4), which is used for determining whether or not the (3+1) pixel compression is to be used, is set to a value smaller than the threshold Th3 defined in the condition (C), which is used for determining whether or not the (4×1) pixel compression is to be used.

Although various embodiments of the present invention are described in the above, the present invention shall not be construed as being limited to the above-described embodiments. For example, in the above-described embodiments, the liquid crystal display device provided with the liquid crystal display panel is presented; however, it would be apparent to the person skilled in the art that the present invention may also be applied to display apparatuses incorporating different display devices.

Also, although the target block is defined as having pixels arranged in one row and four columns in the above-described embodiments, the target block may be defined as having four pixels that are arbitrarily arranged. As illustrated in FIG. 30, for example, the target block may be defined as having pixels arranged in two rows and two columns. The same processing as that described above can be performed by defining the pixels A, B, C and D are defined as illustrated in FIG. 30. FIG. 31 illustrates FRC errors used in this case. Even in this case, the same values may be used as the FRC errors except for that only the definition of the set of the FRC errors is different.

What is claimed is:

1. A display system, comprising:

a display device;

a transmitting device which generates compressed data by performing a compression process on image data corresponding to a display image; and a driver which drives said display device in response to said compressed data received from said transmitting device, wherein said driver includes:

a decompression circuit which generates decompressed data by decompressing said compressed data;

a Frame Rate Control (FRC) circuit configured to perform an FRC process on said decompressed data to generate display data; and a drive circuit which drives said display device in response to said display data, wherein the following relation holds: $m_2>m_3>m_1$, where $m_1$ is a number of bits of said compressed data per pixel, $m_2$ is a number of bits of said decompressed data per pixel and $m_3$ is a number of bits of said display data per pixel.

2. The display system according to claim 1, wherein said transmitting device is configured to generate said compressed data by compressing said image data by using a selected compression method which is selected from a plurality of compression methods, wherein, for at least one compression method of said plurality of compression methods, said FRC process is performed on at least part of said compressed data, wherein, for another compression method of said plurality of compression methods, no FRC process is performed on said compression data, wherein, no FRC process is performed in said FRC circuit on a part of said decompression data corresponding to said compressed data generated by said at least one compression method, said part of said decompression data corresponding to said at least part of said compressed data, and wherein said FRC process is performed on said decompressed data corresponding to said compressed data generated by said other compression method, in generating said display data.

3. The display system according to claim 2, wherein said compressed data include attribution data indicating said selected compression method selected from said plurality of compression methods, wherein said decompressed method recognizes said selected compression method used for generation of said compressed data from said attribute data incorporated in said compression data, and generates an FRC switching signal in response to said selected compression method, said FRC switching signal controlling said FRC process in said FRC circuit, and wherein said FRC circuit performs said FRC process in response to said FRC switching signal.

4. The display system according to claim 2, wherein, upon reception of said image data associated with four pixels of a target block for which said compression process is to be performed, said transmitting device generates said compression data associated with said target block, and wherein said transmitting device is responsive to a correlation among said four pixels of said target block for selecting said selected compression method from said plurality of compression methods.

5. The display system according to claim 4, wherein said plurality of compression methods include:

a first compression method which calculates a first representative value corresponding to image data of three pixels of said four pixels of said target block, calculates a first bit-plane reduced data by performing a process of reducing a number of bit planes on image data of the other one pixel, and incorporates said first representative value and said first bit-plane reduced data into said compressed image data;

a second compression method which calculates a second representative value corresponding to image data of said four pixels of said target block and incorporates said second representative value into said compressed image data;

a third compression method which calculates a third representative value corresponding to image data of two pixels of said four pixels of said target block and incorporates said third representative value into said compression data; and a fourth compression method which calculates second bit-plane-reduced data by performing a process of reducing a number of bit planes on said image data of each of said four pixels, individually, and incorporates said second bit-plane-reduced data into said compression data.

6. The display system according to claim 5, wherein said third compression method calculates said third representative value corresponding to the image data of said two pixels of four pixels of said target block and a fourth representative value corresponding to image data of the other two pixels of said four pixels of said target block, and incorporates said third representative value and said fourth representative value into said compressed image data.

7. The display system according to claim 6, wherein said plurality of compression methods further includes:

a fifth compression method which calculates a fifth representative value corresponding to image data of two pixels of said four pixels of said target block, calculates a third bit-plane-reduced data by performing a process of reducing a number of bit-planes on image data of the other two pixels of said four pixels of said target block, individually, and incorporates said fifth representative value and said third bit-reduced data into said compressed image data.

8. The display system according to claim 7, wherein the number of bits of said compressed image data is constant regardless of selection of said selected compression method, wherein said compressed image data includes at least one compression type recognition bit indicating said selected compression method, wherein a number of said at least one compression type recognition bit of said compressed image data compressed by using said first compression method is equal to or more than a number of said at least one compression type recognition bit of said compressed image data compressed by using said second compression method, wherein a number of said at least one compression type recognition bit of said compressed image data compressed by using said second compression method is equal to or more than a number of said at least one compression type recognition bit of said compressed image data compressed by using said third compression method, wherein a number of said at least one compression type recognition bit of said compressed image data compressed by using said third compression method is equal to or more than a number of said at least one compression type recognition bit of said compressed image data compressed by using said fifth compression method, and wherein a number of said at least one compression type recognition bit of said compressed image data compressed by using said fifth compression method is equal to or more than a number of said at least one compression type recognition bit of said compressed image data compressed by using said fourth compression method.

9. A display system, comprising:

a display device;

a transmitting device which generates compressed data by performing a compression process on image data corresponding to a display image; and a driver which drives said display device in response to said compressed data received from said transmitting device, wherein said driver includes:

a decompression circuit which generates decompressed data by decompressing said compressed data;

a Frame Rate Control (FRC) circuit configured to perform an FRC process on said decompressed data to generate display data; and a drive circuit which drives said display device in response to said display data, wherein said transmitting device is configured to generate said compressed data by compressing said image data by using a selected compression method which is selected from a plurality of compression methods, wherein, for at least one compression method of said plurality of compression methods, said FRC process is performed on at least part of said compressed data, wherein, for another compression method of said plurality of compression methods, no FRC process is performed on said compression data, wherein no FRC process is performed in said FRC circuit on a part of said decompression data corresponding to said compressed data generated by said at least one compression method, said part of said decompression data corresponding to said at least part of said compressed data, and wherein said FRC process is performed on said decompressed data corresponding to said compressed data generated by said other compression method, in generating said display data.

10. A display device driver, comprising:

a decompression circuit which generates decompressed data by decompressing compressed data generated by compressing image data corresponding to a display image;

a Frame Rate Control (FRC) circuit configured to perform an FRC process on said decompressed data to generate display data; and a drive circuit which drives said display device in response to said display data, wherein the following relation holds: $m_2>m_3>m_1$, where $m_1$ is a number of bits of said compressed data per pixel, $m_2$ is a number of bits of said decompressed data per pixel and $m_3$ is a number of bits of said display data per pixel.

11. The display device driver according to claim 10, wherein said compressed data are generated by compressing said image data by using a selected compression method which is selected from a plurality of compression methods, and wherein it is determined whether or not said FRC process is performed in said FRC circuit, depending on selection of said selected compression method.

12. The display device driver according to claim 11, wherein said decompressed method recognizes said selected compression method used for generation of said compressed data from attribute data incorporated in said compression data, and generates an FRC switching signal in response to said selected compression method, said FRC switching signal controlling said FRC process in said FRC circuit, and wherein said FRC circuit performs said FRC process in response to said FRC switching signal.

13. The display device driver according to claim 11, wherein said compression data associated with four pixels of a target block are generated by compressing image data associated with said four pixels of said target block, and wherein said selected compression method is selected from said plurality of compression methods in response to a correlation among said four pixels of said target block.

14. A display device driver, comprising:

a decompression circuit which generates decompressed data by decompressing compressed data generated by compressing image data corresponding to image data;

a Frame Rate Control (FRC) circuit configured to perform an FRC process on said decompressed data to generate display data; and a drive circuit which drives said display device in response to said display data, wherein said compressed data are generated by compressing said image data by using a selected compression method which is selected from a plurality of compression methods, wherein, for at least one compression method of said plurality of compression methods, said FRC process is performed on at least part of said compressed data, wherein, for another compression method of said plurality of compression method, no FRC process is performed on said compression data, wherein no FRC process is performed in said FRC circuit on a part of said decompression data corresponding to said compressed data generated by said at least one compression method, said part of said decompression data corresponding to said at least part of said compressed data, and wherein said FRC process is performed on said decompressed data corresponding to said compressed data generated by said other compression method, in generating said display data.

15. The display system according to claim 9, wherein, upon reception of said image data associated with four pixels of a target block for which said compression process is to be performed, said transmitting device generates said compression data associated with said target block.

16. The display system according to claim 9, wherein said compressed data include attribution data indicating said selected compression method selected from said plurality of compression methods.

17. The display system according to claim 9, wherein said transmitting device is responsive to a correlation among four pixels of a target block for selecting said selected compression method from said plurality of compression methods.

18. The display system according to claim 9, wherein said decompressing generates an FRC switching signal in response to said selected compression method.

19. The display system according to claim 18, wherein said FRC switching signal controls said FRC process in said FRC circuit.

20. The display system according to claim 1, wherein said transmitting device is configured to generate said compressed data by compressing said image data by using a selected compression method which is selected from a plurality of compression methods, and wherein, for at least one compression method of said plurality of compression methods, said FRC process is performed on at least part of said compressed data, and wherein, for another compression method of said plurality of compression methods, no FRC process is performed on said compression data.

21. The display system according to claim 15, wherein said transmitting device is responsive to a correlation among said four pixels of said target block for selecting said selected compression method from said plurality of compression methods.

* * * * *